(12) United States Patent
Rahn et al.

(10) Patent No.: US 11,801,466 B2
(45) Date of Patent: Oct. 31, 2023

(54) FILTER CARTRIDGES; AIR CLEANER ASSEMBLIES; HOUSINGS; FEATURES; COMPONENTS; AND, METHODS

(71) Applicant: Donaldson Company, Inc., Minneapolis, MN (US)

(72) Inventors: Hubert J. Rahn, Minneapolis, MN (US); David J. Burton, Minneapolis, MN (US); Steven K. Campbell, Minneapolis, MN (US)

(73) Assignee: Donaldson Company, Inc., Bloomington, MN (US)

( * ) Notice: Subject to any disclaimer, the term of this patent is extended or adjusted under 35 U.S.C. 154(b) by 0 days.

(21) Appl. No.: 17/520,990

(22) Filed: Nov. 8, 2021

(65) Prior Publication Data

US 2022/0134269 A1 May 5, 2022

Related U.S. Application Data

(63) Continuation of application No. 16/642,768, filed as application No. PCT/US2018/048907 on Aug. 30, 2018, now Pat. No. 11,198,082.
(Continued)

(51) Int. Cl.
*B01D 46/00* (2022.01)
*B01D 46/52* (2006.01)
(Continued)

(52) U.S. Cl.
CPC ....... *B01D 46/0005* (2013.01); *B01D 46/525* (2013.01); *B01D 46/2411* (2013.01);
(Continued)

(58) Field of Classification Search
CPC .......... B01D 50/20; B01D 46/525–527; B01D 46/0005; B01D 46/62; B01D 2271/022;
(Continued)

(56) References Cited

U.S. PATENT DOCUMENTS 2,093,877 A 9/1937 Pentz
2,270,969 A 1/1942 Robinson
(Continued)

FOREIGN PATENT DOCUMENTS

CN 2296402 Y 11/1998
CN 2372041 Y 1/2000
(Continued)

OTHER PUBLICATIONS

U.S. Appl. No. 60/556,133, filed Mar. 2004, Krisko et al.
(Continued)

*Primary Examiner* — Robert Clemente
(74) *Attorney, Agent, or Firm* — Merchant & Gould P.C.

(57) ABSTRACT

According to the present disclosure, air cleaner assemblies, components, features, and methods relating thereto, are described. These features, in part, relate to configuration of a preferred seal arrangement and seal surface of the cartridge. Particular arrangements are shown, in which: the filter cartridge includes a seal arrangement having a axial pinch seal surface with a projection/recess contour including at least one projection thereon; and, the cartridge includes a seal contour projection stabilizing portion at a location in perimeter alignment with the portion of the seal pinch arrangement including the first housing engagement projection. Additional features are included that relate to clean air separator section tubes of a precleaner arrangement secured to a cartridge. These features can be used in cartridges including features outlined above, or in alternative cartridges. Additional features of air cleaner arrangements and filter cartridges in accord with the above are described.

24 Claims, 62 Drawing Sheets

Related U.S. Application Data

(60) Provisional application No. 62/685,394, filed on Jun. 15, 2018, provisional application No. 62/552,836, filed on Aug. 31, 2017.

(51) Int. Cl.
  *B01D 46/24* (2006.01)
  *B01D 46/62* (2022.01)

(52) U.S. Cl.
  CPC ........ *B01D 46/62* (2022.01); *B01D 2271/022* (2013.01); *B01D 2271/027* (2013.01); *B01D 2279/60* (2013.01)

(58) Field of Classification Search
  CPC .......... B01D 2271/027; B01D 2275/20; B01D 2275/205; B01D 2275/206; B01D 2275/208
  See application file for complete search history.

(56) References Cited

U.S. PATENT DOCUMENTS

| | | |
|---|---|---|
| 2,306,325 A | 12/1942 | Allan |
| 2,915,188 A | 12/1959 | Buker |
| 2,955,028 A | 10/1960 | Bevans |
| 3,025,963 A | 3/1962 | Bauer |
| 3,224,592 A | 12/1965 | Burns et al. |
| 3,494,113 A | 2/1970 | Kinney |
| 3,598,738 A | 8/1971 | Biswell et al. |
| 3,645,402 A | 2/1972 | Alexander et al. |
| 3,687,849 A | 8/1972 | Abbott |
| 3,749,247 A | 7/1973 | Rohde |
| 4,014,794 A | 3/1977 | Lewis |
| 4,061,572 A | 12/1977 | Cohen et al. |
| 4,066,559 A | 1/1978 | Rohde |
| 4,075,097 A | 2/1978 | Paul |
| 4,075,098 A | 2/1978 | Paul et al. |
| 4,080,185 A | 3/1978 | Richter et al. |
| 4,144,169 A | 3/1979 | Grueschow |
| 4,324,213 A | 4/1982 | Kasting et al. |
| 4,364,751 A | 12/1982 | Copley |
| 4,402,912 A | 9/1983 | Krueger et al. |
| 4,410,427 A | 10/1983 | Wydeven |
| 4,589,983 A | 5/1986 | Wydevan |
| 4,600,420 A | 7/1986 | Wydeven et al. |
| 4,738,776 A | 4/1988 | Brown |
| 4,755,289 A | 7/1988 | Villani |
| 4,782,891 A | 11/1988 | Cheadle et al. |
| 4,826,517 A | 5/1989 | Norman |
| 4,861,359 A | 8/1989 | Tettman |
| 4,925,561 A | 5/1990 | Ishii et al. |
| 4,979,969 A | 12/1990 | Sturmon |
| 5,024,268 A | 6/1991 | Cheadle et al. |
| 5,049,326 A | 9/1991 | Matsumoto et al. |
| 5,050,549 A | 9/1991 | Herding |
| 5,064,799 A | 11/1991 | Cheadle et al. |
| 5,069,799 A | 12/1991 | Sturmon |
| 5,094,745 A | 3/1992 | Monte et al. |
| 5,120,334 A | 6/1992 | Cooper |
| 5,222,488 A | 2/1993 | Forsgren et al. |
| 5,213,596 A | 5/1993 | Kume et al. |
| 5,223,011 A | 6/1993 | Hanni |
| 5,225,081 A | 7/1993 | Brownawell et al. |
| 5,258,118 A | 11/1993 | Reynolds |
| 5,298,160 A | 3/1994 | Ayers et al. |
| 5,342,511 A | 8/1994 | Brownawell |
| 5,382,355 A | 1/1995 | Arlozynski |
| 5,391,212 A | 2/1995 | Ernst et al. |
| D356,852 S | 3/1995 | Janik |
| 5,435,346 A | 7/1995 | Treygidgo et al. |
| 5,459,074 A | 10/1995 | Muoni |
| 5,472,379 A | 12/1995 | Andress et al. |
| 5,472,463 A | 12/1995 | Harmon et al. |
| 5,494,497 A | 2/1996 | Lee |
| 5,498,332 A | 3/1996 | Handtmann |
| 5,512,074 A | 4/1996 | Hanni et al. |
| 5,531,848 A | 7/1996 | Brinda |
| 5,541,330 A | 7/1996 | Wear et al. |
| 5,556,542 A | 9/1996 | Berman et al. |
| 5,560,330 A | 10/1996 | Andress et al. |
| 5,562,825 A | 10/1996 | Yamada et al. |
| 5,591,330 A | 1/1997 | Lefebvre |
| 5,605,554 A | 2/1997 | Kennedy |
| 5,613,992 A | 3/1997 | Engel |
| 5,643,541 A | 7/1997 | Peddicord et al. |
| 5,662,799 A | 9/1997 | Hudgens et al. |
| 5,672,399 A | 9/1997 | Kahlbaugh et al. |
| 5,709,722 A | 1/1998 | Nagai et al. |
| 5,759,217 A | 2/1998 | Joy et al. |
| 5,738,785 A | 4/1998 | Brown et al. |
| 5,753,116 A | 5/1998 | Baumann et al. |
| 5,772,883 A | 6/1998 | Rothman et al. |
| D396,098 S | 7/1998 | Gillingham et al. |
| 5,792,247 A | 8/1998 | Gillingham et al. |
| 5,795,361 A | 8/1998 | Lainer, Jr. et al. |
| D398,046 S | 9/1998 | Gillingham et al. |
| 5,803,024 A | 9/1998 | Brown et al. |
| D399,944 S | 10/1998 | Gillingham et al. |
| 5,820,646 A | 10/1998 | Gillingham et al. |
| 5,843,198 A | 12/1998 | Walker |
| 5,853,439 A | 12/1998 | Gieseke et al. |
| D405,157 S | 2/1999 | Hayes |
| 5,888,442 A | 3/1999 | Kometani et al. |
| 5,891,402 A | 4/1999 | Sassa et al. |
| 5,895,574 A | 4/1999 | Friedmann et al. |
| 5,902,364 A | 5/1999 | Tokar et al. |
| 5,948,248 A | 9/1999 | Brown |
| 6,093,778 A | 3/2000 | Coulonvaux |
| 6,045,692 A | 4/2000 | Bilski et al. |
| D425,189 S | 5/2000 | Gillingham |
| D428,128 S | 7/2000 | Gillingham et al. |
| 6,086,763 A | 7/2000 | Baumaun |
| 6,096,208 A | 8/2000 | Connelly et al. |
| 6,098,575 A | 8/2000 | Mulshine et al. |
| 6,129,852 A | 10/2000 | Elliot et al. |
| 6,149,700 A | 11/2000 | Morgan et al. |
| 6,165,519 A | 12/2000 | Lehrer et al. |
| 6,171,355 B1 | 1/2001 | Gieseke et al. |
| 6,179,890 B1 | 1/2001 | Ramos et al. |
| D437,401 S | 2/2001 | Ramos et al. |
| D437,402 S | 2/2001 | Gieseke et al. |
| 6,190,432 B1 | 2/2001 | Gieseke et al. |
| 6,196,019 B1 | 3/2001 | Higo et al. |
| 6,210,469 B1 | 4/2001 | Tokar |
| 6,231,630 B1 | 5/2001 | Ernst et al. |
| 6,235,194 B1 | 5/2001 | Jousset et al. |
| 6,235,195 B1 | 5/2001 | Tokar |
| 6,238,554 B1 | 5/2001 | Martin, Jr. et al. |
| 6,238,561 B1 | 5/2001 | Liu et al. |
| D444,219 S | 6/2001 | Gieseke et al. |
| 6,261,334 B1 | 7/2001 | Morg |
| RE37,369 E | 9/2001 | Hudgens et al. |
| 6,293,984 B1 | 9/2001 | Oda et al. |
| 6,306,193 B1 | 10/2001 | Morgan et al. |
| D450,828 S | 11/2001 | Tokar |
| 6,348,085 B1 | 2/2002 | Tokar et al. |
| 6,350,291 B1 | 2/2002 | Gieseke et al. |
| 6,350,296 B1 | 2/2002 | Warner |
| D455,826 S | 4/2002 | Gillingham et al. |
| 6,379,564 B1 | 4/2002 | Rohrbach et al. |
| 6,391,076 B1 | 5/2002 | Jaroszczyk et al. |
| 6,398,832 B2 | 6/2002 | Morgan et al. |
| 6,416,561 B1 | 7/2002 | Kallsen et al. |
| 6,375,700 B1 | 8/2002 | Jaroszczyk et al. |
| 6,447,566 B1 | 9/2002 | Rivera et al. |
| 6,475,379 B2 | 11/2002 | Jousset et al. |
| 6,478,958 B1 | 11/2002 | Beard et al. |
| 6,482,247 B2 | 11/2002 | Jaroszczyk et al. |
| 6,511,599 B2 | 1/2003 | Jaroszczyk et al. |
| 6,517,598 B2 | 2/2003 | Anderson et al. |
| 6,537,453 B2 | 3/2003 | Beard et al. |
| D473,637 S | 4/2003 | Golden |
| 6,540,806 B2 | 4/2003 | Reinhold |

(56) References Cited

U.S. PATENT DOCUMENTS

| | | |
|---|---|---|
| 6,547,857 B2 | 4/2003 | Gieseke et al. |
| 6,554,139 B1 | 4/2003 | Maxwell et al. |
| 6,596,165 B2 | 7/2003 | Koivula |
| 6,610,126 B2 | 8/2003 | Xu et al. |
| D479,300 S | 9/2003 | Janik |
| 6,623,636 B2 | 9/2003 | Rohrbach et al. |
| 6,641,637 B2 | 11/2003 | Kallsen et al. |
| 6,673,136 B2 | 1/2004 | Gillingham et al. |
| 6,676,721 B1 | 1/2004 | Gillingham et al. |
| 6,709,588 B2 | 3/2004 | Pavlin et al. |
| 6,743,317 B2 | 6/2004 | Wydeven |
| 6,746,518 B2 | 6/2004 | Gieseke et al. |
| 6,787,033 B2 | 9/2004 | Beard et al. |
| 6,827,750 B2 | 12/2004 | Drozd et al. |
| 6,835,304 B2 | 12/2004 | Jousset et al. |
| 6,843,916 B2 | 1/2005 | Burington et al. |
| 6,860,241 B2 | 3/2005 | Martin et al. |
| 6,893,571 B2 | 5/2005 | Harenbrock et al. |
| 6,902,598 B2 | 6/2005 | Gunderson et al. |
| 6,919,023 B2 | 7/2005 | Merritt et al. |
| 6,953,124 B2 | 10/2005 | Winter et al. |
| 6,966,940 B2 | 11/2005 | Krisko et al. |
| 6,969,461 B2 | 11/2005 | Beard et al. |
| 6,984,319 B2 | 1/2006 | Merritt et al. |
| 7,001,450 B2 | 2/2006 | Gieseke et al. |
| 7,008,467 B2 | 3/2006 | Krisko et al. |
| 7,018,531 B2 | 3/2006 | Eilers et al. |
| 7,070,641 B1 | 7/2006 | Gunderson |
| 7,081,145 B2 | 7/2006 | Gieseke et al. |
| 7,090,711 B2 | 8/2006 | Gillingham et al. |
| 7,153,422 B2 | 12/2006 | Herman et al. |
| 7,156,991 B2 | 1/2007 | Herman et al. |
| 7,160,451 B2 | 1/2007 | Hacker et al. |
| 7,182,863 B2 | 2/2007 | Eilers et al. |
| 7,182,864 B2 | 2/2007 | Brown et al. |
| 7,211,124 B2 | 5/2007 | Gieseke et al. |
| 7,247,183 B2 | 7/2007 | Connor et al. |
| 7,258,719 B2 | 8/2007 | Miller et al. |
| 7,282,075 B2 | 10/2007 | Sporre et al. |
| 7,338,544 B2 | 3/2008 | Sporre et al. |
| 7,351,270 B2 | 4/2008 | Engelland et al. |
| 7,396,371 B2 | 7/2008 | Nepsund et al. |
| 7,396,375 B2 | 7/2008 | Nepsund et al. |
| 7,491,254 B2 | 2/2009 | Krisko et al. |
| 7,494,017 B2 | 2/2009 | Miller |
| 7,540,895 B2 | 6/2009 | Furseth et al. |
| D600,790 S | 9/2009 | Nelson et al. |
| 7,625,419 B2 | 12/2009 | Nelson et al. |
| 7,645,310 B2 | 1/2010 | Krisko et al. |
| 7,655,074 B2 | 2/2010 | Nepsund et al. |
| 7,658,777 B2 | 2/2010 | Kopec |
| 7,674,308 B2 | 3/2010 | Krisko et al. |
| 7,682,416 B2 | 3/2010 | Engelland et al. |
| 7,799,108 B2 | 9/2010 | Connor et al. |
| D638,517 S | 5/2011 | Greenway-Balmar |
| 7,967,886 B2 | 6/2011 | Schrage et al. |
| 7,972,405 B2 | 7/2011 | Engelland et al. |
| 7,981,183 B2 | 7/2011 | Nepsund et al. |
| 7,993,422 B2 | 8/2011 | Kirsko et al. |
| 8,012,227 B2 | 9/2011 | Greif |
| 8,016,903 B2 | 9/2011 | Nelson et al. |
| 8,034,145 B2 | 10/2011 | Boehrs et al. |
| 8,038,756 B2 | 10/2011 | Iddings et al. |
| 8,062,399 B2 | 11/2011 | Nelson et al. |
| 8,101,003 B2 | 1/2012 | Krisko et al. |
| 8,119,002 B2 | 2/2012 | Schiavon et al. |
| 8,226,786 B2 | 7/2012 | Schrage et al. |
| 8,241,383 B2 | 8/2012 | Schrage et al. |
| 8,277,532 B2 | 10/2012 | Reichter et al. |
| 8,292,983 B2 | 10/2012 | Reichter et al. |
| 8,328,897 B2 | 12/2012 | Nelson et al. |
| 8,357,219 B2 | 1/2013 | Boehrs et al. |
| 8,480,779 B2 | 7/2013 | Boehrs et al. |
| 8,496,723 B2 | 7/2013 | Reichter et al. |
| 8,518,139 B2 | 8/2013 | Jessberger |
| 8,518,141 B2 | 8/2013 | Schrage et al. |
| 8,545,589 B2 | 10/2013 | Rocklitz et al. |
| 8,562,707 B2 | 10/2013 | Nepsund et al. |
| 8,636,820 B2 | 1/2014 | Reichter et al. |
| 8,652,228 B2 | 2/2014 | Krisko et al. |
| 8,685,130 B2 | 4/2014 | Nelson et al. |
| 8,709,119 B2 | 4/2014 | Reichter et al. |
| 8,728,193 B2 | 5/2014 | Flagstad et al. |
| 8,741,017 B2 | 6/2014 | Nelson |
| 8,778,043 B2 | 7/2014 | Krisko et al. |
| 8,784,522 B2 | 7/2014 | Menssen et al. |
| 8,840,699 B2 | 9/2014 | Boehrs et al. |
| 8,906,128 B2 | 12/2014 | Reichter et al. |
| D732,172 S | 6/2015 | Okazaki |
| 9,114,346 B2 | 8/2015 | Schrage et al. |
| 9,120,047 B2 | 9/2015 | Boehrs et al. |
| 9,180,399 B2 | 11/2015 | Reichter et al. |
| 9,242,199 B2 | 1/2016 | Nelson et al. |
| 9,289,710 B2 | 3/2016 | Hasenfratz et al. |
| 9,308,482 B2 | 4/2016 | Kaiser |
| 9,320,997 B2 | 4/2016 | Campbell et al. |
| 9,399,972 B2 | 7/2016 | Boehrs et al. |
| 9,446,339 B2 | 9/2016 | Rieger et al. |
| 9,463,404 B2 | 10/2016 | Rieger et al. |
| 9,527,023 B2 | 12/2016 | Reichter et al. |
| 9,555,370 B2 | 1/2017 | Flagstad et al. |
| 9,555,730 B1 | 1/2017 | Flagstad |
| 9,579,596 B2 | 2/2017 | Rieger et al. |
| D791,276 S | 7/2017 | Sharratt |
| 9,795,911 B2 | 10/2017 | Schrage et al. |
| D810,786 S | 2/2018 | Chen |
| D810,859 S | 2/2018 | Lu |
| 9,937,455 B2 | 4/2018 | Boehrs et al. |
| 10,029,202 B2 | 7/2018 | Nelson et al. |
| 10,046,260 B2 | 8/2018 | Campbell et al. |
| 10,053,210 B2 | 8/2018 | Necci |
| D835,778 S | 12/2018 | Mozzicato |
| 10,315,144 B2 | 6/2019 | Reichter et al. |
| 10,421,034 B2 | 9/2019 | Reichter et al. |
| 10,427,083 B2 | 10/2019 | Boehrs et al. |
| D867,568 S | 11/2019 | Glexiner |
| 10,512,868 B2 | 12/2019 | Adamek et al. |
| 10,532,310 B2 | 1/2020 | Burton et al. |
| 10,603,618 B2 | 3/2020 | Boehrs et al. |
| 10,610,816 B2 | 4/2020 | Campbell et al. |
| D905,842 S | 12/2020 | Rahn |
| 11,110,382 B2 | 9/2021 | Burton et al. |
| 11,198,082 B2 | 12/2021 | Rahn et al. |
| 11,198,083 B2 | 12/2021 | Adamek et al. |
| 2001/0032545 A1 | 10/2001 | Goto et al. |
| 2002/0060178 A1 | 5/2002 | Tsabari |
| 2002/0073850 A1 | 6/2002 | Tokar et al. |
| 2002/0096247 A1 | 7/2002 | Wydeven |
| 2002/0124734 A1 | 9/2002 | Spannbauer |
| 2002/0157359 A1 | 10/2002 | Stenersen |
| 2002/0170280 A1 | 11/2002 | Soh |
| 2002/0185007 A1 | 12/2002 | Xu et al. |
| 2002/0185454 A1 | 12/2002 | Beard et al. |
| 2002/0195384 A1 | 12/2002 | Rohrbach et al. |
| 2003/0121845 A1 | 7/2003 | Wagner et al. |
| 2003/0154863 A1 | 8/2003 | Tokar et al. |
| 2003/0184025 A1 | 10/2003 | Matsuki |
| 2003/0217534 A1 | 11/2003 | Krisko |
| 2003/0218150 A1 | 11/2003 | Blakemore et al. |
| 2004/0035097 A1 | 2/2004 | Schlensker et al. |
| 2004/0040271 A1* | 3/2004 | Kopec ............... B01D 46/525 55/482 |
| 2004/0060861 A1 | 4/2004 | Winter et al. |
| 2004/0091654 A1 | 5/2004 | Kelly et al. |
| 2004/0140255 A1 | 7/2004 | Merritt et al. |
| 2004/0173097 A1 | 9/2004 | Engelland et al. |
| 2004/0187689 A1 | 9/2004 | Sporre et al. |
| 2004/0194441 A1 | 10/2004 | Kirsch |
| 2004/0221555 A1 | 11/2004 | Engelland et al. |
| 2004/0226443 A1 | 11/2004 | Gillingham et al. |
| 2005/0016138 A1 | 1/2005 | Sheidler |
| 2005/0019236 A1 | 1/2005 | Martin et al. |
| 2005/0130508 A1 | 6/2005 | Yeh et al. |
| 2005/0166561 A1 | 8/2005 | Schrage et al. |

(56) References Cited

U.S. PATENT DOCUMENTS

| | | |
|---|---|---|
| 2005/0173325 A1 | 8/2005 | Klein et al. |
| 2005/0194312 A1 | 9/2005 | Niemeyer et al. |
| 2005/0224061 A1 | 10/2005 | Ulrich et al. |
| 2005/0252848 A1 | 11/2005 | Miller |
| 2006/0113233 A1 | 6/2006 | Merritt et al. |
| 2006/0162305 A1 | 7/2006 | Reid |
| 2006/0180537 A1 | 8/2006 | Loftis et al. |
| 2007/0261374 A1 | 11/2007 | Nelson et al. |
| 2007/0289265 A1 | 12/2007 | Coulonvaux |
| 2008/0016832 A1* | 1/2008 | Krisko ................. B01D 46/525 55/342 |
| 2008/0022641 A1 | 1/2008 | Engelland et al. |
| 2008/0110142 A1 | 5/2008 | Nelson et al. |
| 2008/0196368 A1* | 8/2008 | Waibel ................. F02M 35/024 55/495 |
| 2008/0209869 A1 | 9/2008 | Rother |
| 2008/0250766 A1 | 10/2008 | Schrage et al. |
| 2008/0282890 A1 | 11/2008 | Rocklitz et al. |
| 2008/0307759 A1 | 12/2008 | Reichter et al. |
| 2009/0056293 A1 | 3/2009 | Styles |
| 2009/0057213 A1 | 3/2009 | Schiavon et al. |
| 2009/0064646 A1 | 3/2009 | Reichter et al. |
| 2009/0071111 A1 | 3/2009 | Lundgren et al. |
| 2009/0127211 A1 | 5/2009 | Rocklitz et al. |
| 2009/0151311 A1 | 6/2009 | Reichter et al. |
| 2010/0032365 A1 | 2/2010 | Moe et al. |
| 2010/0043366 A1 | 2/2010 | Boehrs et al. |
| 2010/0170209 A1 | 7/2010 | Nelson et al. |
| 2010/0186353 A1 | 7/2010 | Ackermann |
| 2010/0258493 A1 | 10/2010 | Kindkeppel |
| 2011/0099960 A1 | 5/2011 | Menssen et al. |
| 2011/0308214 A1 | 12/2011 | Jessberger |
| 2013/0019576 A1 | 1/2013 | Krisko |
| 2014/0208705 A1 | 7/2014 | Krull |
| 2014/0251895 A1 | 9/2014 | Wagner |
| 2014/0260143 A1 | 9/2014 | Kaiser |
| 2014/0290194 A1 | 10/2014 | Karlheinz et al. |
| 2014/0318091 A1 | 10/2014 | Rieger et al. |
| 2014/0318092 A1 | 10/2014 | Rieger |
| 2015/0013289 A1 | 1/2015 | Hasenfratz et al. |
| 2015/0013291 A1 | 1/2015 | Neef |
| 2016/0045848 A1 | 2/2016 | Campbell et al. |
| 2016/0138507 A1* | 5/2016 | Klassen ............... F02D 41/0002 123/198 E |
| 2016/0305375 A1 | 10/2016 | Finn |
| 2017/0001134 A1 | 1/2017 | Rieger et al. |
| 2017/0175685 A1 | 6/2017 | Metzger |
| 2017/0234277 A1 | 8/2017 | Flagstad et al. |
| 2017/0254301 A1* | 9/2017 | Marcondes ...... F02M 35/02416 |
| 2018/0008923 A1 | 1/2018 | Burton et al. |
| 2018/0142650 A1 | 5/2018 | Finn |
| 2018/0345196 A1 | 12/2018 | Campbell |
| 2019/0111374 A1* | 4/2019 | Burton ............... F02M 35/0205 |

FOREIGN PATENT DOCUMENTS

| | | |
|---|---|---|
| CN | 101970077 | 2/2011 |
| CN | 102159297 | 8/2011 |
| CN | 102438723 | 5/2012 |
| CN | 103347586 | 10/2013 |
| CN | 104220142 | 12/2017 |
| DE | 88 08 632 | 9/1988 |
| DE | 296 13 098 | 10/1996 |
| DE | 19 746 804 | 4/1998 |
| DE | 20 2006 020 287 | 3/2008 |
| DE | 202008017059 | 5/2010 |
| DE | 10 2009 009 066 | 8/2010 |
| EP | 0 747 579 | 12/1996 |
| EP | 0 982 062 | 3/2000 |
| EP | 1 166 843 A1 | 1/2002 |
| EP | 1 208 902 | 5/2002 |
| EP | 1 233 173 A2 | 8/2002 |
| EP | 1 129 760 | 7/2007 |
| EP | 1 747 053 B1 | 10/2007 |
| EP | 2140922 | 1/2010 |
| EP | 2535550 | 12/2012 |
| FR | 2 214 505 A | 8/1974 |
| GB | 970826 | 11/1964 |
| GB | 2 082 932 A | 3/1982 |
| JP | 60-112320 | 7/1985 |
| JP | 1-171615 | 4/1989 |
| JP | 1-163408 | 11/1989 |
| JP | 2-25009 | 2/1990 |
| RU | 82574 | 5/2009 |
| RU | 2440300 | 1/2012 |
| RU | 2505339 | 1/2014 |
| RU | 2528844 | 9/2014 |
| WO | WO 97/40918 | 11/1997 |
| WO | WO 03/047722 | 6/2003 |
| WO | WO 03/084641 | 10/2003 |
| WO | WO 2004/007054 | 1/2004 |
| WO | WO 2004/054684 | 7/2004 |
| WO | WO 2004/071616 | 8/2004 |
| WO | WO 2004/082795 | 9/2004 |
| WO | WO 2005/058461 | 6/2005 |
| WO | WO 2005/077487 | 8/2005 |
| WO | WO 2005/123222 | 12/2005 |
| WO | WO 2006/017790 | 2/2006 |
| WO | WO 2006/076456 | 7/2006 |
| WO | WO 2006/076479 | 7/2006 |
| WO | WO 2007/009039 | 1/2007 |
| WO | WO 2007/044677 | 4/2007 |
| WO | WO 2007/133635 | 11/2007 |
| WO | WO 2007/149561 | 12/2007 |
| WO | WO 2008/106375 | 9/2008 |
| WO | WO 2009/033040 | 3/2009 |
| WO | WO 2010/114906 | 10/2010 |
| WO | WO 2013/003769 | 1/2013 |
| WO | WO 2014/210541 | 12/2014 |
| WO | WO 2016/034657 | 3/2016 |
| WO | WO 2016/077377 | 5/2016 |
| WO | WO 2016/105560 | 6/2016 |
| WO | WO 2016/141097 | 9/2016 |
| WO | WO 2017/106752 | 6/2017 |

OTHER PUBLICATIONS

International Search Report for International Application No. PCT/US2018/048907 dated Jan. 14, 2019 (4 pages).
English Translation of China Office Action Corresponding to 201880056276.8, dated Jun. 21, 2021.
Exhibit A, Allowed claims of U.S. Appl. No. 16/839,510 dated Feb. 1, 2022.
Exhibit B, Pending claims of U.S. Appl. No. 17/443,229 dated Feb. 1, 2022.
Exhibit C, Pending claims of U.S. Appl. No. 17/447,162 dated Feb. 1, 2022.
Exhibit D, Pending drawings of U.S. Appl. No. 29/758,137 dated Feb. 1, 2022.
European Search Report for European Patent Application No. 23160631.0 dated Jun. 15, 2023.

* cited by examiner

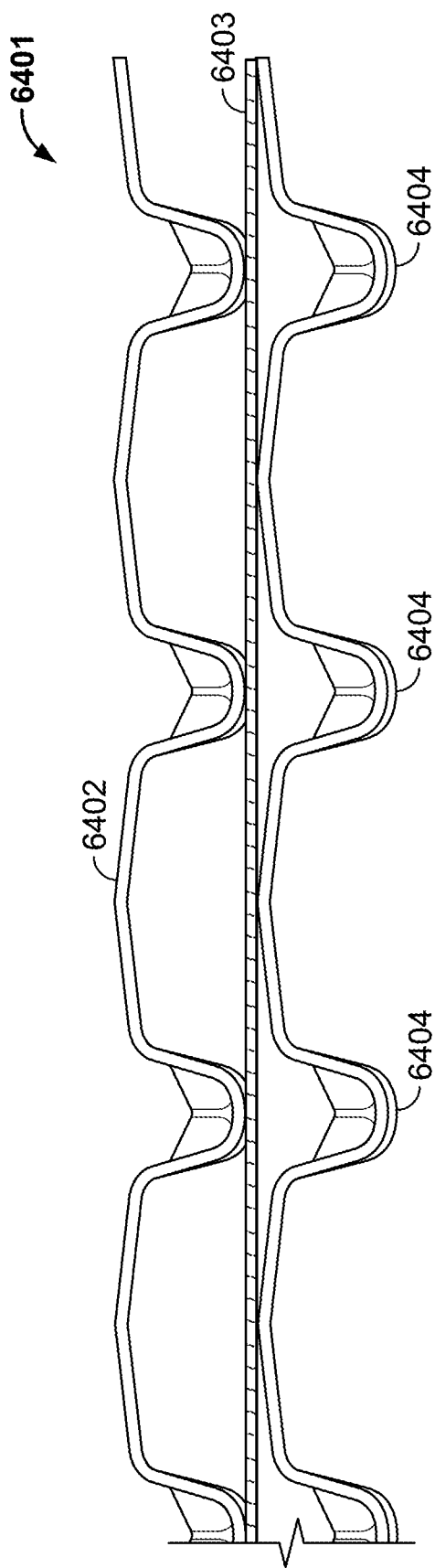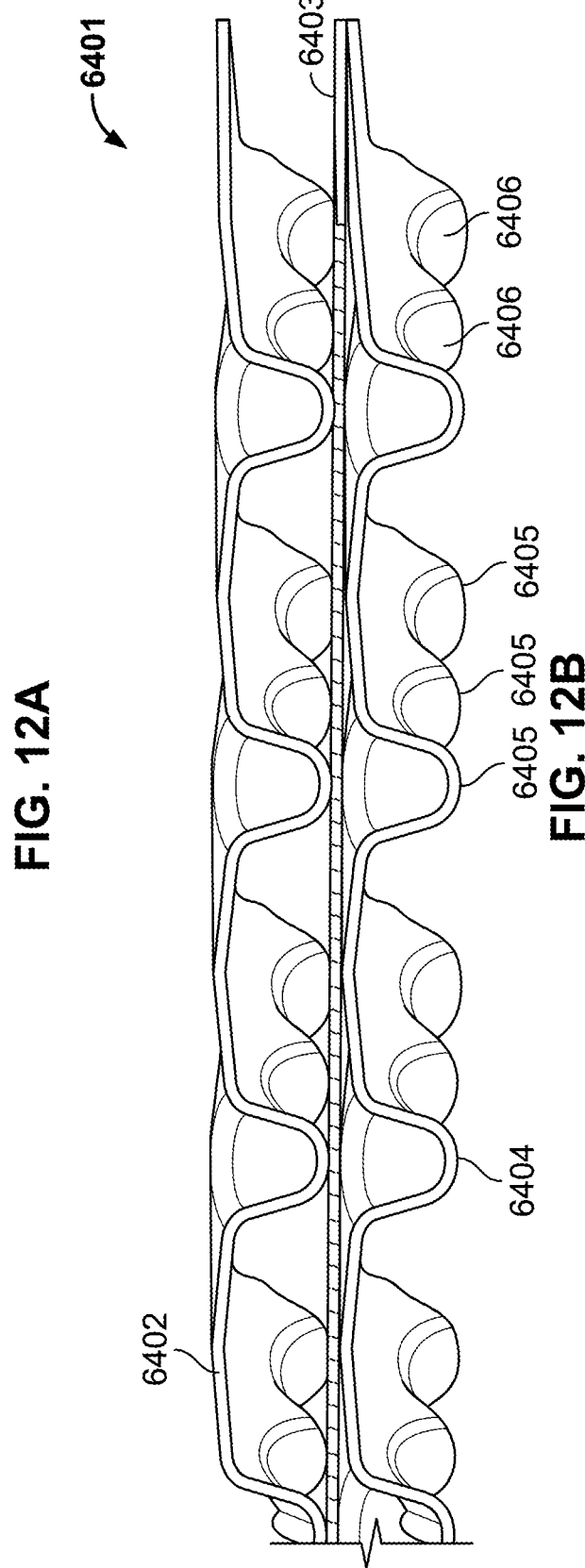

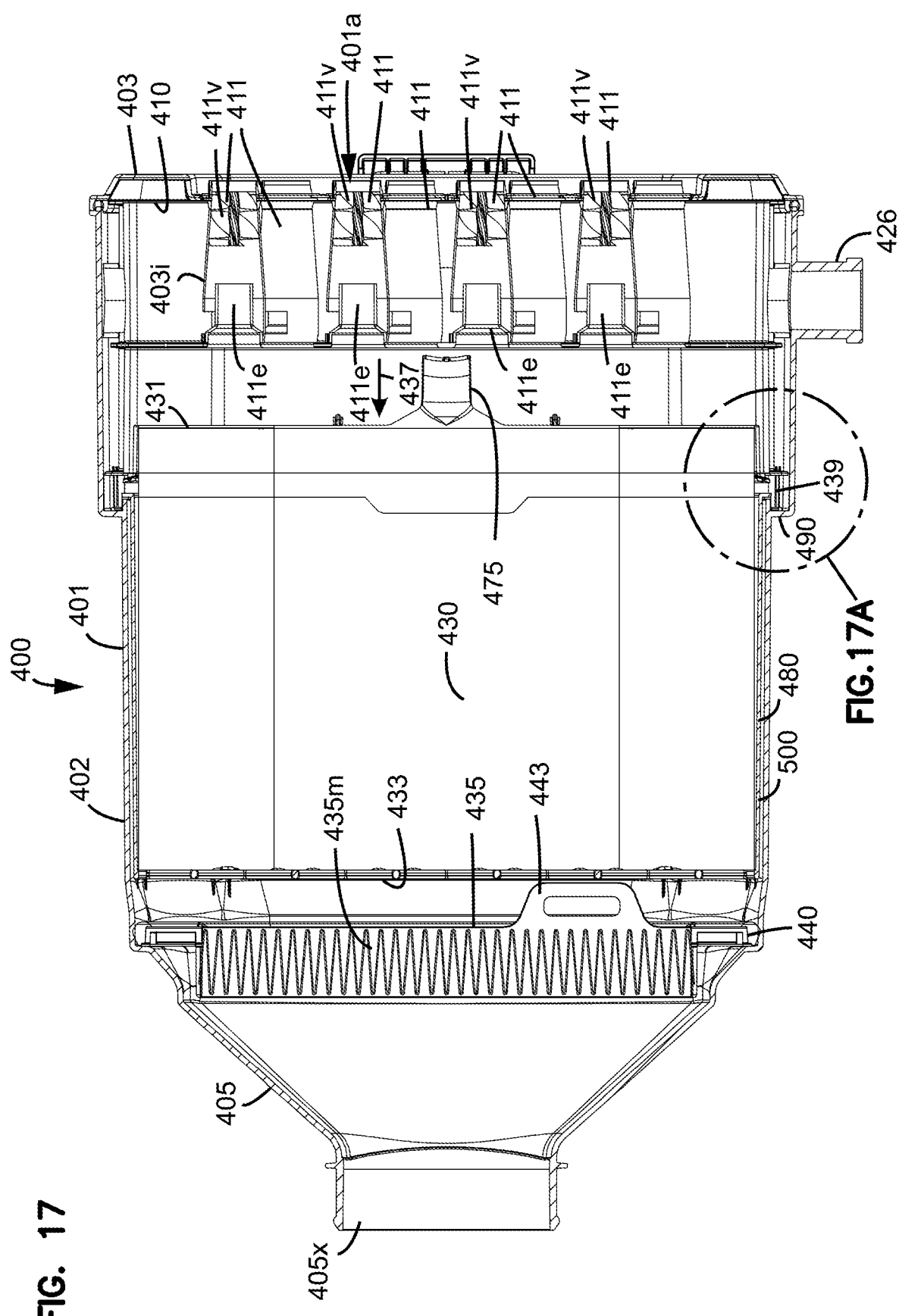

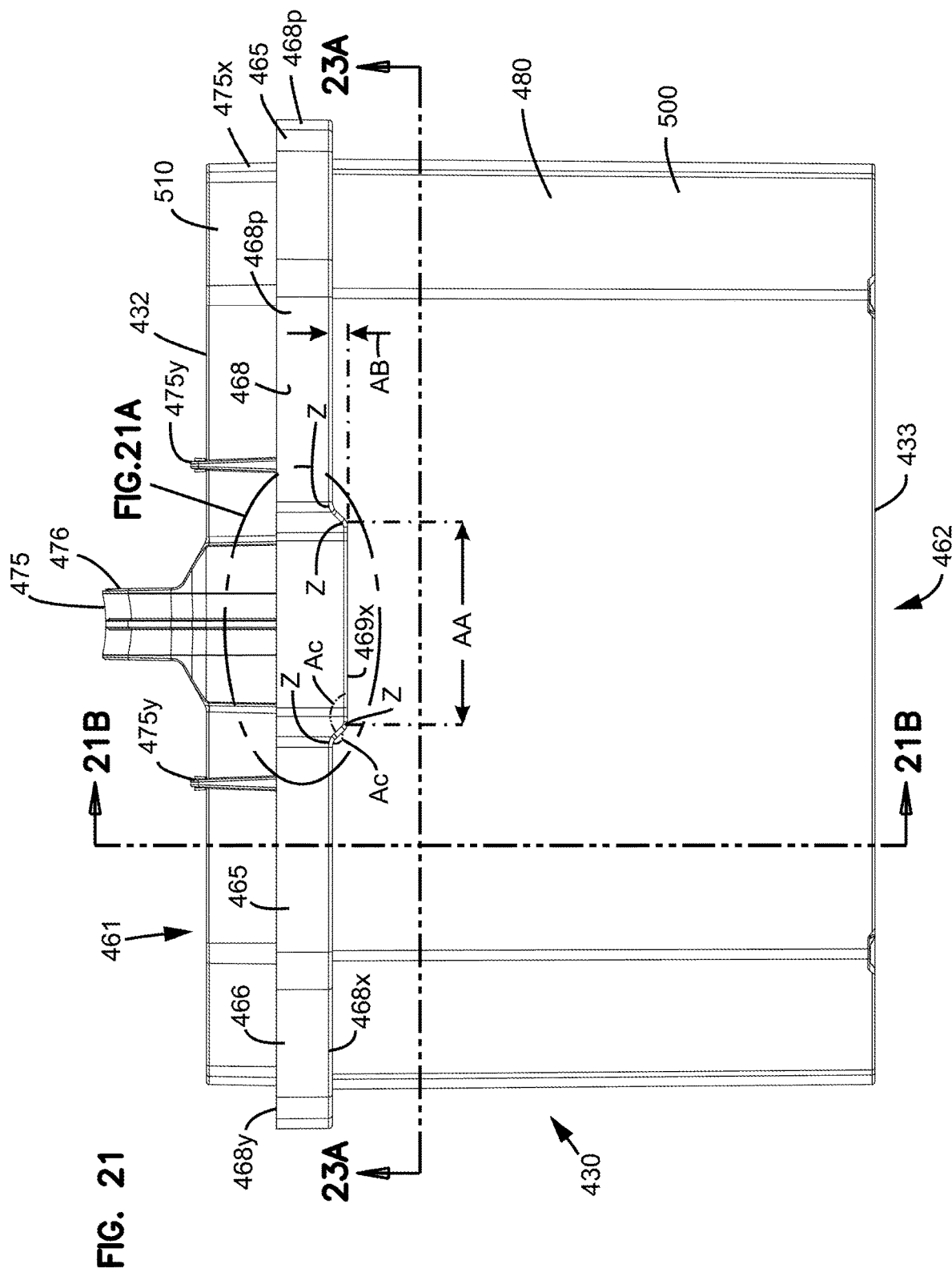

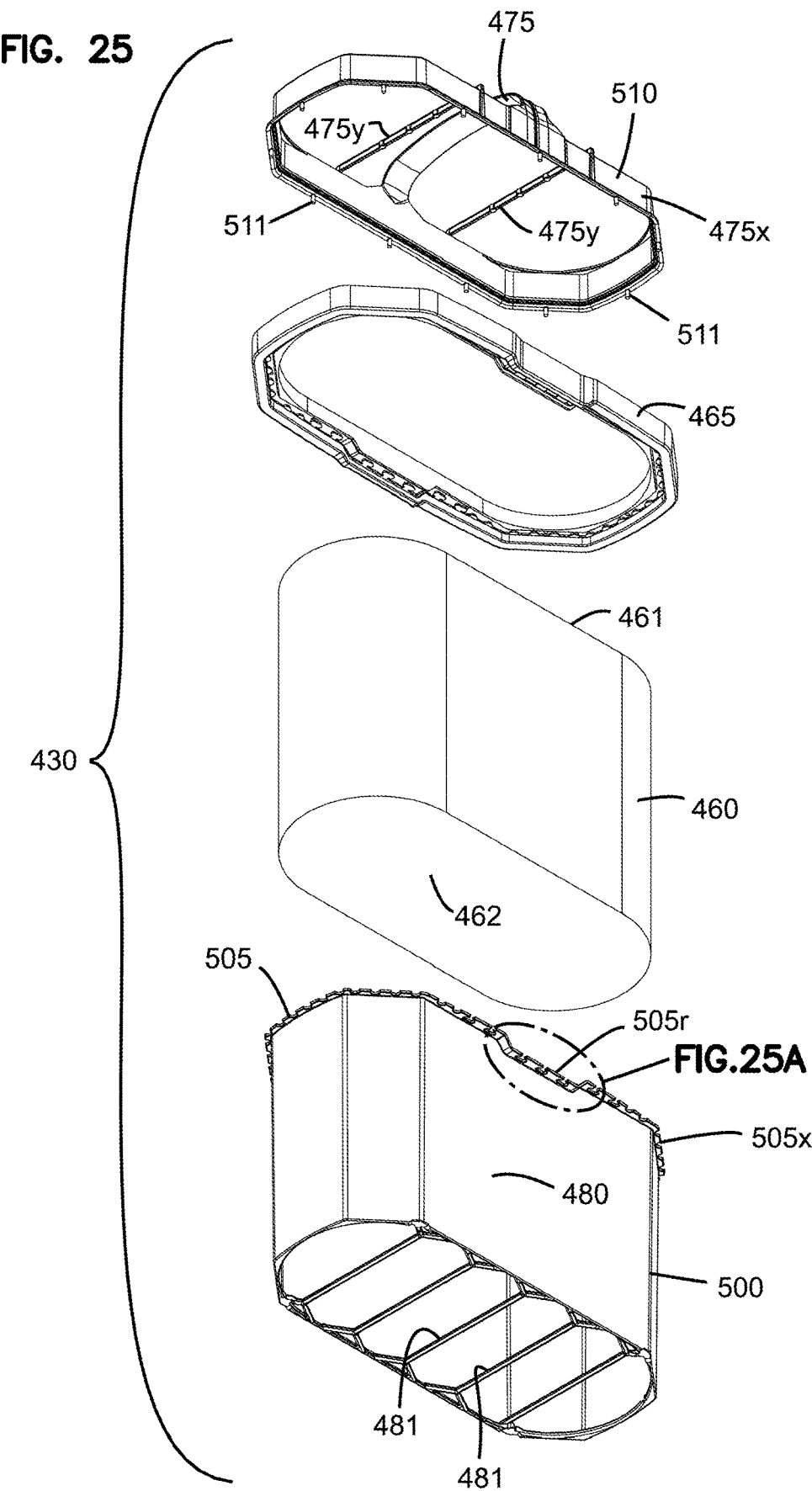

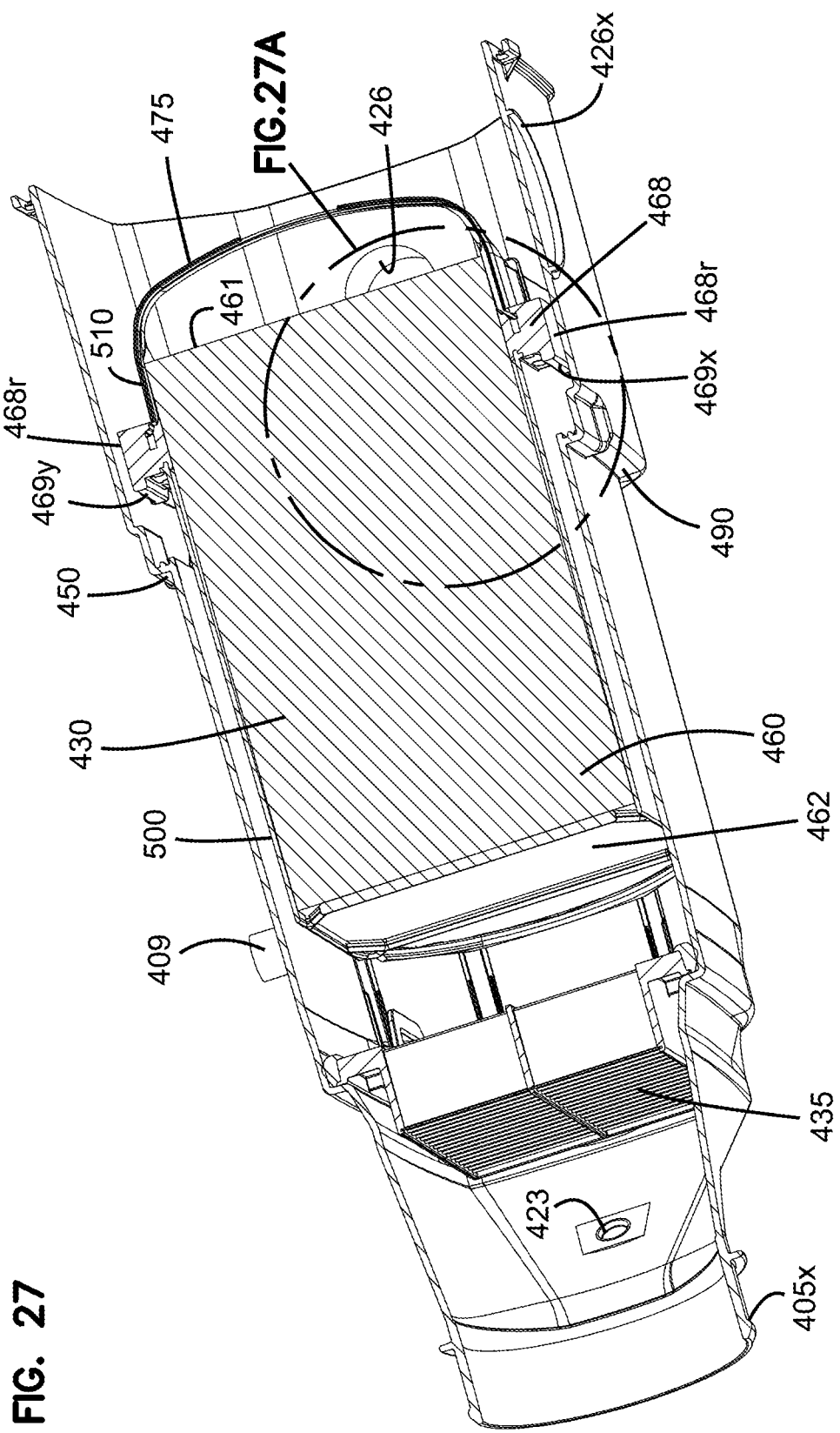

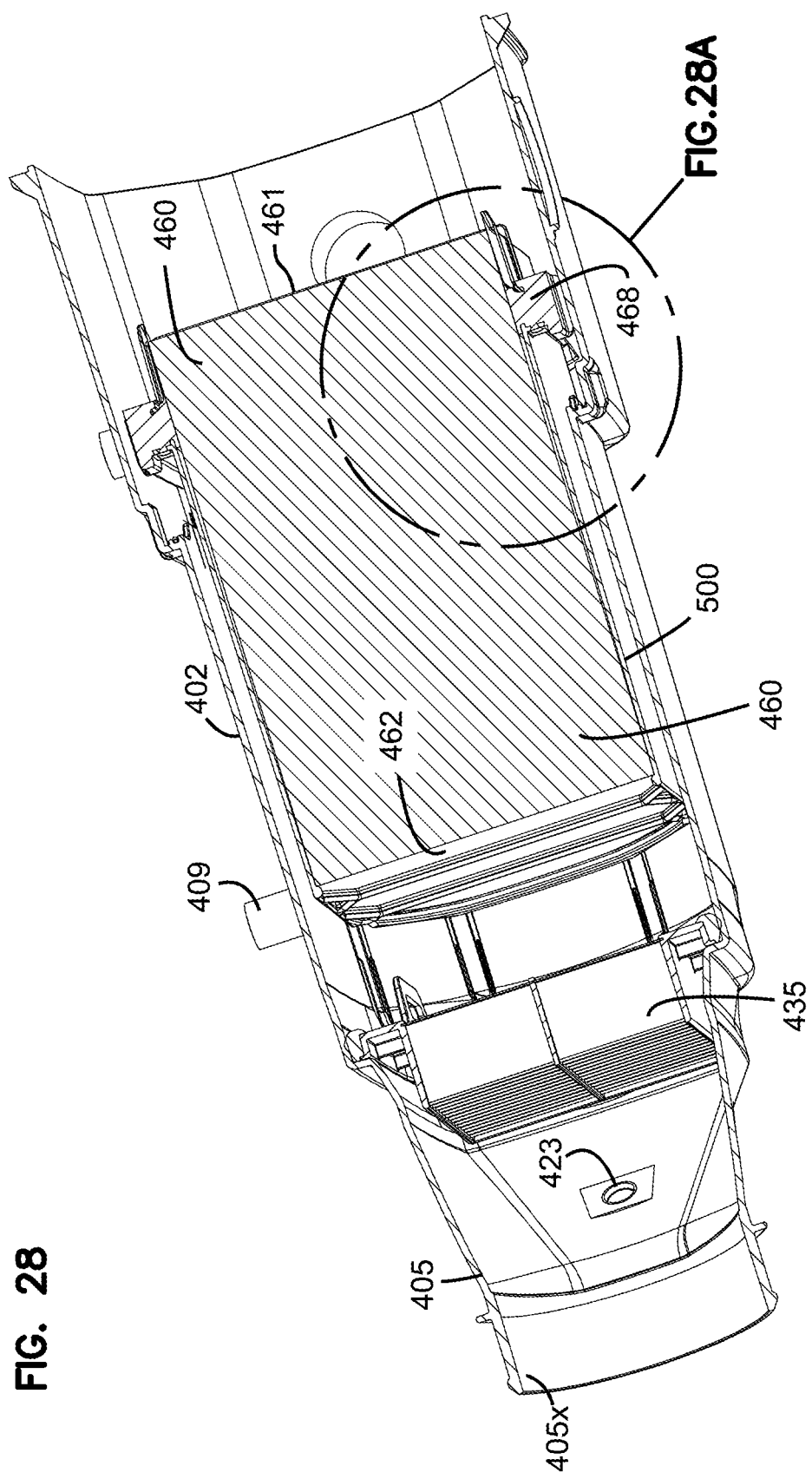

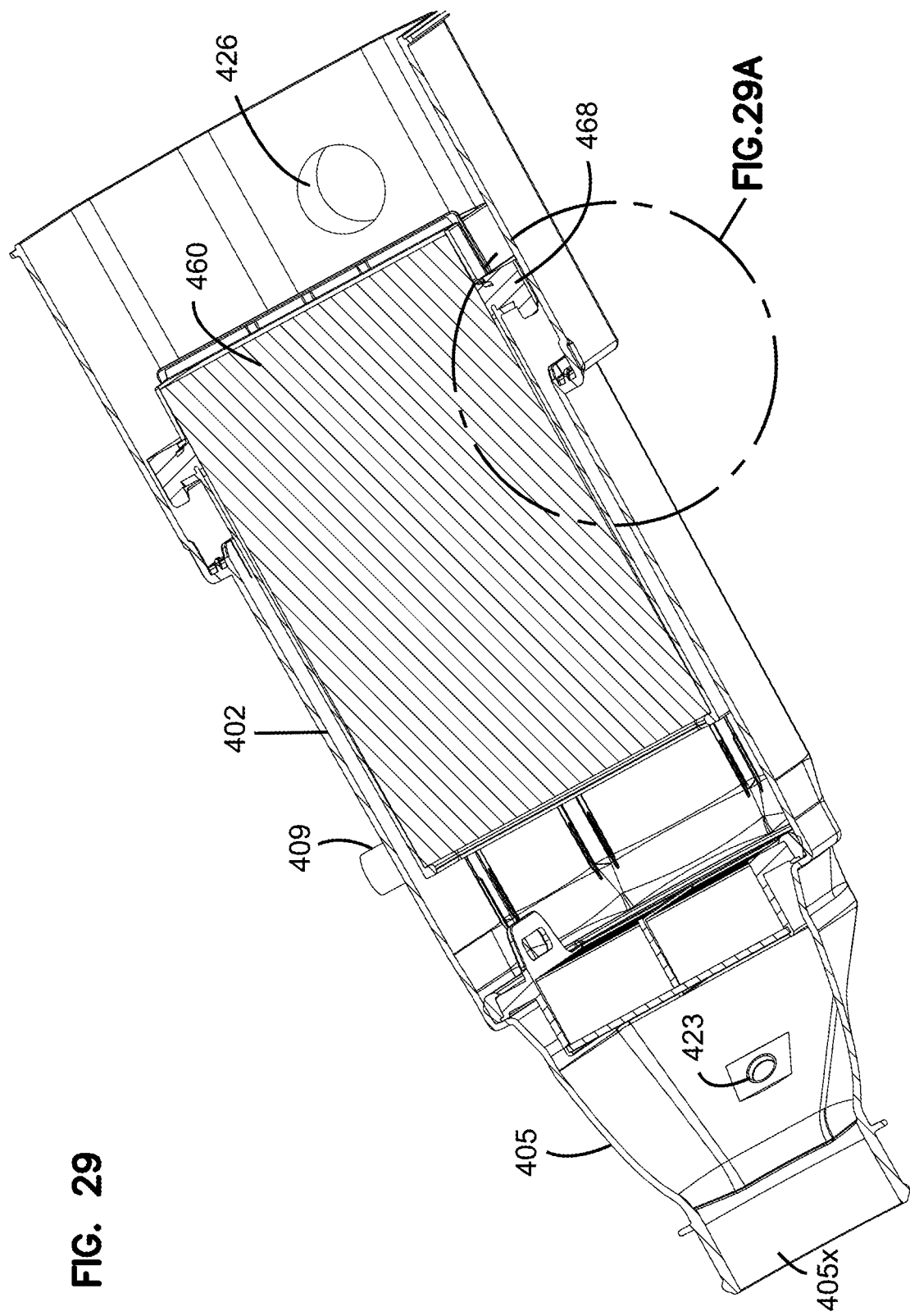

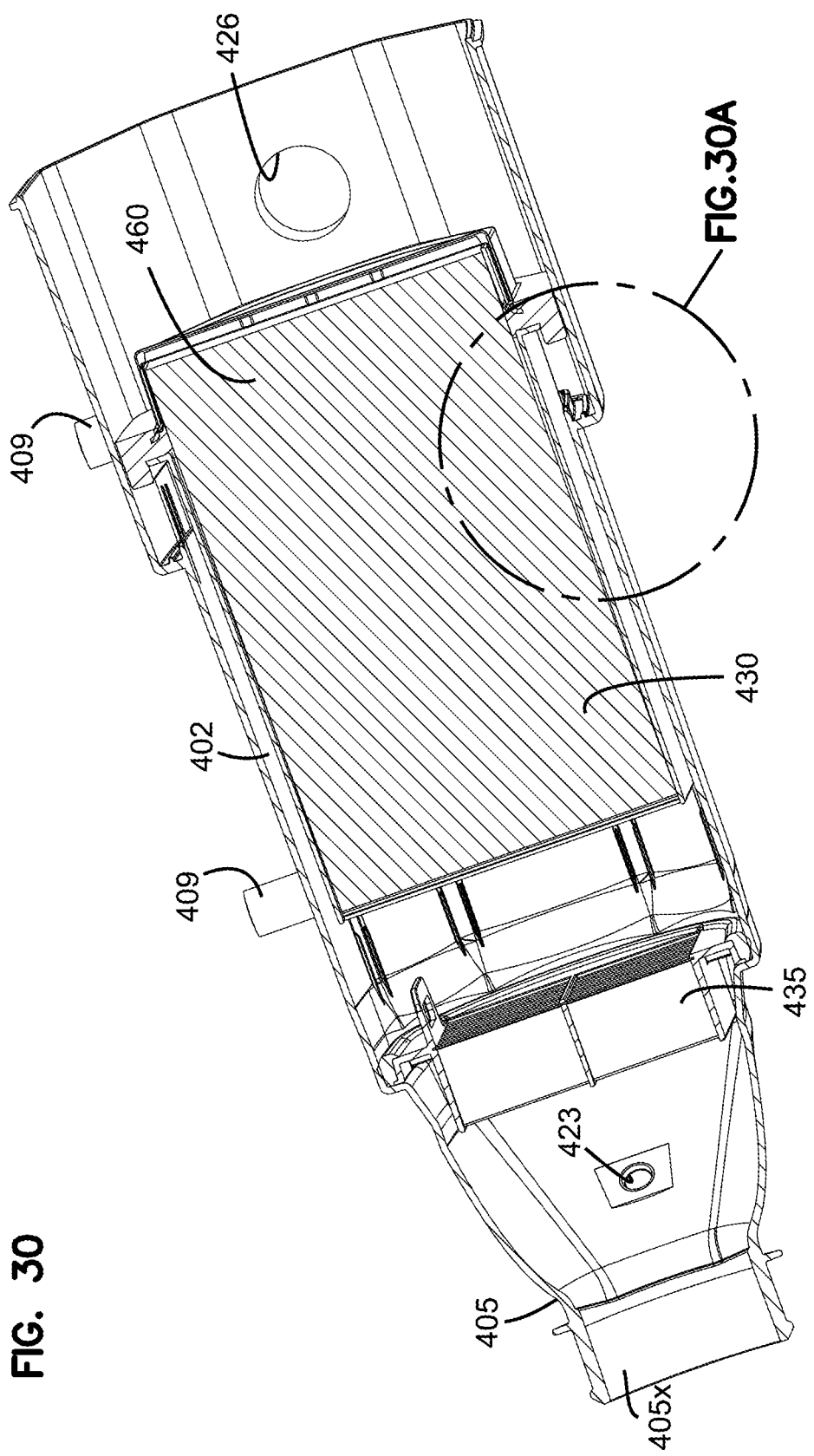

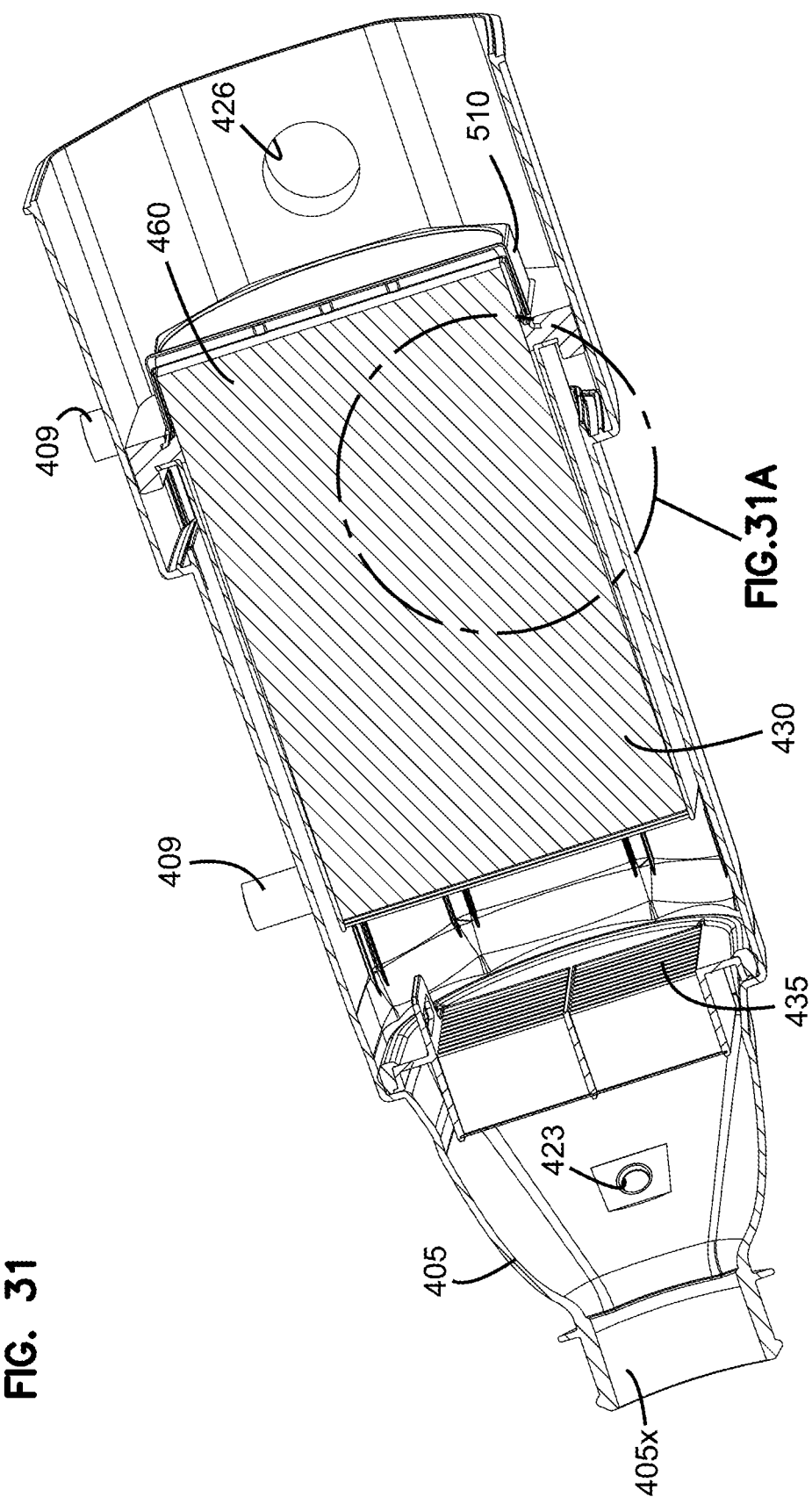

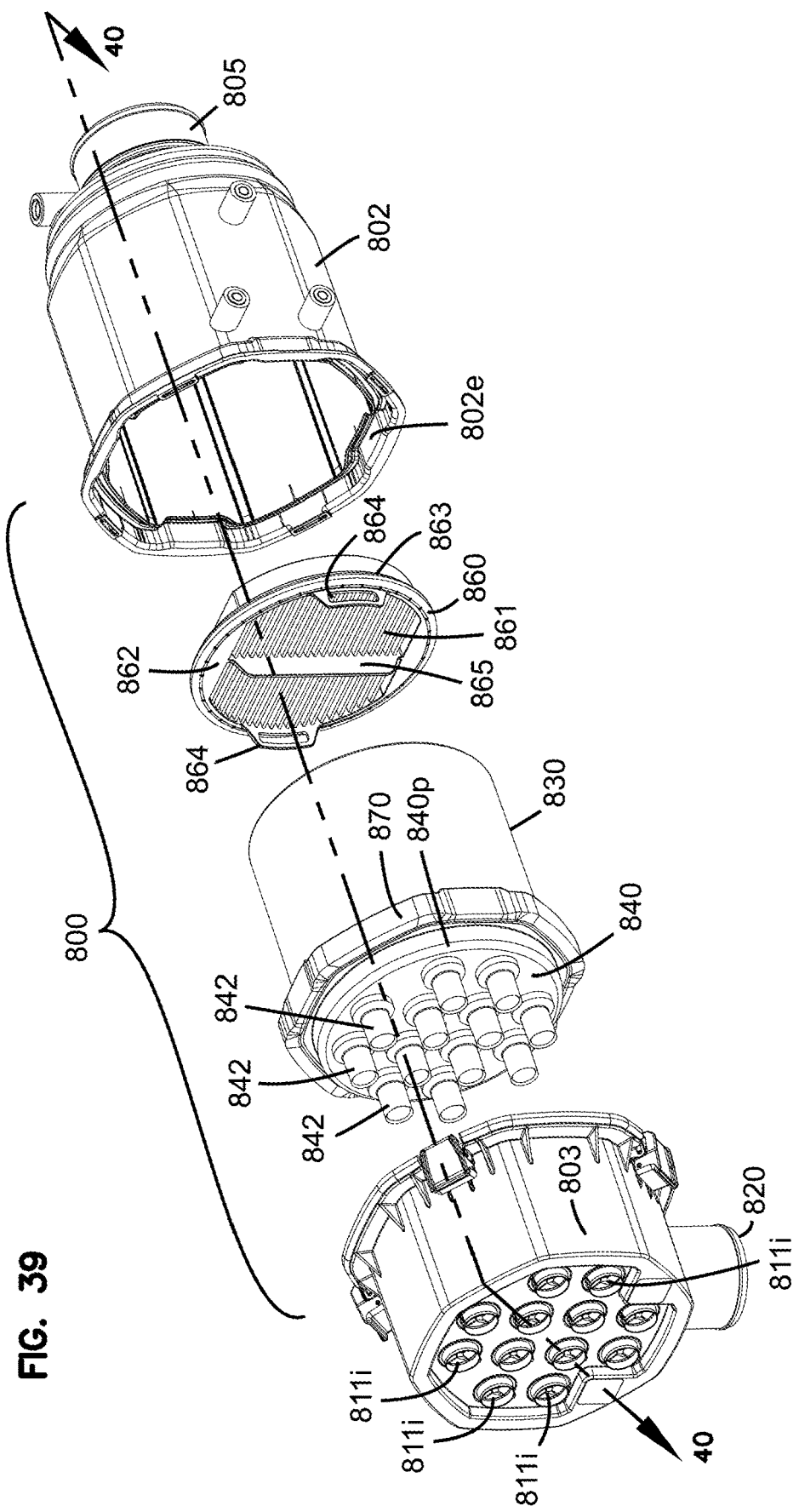

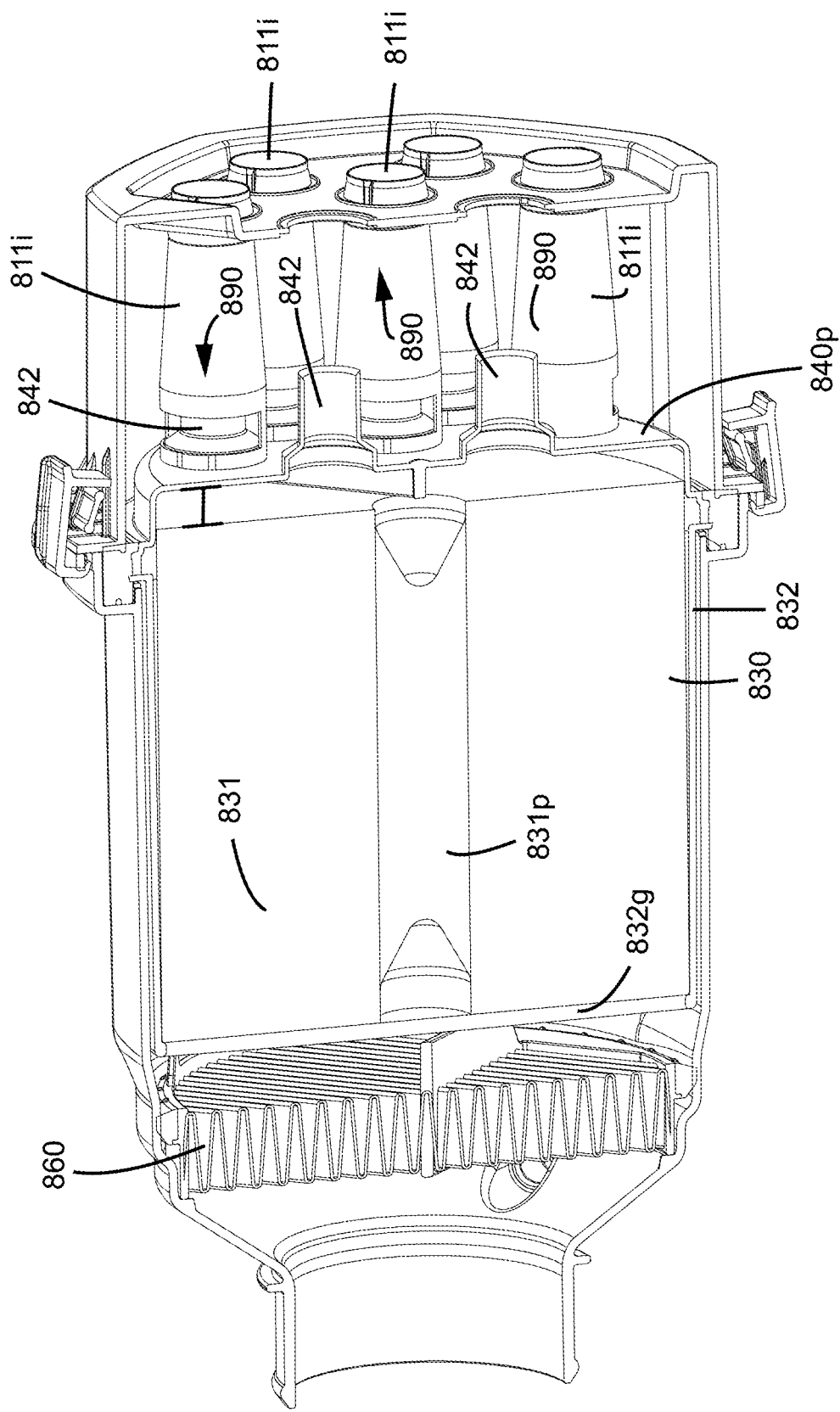

FILTER CARTRIDGES; AIR CLEANER ASSEMBLIES; HOUSINGS; FEATURES; COMPONENTS; AND, METHODS

This application is a continuation of Ser. No. 16/642,768, filed Feb. 27, 2020, now U.S. Pat. No. 11,198,082, which is a national stage of PCT International Patent application No. PCT/US2018/048907, filed Aug. 30, 2018 which claims the benefit of priority to U.S. Provisional patent application Ser. No. 62/552,836, filed Aug. 31, 2017, and U.S. Provisional patent application Ser. No. 62/685,394, filed Jun. 15, 2018, which applications are incorporated herein by reference. To the extent appropriate, a claim of priority is made to each of the above disclosed applications.

FIELD OF THE DISCLOSURE

The present disclosure relates to filter arrangements, typically for use in filtering air; such as intake air for internal combustion engines. The disclosure particularly relates to filter arrangements that involve cartridges having opposite flow ends. Air cleaner arrangements, components, and features; and, methods of assembly and use, are described.

BACKGROUND

Air streams can carry contaminant material such as dust and liquid particulate therein. In many instances, it is desired to filter some or all of the contaminant material from the air stream. For example, air flow streams to engines (for example combustion air streams) for motorized vehicles or for power generation equipment, gas streams to gas turbine systems and air streams to various combustion furnaces, carry particulate contaminant therein that should be filtered. It is preferred, for such systems, that selected contaminant material be removed from (or have its level reduced in) the air.

A variety of air filter arrangements have been developed for such contaminant removal. They typically include a serviceable (i.e. removable and replaceable) main filter cartridge. It is desirable that the main filter cartridge: be easy to service, be of a configuration that is readily and appropriately sealed within an air cleaner assembly in which it is used; and, preferably, be configured, in combination with the air cleaner assembly, such that an inappropriate or unapproved cartridge cannot be readily installed or appear to be installed. Approaches toward this have been developed; see, for example, WO 2014/210541 and WO 2016/105560, incorporated herein by reference. Improvements are sought.

SUMMARY

According to the present disclosure, air cleaner assemblies, components, features, and methods relating thereto, are described. Among the features described are air filter cartridges usable as serviceable filter cartridges in air cleaner assemblies such as, for example, to filter intake air and internal combustion engines.

Features are included which relate to ensuring that the cartridge is an appropriate one for the air cleaner of concern, when used. In certain applications of techniques herein, these features, in part, relate to configuration of a seal arrangement and seal surface of the cartridge. Particular arrangements are shown, in which the filter cartridge includes a seal arrangement having a axial pinch seal surface with a projection/recess contour including at least one projection member thereon.

In some applications of the techniques described, selected features of the present disclosure relate to providing the arrangement with a seal contour projection stabilizing portion at a location to inhibit undesirable seal deformation (typically in perimeter alignment with the portion of the seal pinch arrangement including the first housing engagement projection). Example selected features to facilitate this are provided.

According to an aspect of the present disclosure, modified cartridge features are disclosed that comprise providing an inlet cap on a filter cartridge, which cap includes a separator tube component as a portion of a precleaner arrangement. Such features can be used to advantage with the features characterized above, but can be used independently.

Additional features of air cleaner arrangements and filter cartridges in accord with the above are described. Preferred features and variations are included.

BRIEF DESCRIPTION OF THE DRAWINGS

FIG. 12A is a schematic depiction of another usable fluted sheet/facing sheet combination in accord with the present disclosure.

FIG. 12B is a perspective view of a portion of the usable fluted sheet/facing sheet combination depicted in FIG. 64.

FIG. 17 is a schematic cross-sectional view of the air cleaner assembly taken generally along line 17-17, FIG. 16.

FIG. 21 is a schematic side elevational view of a filter cartridge of FIG. 20.

FIG. 25 is a schematic, exploded, outlet end view of the filter cartridge of FIG. 20.

FIG. 27 is a schematic perspective exploded, cross-sectional, view of selected components of the air cleaner assembly of FIG. 26; the viewpoint being taken generally along line 27-27, FIG. 26.

FIG. 28 is a second schematic, exploded, cross-sectional view analogous to FIG. 27, but taken generally along line 28-28, FIG. 26.

FIG. 29 is an exploded schematic, perspective cross-sectional view analogous to FIG. 27, but taken along line 29-29, FIG. 26.

FIG. 30 is a schematic, exploded, perspective cross-sectional view analogous to FIG. 27, but taken along line 30-30, FIG. 26.

FIG. 31 is a schematic, exploded, perspective cross-sectional view analogous to FIG. 27, but taken generally along line 31-31, FIG. 26.

FIG. 39 is a schematic exploded perspective view of the air cleaner assembly of FIG. 38.

FIG. 40 is a schematic cross-sectional view taken generally along line 40-40, FIG. 39.

DETAILED DESCRIPTION

I. Example Media Configurations, Generally

Figure 1:
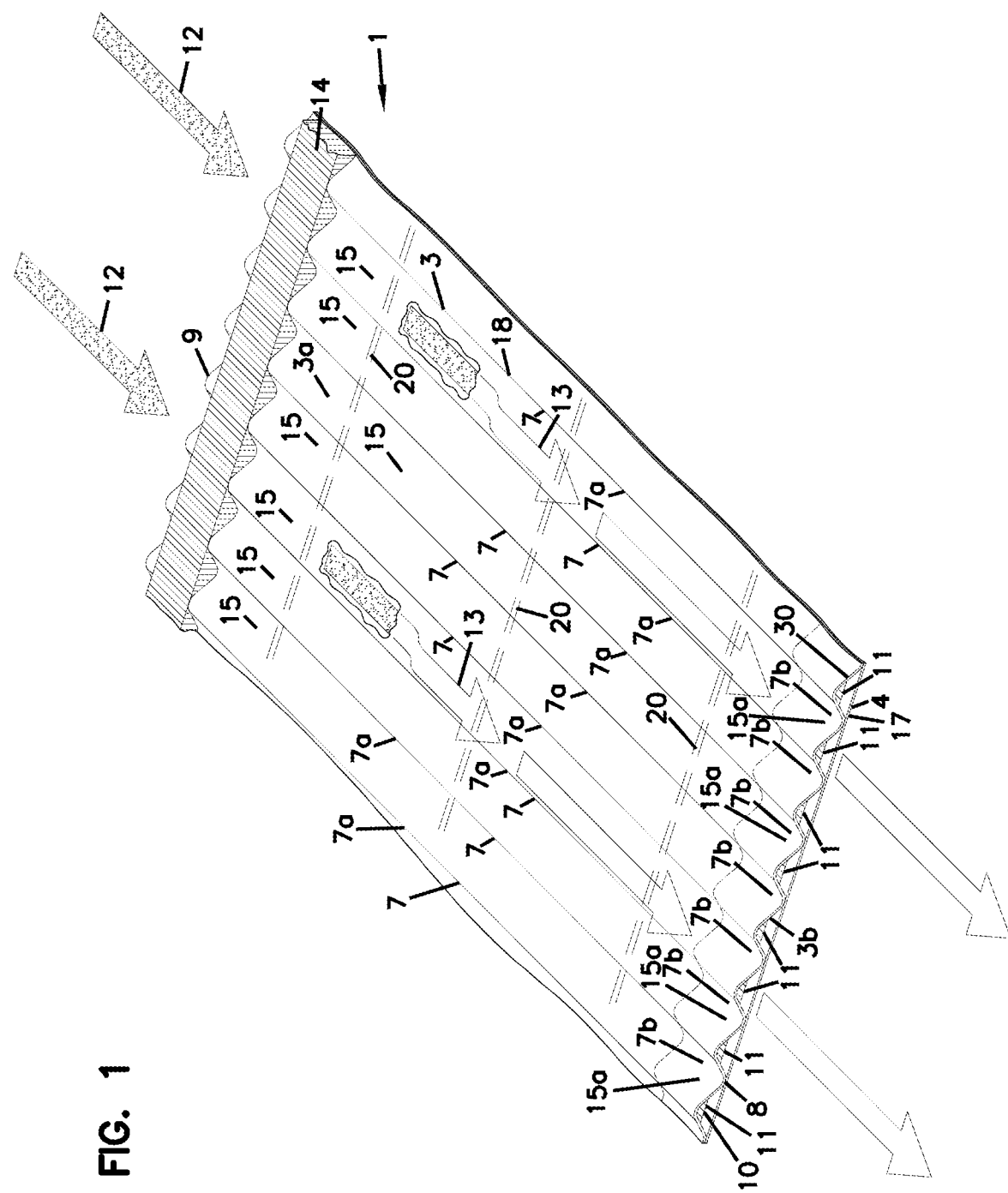
FIG. 1 is a fragmentary, schematic, perspective view of a first example media type useable in arrangements according to the present disclosure.

Principles according to the present disclosure relate to interactions between filter cartridges and air cleaner systems, in advantageous manners to achieve certain, selected, desired results discussed below. The filter cartridge would generally include a filter media therein, through which air and other gases pass, during a filtering operation. The media can be of a variety of types and configurations, and can be made from using a variety of materials. For example, pleated media arrangements can be used in cartridges according to the principles of the present disclosure, as discussed below.

The principles are particularly well adapted for use in situations in which the media is quite deep in extension between the inlet and outlet ends of the cartridge, but alternatives are possible. Also, the principles are often used in cartridges that relatively large cross-dimension sizes. With such arrangements, alternate media types to pleated media will often be desired.

In this section, examples of some media arrangements that are usable with the techniques described herein are provided. It will be understood, however, that a variety of alternate media types can be used. The choice of media type is generally one of preference for: availability; function in a given situation of application, ease of manufacturability, etc. and the choice is not necessarily specifically related to the overall function of selected ones of various filter cartridge/ air cleaner interaction features characterized herein.

A. Media Pack Arrangements Using Filter Media Having Media Ridges (Flutes) Secured to Facing Media Fluted filter media (media having media ridges) can be used to provide fluid filter constructions in a variety of manners. One well known manner is characterized herein as a z-filter construction. The term "z-filter construction" as used herein, is meant to include (but not be limited) a type of filter construction in which individual ones of corrugated, folded or otherwise formed filter flutes are used to define (typically in combination with facing media) sets of longitudinal, typically parallel, inlet and outlet filter flutes for fluid flow through the media. Some examples of z-filter media are provided in U.S. Pat. Nos. 5,820,646; 5,772,883; 5,902,364; 5,792,247; 5,895,574; 6,210,469; 6,190,432; 6,350,291; 6,179,890; 6,235,195; Des. 399,944; Des. 428, 128; Des. 396,098; Des. 398,046; Des. 437,401; WO 2014/ 210541; WO 2016/105560; and, WO 2016/141097; each of these cited references being incorporated herein by reference.

One type of z-filter media, utilizes two specific media components joined together, to form the media construction. The two components are: (1) a fluted (typically corrugated) media sheet or sheet section, and, (2) a facing media sheet or sheet section. The facing media sheet is typically non-corrugated, however it can be corrugated, for example perpendicularly to the flute direction as described in U.S. provisional 60/543,804, filed Feb. 11, 2004, and published as PCT WO 05/077487 on Aug. 25, 2005, incorporated herein by reference.

The fluted media section and facing media section can comprise separate materials between one another. However, they can also be sections of the single media sheet folded to bring the facing media material into appropriate juxtaposition with the fluted media portion of the media.

The fluted (typically corrugated) media sheet and the facing media sheet or sheet section together, are typically used to define media having parallel flutes. In some instances, the fluted sheet and facing sheet are separate and then secured together and are then coiled, as a media strip, to form a z-filter media construction. Such arrangements are described, for example, in U.S. Pat. Nos. 6,235,195 and 6,179,890, each of which is incorporated herein by reference. In certain other arrangements, some non-coiled sections or strips of fluted (typically corrugated) media secured to facing media, are stacked with one another, to create a filter construction. An example of this is described in FIG. 11 of U.S. Pat. No. 5,820,646, incorporated herein by reference.

Herein, strips of material comprising fluted sheet (sheet of media with ridges) secured to corrugated sheet, which are then assembled into stacks to form media packs, are sometimes referred to as "single facer strips," "single faced strips," or as "single facer" or "single faced" media. The terms and variants thereof, are meant to refer to a fact that one face, i.e., a single face, of the fluted (typically corrugated) sheet is faced by the facing sheet, in each strip.

Typically, coiling of a strip of the fluted sheet/facing sheet (i.e., single facer) combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, now published as WO 04/082795, each of which is incorporated herein by reference. The resulting coiled arrangement generally has, as the outer surface of the media pack, a portion of the facing sheet, as a result.

The term "corrugated" used herein to refer to structure in media, is often used to refer to a flute structure resulting from passing the media between two corrugation rollers, i.e., into a nip or bite between two rollers, each of which has surface features appropriate to cause corrugations in the resulting media. The term "corrugation" is however, not meant to be limited to such flutes, unless it is stated that they result from flutes that are by techniques involving passage of media into a bite between corrugation rollers. The term "corrugated" is meant to apply even if the media is further modified or deformed after corrugation, for example by the folding techniques described in PCT WO 04/007054, and published Jan. 22, 2004, incorporated herein by reference.

Corrugated media is a specific form of fluted media. Fluted media is media which has individual flutes or ridges (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements or cartridges generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner. In some instances, each of the inlet flow end (or face) and outlet flow end (or face) will be generally flat or planar, with the two parallel to one another. However, variations from this, for example non-planar faces, are possible.

A straight through flow configuration (especially for a coiled or stacked media pack) is, for example, in contrast to serviceable filter cartridges such as cylindrical pleated filter cartridges of the type shown in U.S. Pat. No. 6,039,778, incorporated herein by reference, in which the flow generally makes a substantial turn as its passes into and out of the media. That is, in a U.S. Pat. No. 6,039,778 filter, the flow enters the cylindrical filter cartridge through a cylindrical side, and then turns to exit through an open end of the media (in forward-flow systems). In a typical reverse-flow system, the flow enters the serviceable cylindrical cartridge through an open end of the media and then turns to exit through a side of the cylindrical filter media. An example of such a reverse-flow system is shown in U.S. Pat. No. 5,613,992, incorporated by reference herein.

The term "z-filter media construction" and variants thereof as used herein, without more, is meant to include, but not necessarily be limited to, any or all of: a web of corrugated or otherwise fluted media (media having media ridges) secured to (facing) media, whether the sheets are separate or part of a single web, with appropriate sealing (closure) to allow for definition of inlet and outlet flutes; and/or a media pack constructed or formed from such media into a three dimensional network of inlet and outlet flutes; and/or, a filter cartridge or construction including such a media pack.

In FIG. 1, an example of media 1 useable in z-filter media construction is shown. The media 1 is formed from a fluted, in this instance corrugated, sheet 3 and a facing sheet 4. A construction such as media 1 is referred to herein as a single facer or single faced strip.

Sometimes, the corrugated fluted or ridged sheet 3, FIG. 1, is of a type generally characterized herein as having a regular, curved, wave pattern of flutes, ridges or corrugations 7. The term "wave pattern" in this context, is meant to refer to a flute, ridge or corrugated pattern of alternating troughs 7b and ridges 7a. The term "regular" in this context is meant to refer to the fact that the pairs of troughs and ridges (7b, 7a) alternate with generally the same repeating corrugation (flute or ridge) shape and size. (Also, typically in a regular configuration each trough 7b is substantially an inverse ridge for each ridge 7a.) The term "regular" is thus meant to indicate that the corrugation (or flute) pattern comprises troughs (inverted ridges) and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, in certain instances the corrugation pattern is not the result of a folded or creased shape provided to the media, but rather the apex 7a of each ridge and the bottom 7b of each trough is formed along a radiused curve. A typical radius for such z-filter media would be at least 0.25 mm and typically would be not more than 3 mm.

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, wave pattern fluted (in this instance corrugated) sheet 3 shown in FIG. 1, is that the individual corrugations, ridges or flutes are generally straight, although alternatives are possible. By "straight" in this context, it is meant that through at least 70%, typically at least 80% of the length, the ridges 7a and troughs (or inverted ridges) 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is formed into a media pack, in general edge 9 will form an inlet end or face for the media pack and edge 8 an outlet end or face, although an opposite orientation is possible.

In the example depicted, the various flutes 7 extend completely between the opposite edges 8, 9, but alternatives are possible. For example, they can extend to a location adjacent or near the edges, but not completely therethrough. Also, they can be stopped and started partway through the media, as for example in the media of US 2014/0208705 A1, incorporated herein by reference.

When the media is as depicted in FIG. 1, adjacent edge 8 can provided a sealant bead 10, sealing the corrugated sheet 3 and the facing sheet 4 together. Bead 10 will sometimes be referred to as a "single facer" or "single face" bead, or by variants, since it is a bead between the corrugated sheet 3 and facing sheet 4, which forms the single facer (single faced) media strip 1. Sealant bead 10 seals closed individual flutes 11 adjacent edge 8, to passage of air therefrom (or thereto in an opposite flow).

In the media depicted in FIG. 1, adjacent edge 9 is provided seal bead 14. Seal bead 14 generally closes flutes 15 to passage of unfiltered fluid therefrom (or flow therein in an opposite flow), adjacent edge 9. Bead 14 would typically be applied as media 1 is configured into a media pack. If the media pack is made from a stack of strips 1, bead 14 will form a seal between a back side 17 of facing sheet 4, and side 18 of the next adjacent corrugated sheet 3. When the media 1 is cut in strips and stacked, instead of coiled, bead 14 is referenced as a "stacking bead." (When bead 14 is used in a coiled arrangement formed from a long strip of media 1, it may be referenced as a "winding bead.").

In alternate types of through-flow media, seal material can be located differently, and added sealant or adhesive can even be avoided. For example, in some instances, the media can be folded to form an end or edge seam; or, the media can be sealed closed by alternate techniques such as ultrasound application, etc. Further, even when sealant material is used, it need not be adjacent opposite ends.

Referring to FIG. 1, once the filter media 1 is incorporated into a media pack, for example by stacking or coiling, it can be operated as follows. First, air in the direction of arrows 12, would enter open flutes 11 adjacent end 9. Due to the closure at end 8, by bead 10, the air would pass through the filter media 1, for example as shown by arrows 13. It could then exit the media or media pack, by passage through open ends 15a of the flutes 15, adjacent end 8 of the media pack. Of course operation could be conducted with air flow in the opposite direction.

For the particular arrangement shown herein in FIG. 1, the parallel corrugations 7a, 7b are generally straight completely across the media, from edge 8 to edge 9. Straight flutes, ridges or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown. Also, flutes which are modified in shape to include various ridges are known.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

Typically, in the corrugation process, an inelastic deformation is caused to the media. This prevents the media from returning to its original shape. However, once the tension is released the flute or corrugations will tend to spring back, recovering only a portion of the stretch and bending that has occurred. The facing media sheet is sometimes tacked to the fluted media sheet, to inhibit this spring back in the corrugated sheet. Such tacking is shown at 20.

Also, typically, the media contains a resin. During the corrugation process, the media can be heated to above the glass transition point of the resin. When the resin then cools, it will help to maintain the fluted shapes.

The media of the corrugated (fluted) sheet 3 facing sheet 4 or both, can be provided with a fine fiber material on one or both sides thereof, for example in accord with U.S. Pat. No. 6,673,136, incorporated herein by reference. In some instances, when such fine fiber material is used, it may be desirable to provide the fine fiber on the upstream side of the material and inside the flutes. When this occurs, air flow, during filtering, will typically be into the edge comprising the stacking bead.

An issue with respect to z-filter constructions relates to closing of the individual flute ends. Although alternatives are possible, typically a sealant or adhesive is provided, to accomplish the closure. As is apparent from the discussion above, in typical z-filter media especially that which uses straight flutes as opposed to tapered flutes and sealant for flute seals, large sealant surface areas (and volume) at both the upstream end and the downstream end are needed. High quality seals at these locations are important to proper operation of the media structure that results. The high sealant volume and area, creates issues with respect to this.

Figure 2:
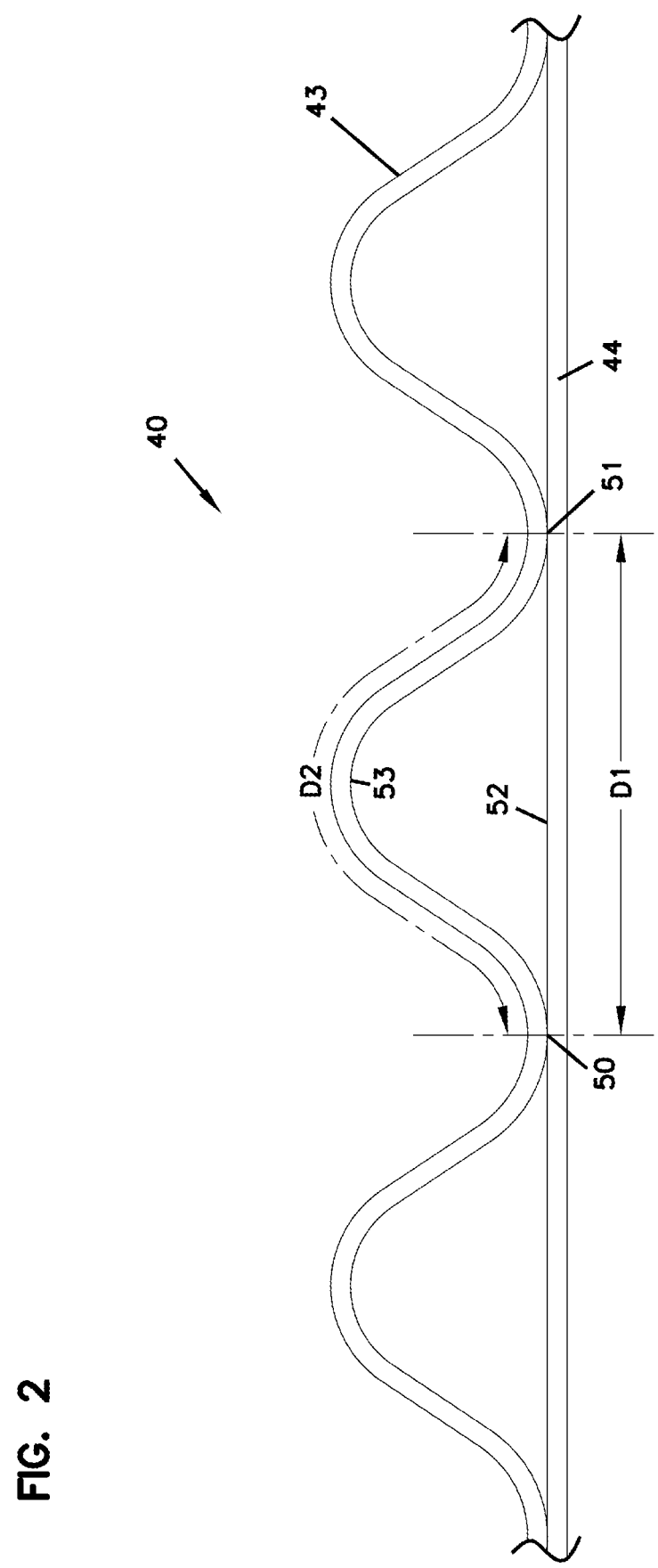
FIG. 2 is an enlarged, schematic, cross-sectional view of a portion of the media type depicted in FIG. 1.

Attention is now directed to FIG. 2, in which z-filter media; i.e., a z-filter media construction 40, utilizing a regular, curved, wave pattern corrugated sheet 43, and a non-corrugated flat sheet 44, i.e., a single facer strip is schematically depicted. The distance D1, between points 50 and 51, defines the extension of flat media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will often be at least 1.2 times D1. Typically, D2 would be within a range of 1.2-2.0 times D1, inclusive. One particularly convenient arrangement for air filters has a configuration in which D2 is about 1.25-1.35×D1. Such media has, for example, been used commercially in Donaldson Powercore™ Z-filter arrangements. Another potentially convenient size would be one in which D2 is about 1.4-1.6 times D1. Herein the ratio D2/D1 will sometimes be characterized as the flute/flat ratio or media draw for the corrugated media.

Figure 3:
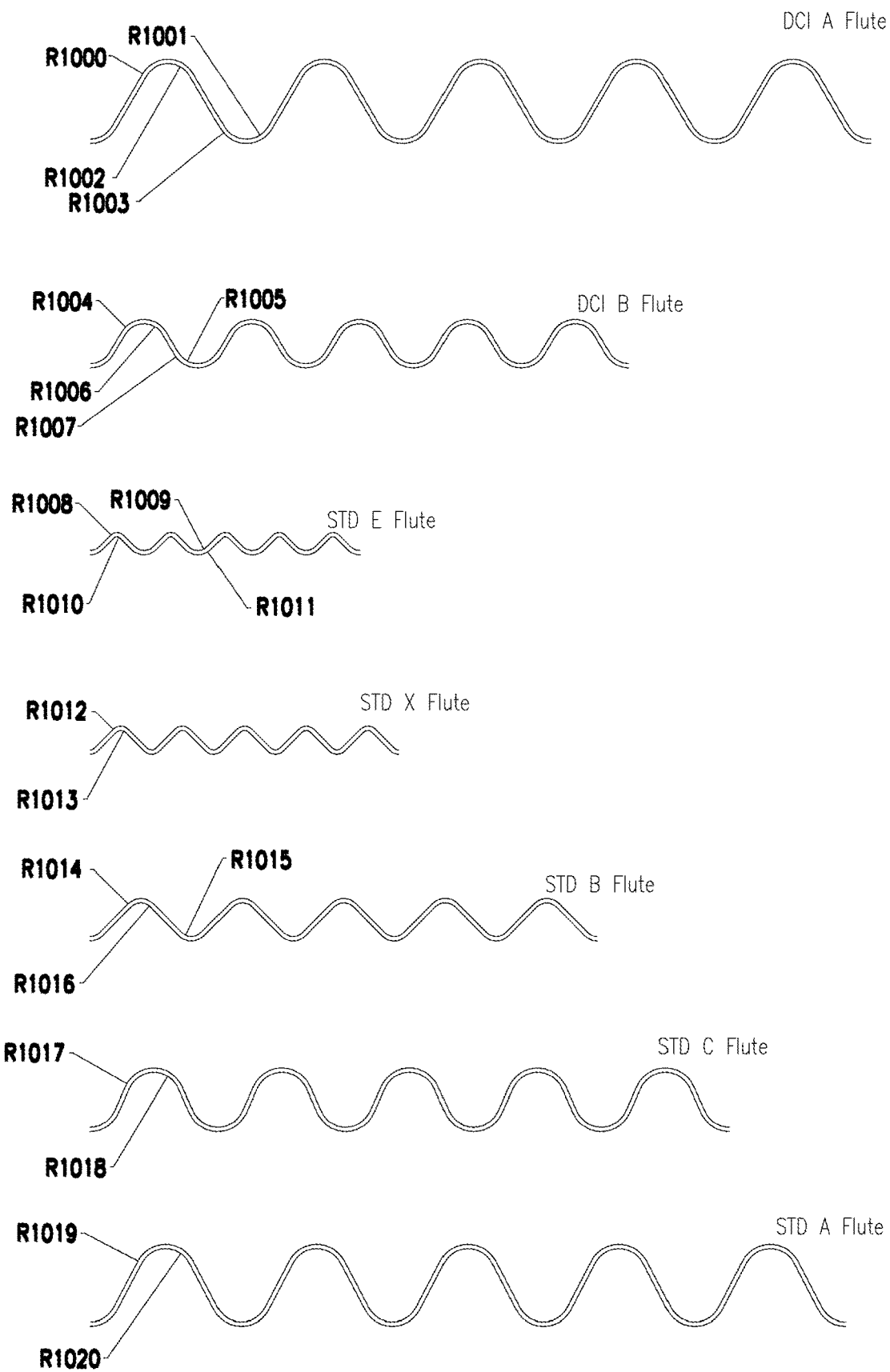
FIG. 3 includes schematic views of examples of various fluted media definitions, for media of the type of FIGS. 1 and 2.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

| | |
|---|---|
| DCI A Flute: | Flute/flat = 1.52:1; The Radii (R) are as follows:<br>R1000 = .0675 inch (1.715 mm); R1001 = .0581 inch (1.476 mm);<br>R1002 = .0575 inch (1.461 mm); R1003 = .0681 inch (1.730 mm); |
| DCI B Flute: | Flute/flat = 1.32:1; The Radii (R) are as follows:<br>R1004 = .0600 inch (1.524 mm); R1005 = .0520 inch (1.321 mm);<br>R1006 = .0500 inch (1.270 mm); R1007 = .0620 inch (1.575 mm); |
| Std. E Flute: | Flute/flat = 1.24:1; The Radii (R) are as follows:<br>R1008 = .0200 inch (.508 mm); R1009 = .0300 inch (.762 mm);<br>R1010 = .0100 inch (.254 mm); R1011 = .0400 inch (1.016 mm); |
| Std. X Flute: | Flute/flat = 1.29:1; The Radii (R) are as follows:<br>R1012 = .0250 inch (.635 mm); R1013 = .0150 inch (.381 mm); |
| Std. B Flute: | Flute/flat = 1.29:1; The Radii (R) are as follows:<br>R1014 = .0410 inch (1.041 mm); R1015 = .0310 inch (.7874 mm);<br>R1016 = .0310 inch (.7874 mm); |
| Std. C Flute: | Flute/flat = 1.46:1; The Radii (R) are as follows:<br>R1017 = .0720 inch (1.829 mm); R1018 = .0620 inch (1.575 mm); |
| Std. A Flute: | Flute/flat = 1.53:1; The Radii (R) are as follows:<br>R1019 = .0720 inch (1.829 mm); R1020 = .0620 inch (1.575 mm). |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

It is noted that alternative flute definitions such as those characterized in U.S. Ser. No. 12/215,718, filed Jun. 26, 2008; and published as US 2009/0127211; U.S. Ser. No. 12/012,785, filed Feb. 4, 2008 and published as US 2008/0282890; and/or U.S. Ser. No. 12/537,069 published as US 2010/0032365 can be used, with air cleaner features as characterized herein below. The complete disclosures of each of US 2009/0127211, US 2008/0282890 and US 2010/0032365 are incorporated herein by reference.

Another media variation comprising fluted media with facing media secured thereto, can be used in arrangements according to the present disclosure, in either a stacked or coiled form, is described in US 2014/0208705 A1, owned by Baldwin Filters, Inc., published Jul. 31, 2014, and incorporated herein by reference.

B. Manufacture of Media Pack Configurations Including the Media of FIGS. 1-3, See FIGS. 4-7

Figure 4:
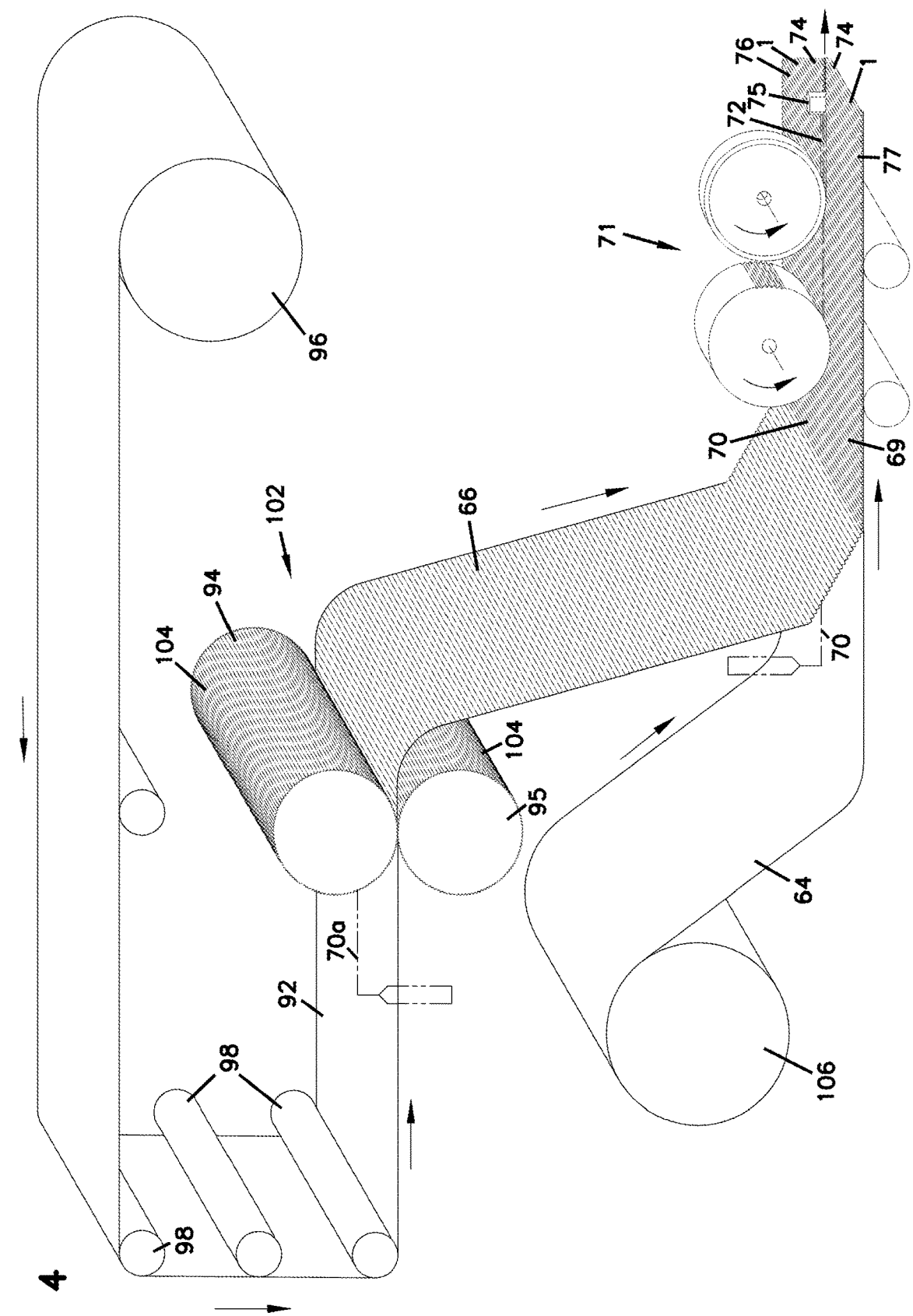
FIG. 4 is a schematic view of an example process for manufacturing media of the type of FIGS. 1-3.

In FIG. 4, one example of a manufacturing process for making a media strip (single facer) corresponding to strip 1, FIG. 1 is shown. In general, facing sheet 64 and the fluted (corrugated) sheet 66 having flutes 68 are brought together to form a media web 69, with an adhesive bead located therebetween at 70. The adhesive bead 70 will form a single facer bead 10, FIG. 1. An optional darting process occurs at station 71 to form center darted section 72 located mid-web. The z-filter media or Z-media strip 74 can be cut or slit at 75 along the bead 70 to create two pieces or strips 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 and eventually slit at 75, it must be formed. In the schematic shown in FIG. 4, this is done by passing a sheet of filter media 92 through a pair of corrugation rollers 94, 95. In the schematic shown in FIG. 4, the sheet of filter media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the sheet 92 becomes corrugated across the machine direction and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 would typically be secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

Of course the equipment of FIG. 4 can be modified to provide for the tack beads 20, FIG. 1, if desired.

The type of corrugation provided to the corrugated media is a matter of choice, and will be dictated by the corrugation or corrugation teeth of the corrugation rollers 94, 95. One useful corrugation pattern will be a regular curved wave pattern corrugation, of straight flutes or ridges, as defined herein above. A typical regular curved wave pattern used, would be one in which the distance D2, as defined above, in a corrugated pattern is at least 1.2 times the distance D1 as defined above. In example applications, typically D2=1.25-1.35×D1, although alternatives are possible. In some instances the techniques may be applied with curved wave patterns that are not "regular," including, for example, ones that do not use straight flutes. Also, variations from the curved wave patterns shown, are possible.

Figure 5:
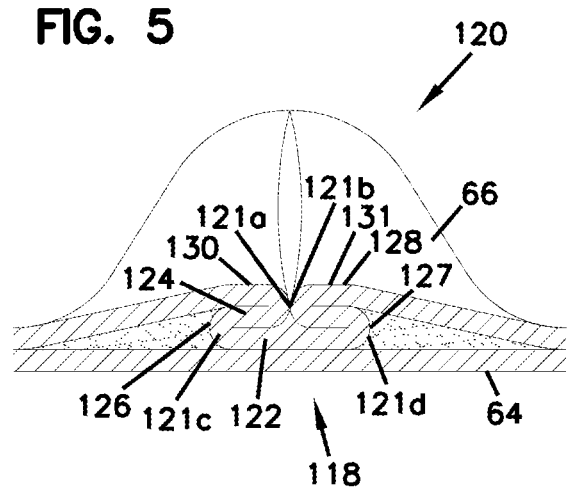
FIG. 5 is a schematic cross-sectional view of an optional end dart for media flutes of the type of FIGS. 1-4.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121a, 121b, 121c, 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Techniques for coiling the media, with application of the winding bead, are described in PCT application US 04/07927, filed Mar. 17, 2004 and published as WO 04/082795 and incorporated herein by reference.

Alternate approaches to darting the fluted ends closed are possible. Such approaches can involve, for example: darting which is not centered in each flute; and, rolling, pressing or folding over the various flutes. In general, darting involves folding or otherwise manipulating media adjacent to fluted end, to accomplish a compressed, closed, state.

Techniques described herein are particularly well adapted for use in media packs that result from a step of coiling a single sheet comprising a corrugated sheet/facing sheet combination, i.e., a "single facer" strip. However, they can also be made into stacked arrangements.

Coiled media or media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media or media pack. Typical shapes are circular as described in PCT WO 04/007054. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054, and PCT application US 04/07927, published as WO 04/082795, each of which is incorporated herein by reference.

Another way of describing the peripheral or perimeter shape is by defining the perimeter resulting from taking a cross-section through the media pack in a direction orthogonal to the winding access of the coil.

Opposite flow ends or flow faces of the media or media pack can be provided with a variety of different definitions. In many arrangements, the ends or end faces are generally flat (planer) and perpendicular to one another. In other arrangements, one or both of the end faces include tapered, for example, stepped, portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

Figure 6:
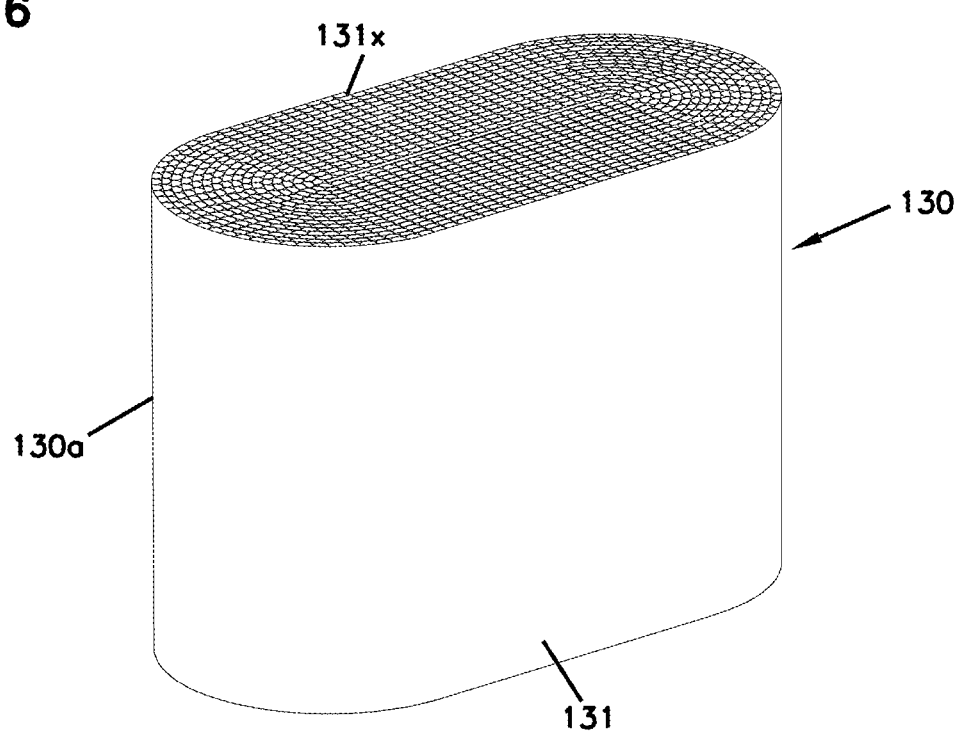
FIG. 6 is a schematic perspective view of a coiled filter arrangement usable in a filter cartridge having features in accord with the present disclosure, and made with a strip of media for example in accord with FIG. 1.

In FIG. 6, a coiled media pack (or coiled media) 130 constructed by coiling a single strip of single faced media is depicted, generally. The particular coiled media pack depicted is an oval media pack 130*a*, specifically a racetrack shaped media pack 131. The tail end of the media, at the outside of the media pack 130 is shown at 131*x*. It will be typical to terminate that tail end along straight section of the media pack 130 for convenience and sealing. Typically, a hot melt seal bead or seal bead is positioned along that tail end to ensure sealing. In the media pack 130, the opposite flow (end) faces are designated at 132, 133. One would be an inlet flow face, the other an outlet flow face.

Figure 7:
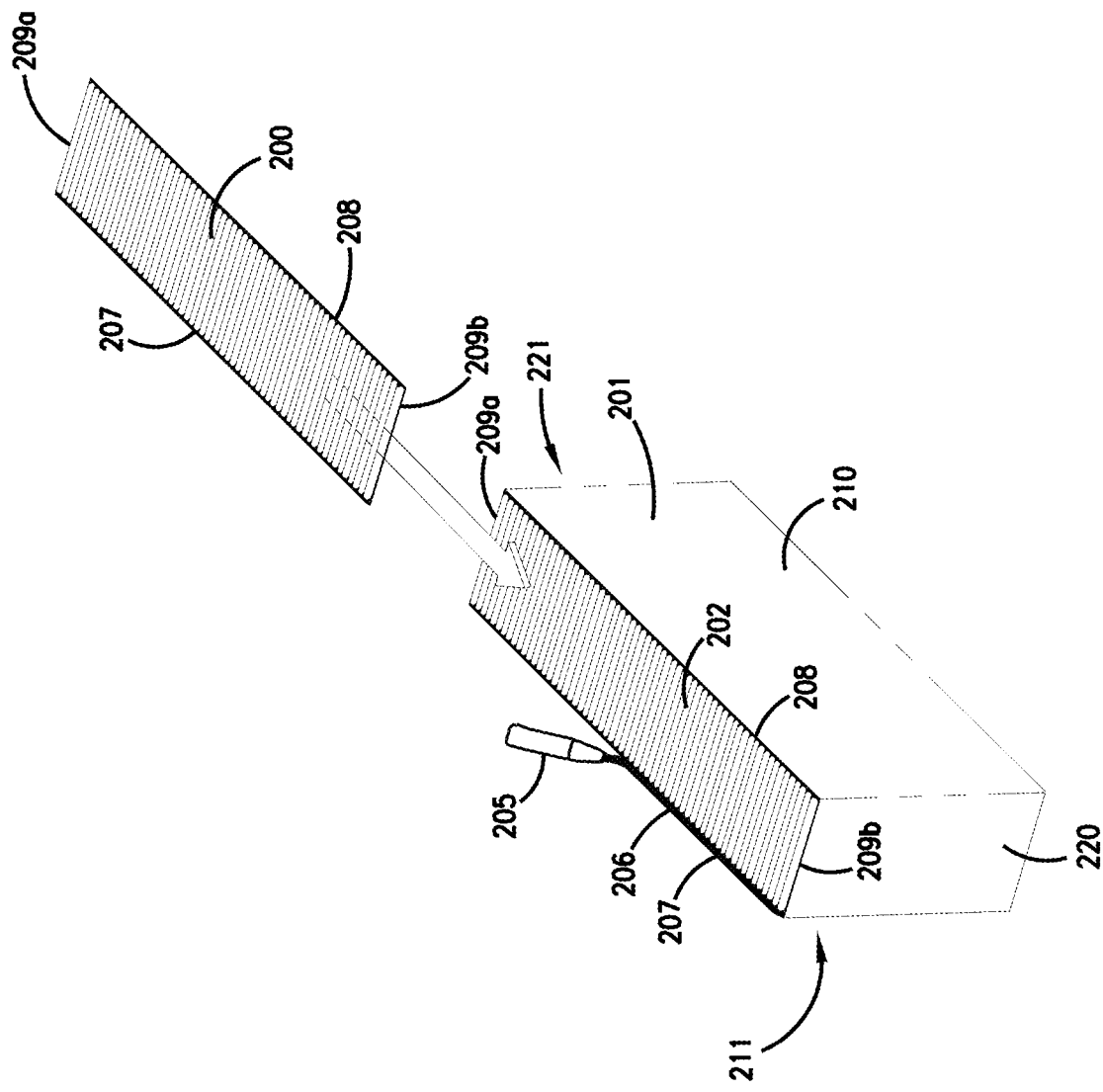
FIG. 7 is a schematic perspective view of a stacked media pack arrangement usable in a filter arrangement having selected features in accord with the present disclosure and made from a strip of media for example in accord with FIG. 1.

In FIG. 7, there is (schematically) shown a step of forming stacked z-filter media (or media pack) from strips of z-filter media, each strip being a fluted sheet secured to a facing sheet. Referring to FIG. 6, single facer strip 200 is being shown added to a stack 201 of strips 202 analogous to strip 200. Strip 200 can be cut from either of strips 76, 77, FIG. 4. At 205, FIG. 6, application of a stacking bead 206 is shown, between each layer corresponding to a strip 200, 202 at an opposite edge from the single facer bead or seal. (Stacking can also be done with each layer being added to the bottom of the stack, as opposed to the top.)

Referring to FIG. 7, each strip 200, 202 has front and rear edges 207, 208 and opposite side edges 209*a*, 209*b*. Inlet and outlet flutes of the corrugated sheet/facing sheet combination comprising each strip 200, 202 generally extend between the front and rear edges 207, 208, and parallel to side edges 209*a*, 209*b*.

Still referring to FIG. 7, in the media or media pack 201 being formed, opposite flow faces are indicated at 210, 211. The selection of which one of faces 210, 211 is the inlet end face and which is the outlet end face, during filtering, is a matter of choice. In some instances the stacking bead 206 is positioned adjacent the upstream or inlet face 211; in others the opposite is true. The flow faces 210, 211, extend between opposite side faces 220, 221.

The stacked media configuration or pack 201 shown being formed in FIG. 7, is sometimes referred to herein as a "blocked" stacked media pack. The term "blocked" in this context, is an indication that the arrangement is formed to a rectangular block in which all faces are 90° relative to all adjoining wall faces. For example, in some instances the stack can be created with each strip 200 being slightly offset from alignment with an adjacent strip, to create a parallelogram or slanted block shape, with the inlet face and outlet face parallel to one another, but not perpendicular to upper and bottom surfaces.

In some instances, the media or media pack will be referenced as having a parallelogram shape in any cross-section, meaning that any two opposite side faces extend generally parallel to one another.

It is noted that a blocked, stacked arrangement corresponding to FIG. 7 is described in the prior art of U.S. Pat. No. 5,820,646, incorporated herein by reference. It is also noted that stacked arrangements are described in U.S. Pat. Nos. 5,772,883; 5,792,247; U.S. Provisional 60/457,255 filed Mar. 25, 2003; and U.S. Ser. No. 10/731,564 filed Dec. 8, 2003 and published as 2004/0187689. Each of these latter references is incorporated herein by reference. It is noted that a stacked arrangement shown in U.S. Ser. No. 10/731, 504, published as 2005/0130508 is a slanted stacked arrangement.

It is also noted that, in some instances, more than one stack can be incorporated into a single media pack. Also, in some instances, the stack can be generated with one or more flow faces that have a recess therein, for example, as shown in U.S. Pat. No. 7,625,419 incorporated herein by reference.

Figure 8:
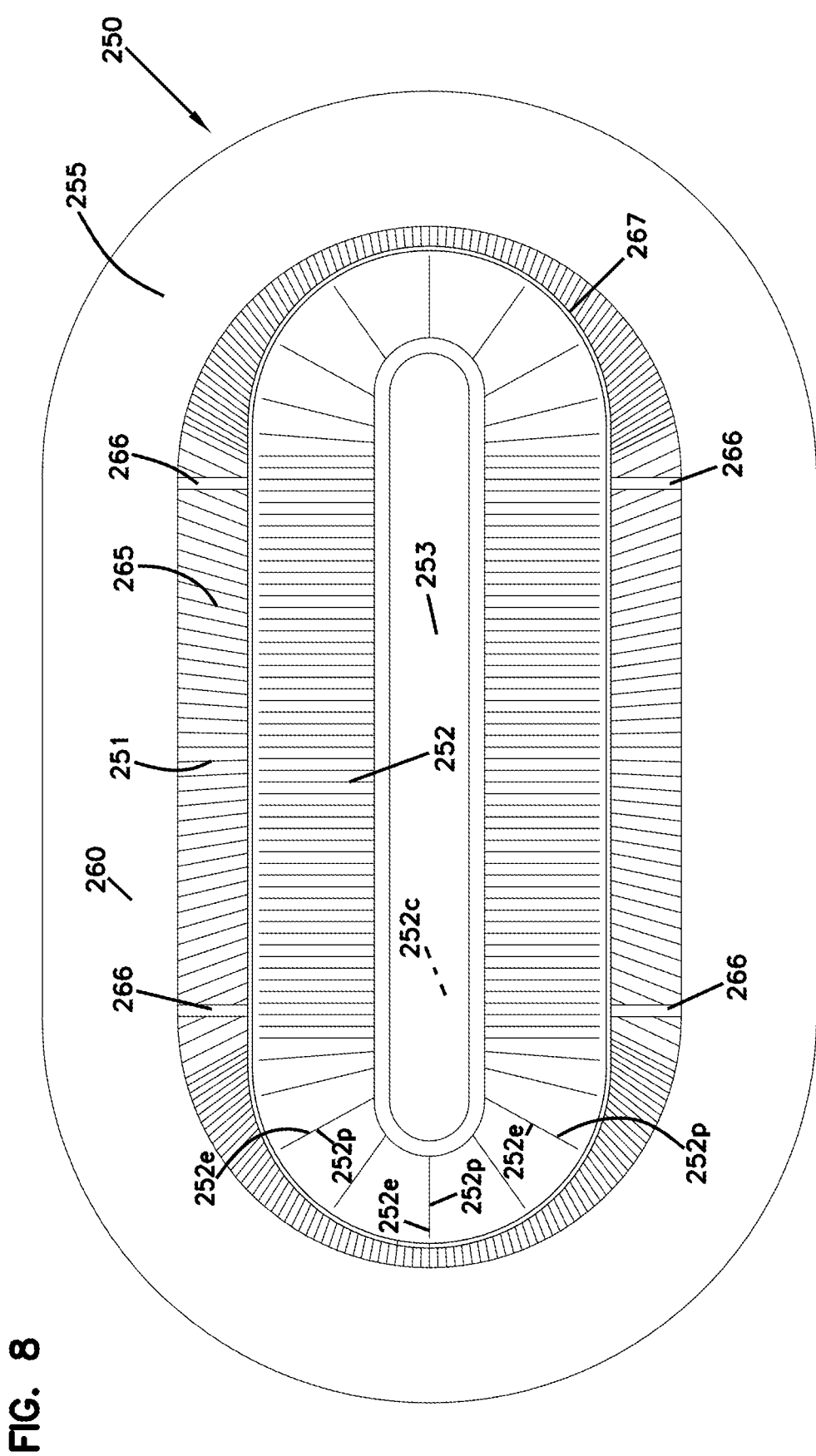
FIG. 8 is a schematic flow end view of a filter media pack using an alternate media to the media of FIG. 1, and alternately usable in selected filter cartridges in accord with the present disclosure.

C. Selected Media or Media Pack Arrangements Comprising Multiple Spaced Coils of Fluted Media; FIGS. 8-8B

Alternate types of media arrangements or packs that involve flutes between opposite ends extending between can be used with selected principles according to the present disclosure. An example of such alternate media arrangement or pack is depicted in FIGS. 8-8B. The media of FIGS. 8-8B is analogous to one depicted and described in DE 20 2008

017 059 U1; and as can sometimes found in arrangements available under the mark "IQORON" from Mann & Hummel.

Referring to FIG. 8, the media or media pack is indicated generally at 250. The media or media pack 250 comprises a first outer pleated (ridged) media loop 251 and a second, inner, pleated (ridged) media loop 252, each with pleat tips (or ridges) extending between opposite flow ends. The view of FIG. 8 is toward a media pack (flow) end 255. The end 255 depicted, can be an inlet (flow) end or an outlet (flow) end, depending on selected flow direction. For many arrangements using principles characterized having the media pack 250 would be configured in a filter cartridge such that end 255 is an inlet flow end.

Still referring to FIG. 8, the outer pleated (ridged) media loop 251 is configured in an oval shape, though alternatives are possible. At 260, a pleat end closure, for example molded in place, is depicted closing ends of the pleats or ridges 251 at media pack end 255.

Pleats, or ridges 252 (and the related pleat tips) are positioned surrounded by and spaced from loop 251, and thus pleated media loop 252 is also depicted in a somewhat oval configuration. In this instance, ends 252e of individual pleats or ridges 252p in a loop 252 are sealed closed. Also, loop 252 surrounds the center 252c that is closed by a center strip 253 of material, typically molded-in-place.

During filtering, when end 255 is an inlet flow end, air enters gap 265 between the two loops of media 251, 252. The air then flows either through loop 251 or loop 252, as it moves through the media pack 250, with filtering.

In the example depicted, loop 251 is configured slanting inwardly toward loop 252, in extension away from end 255. Also spacers 266 are shown supporting a centering ring 267 that surrounds an end of the loop 252, for structural integrity.

Figure 8A:
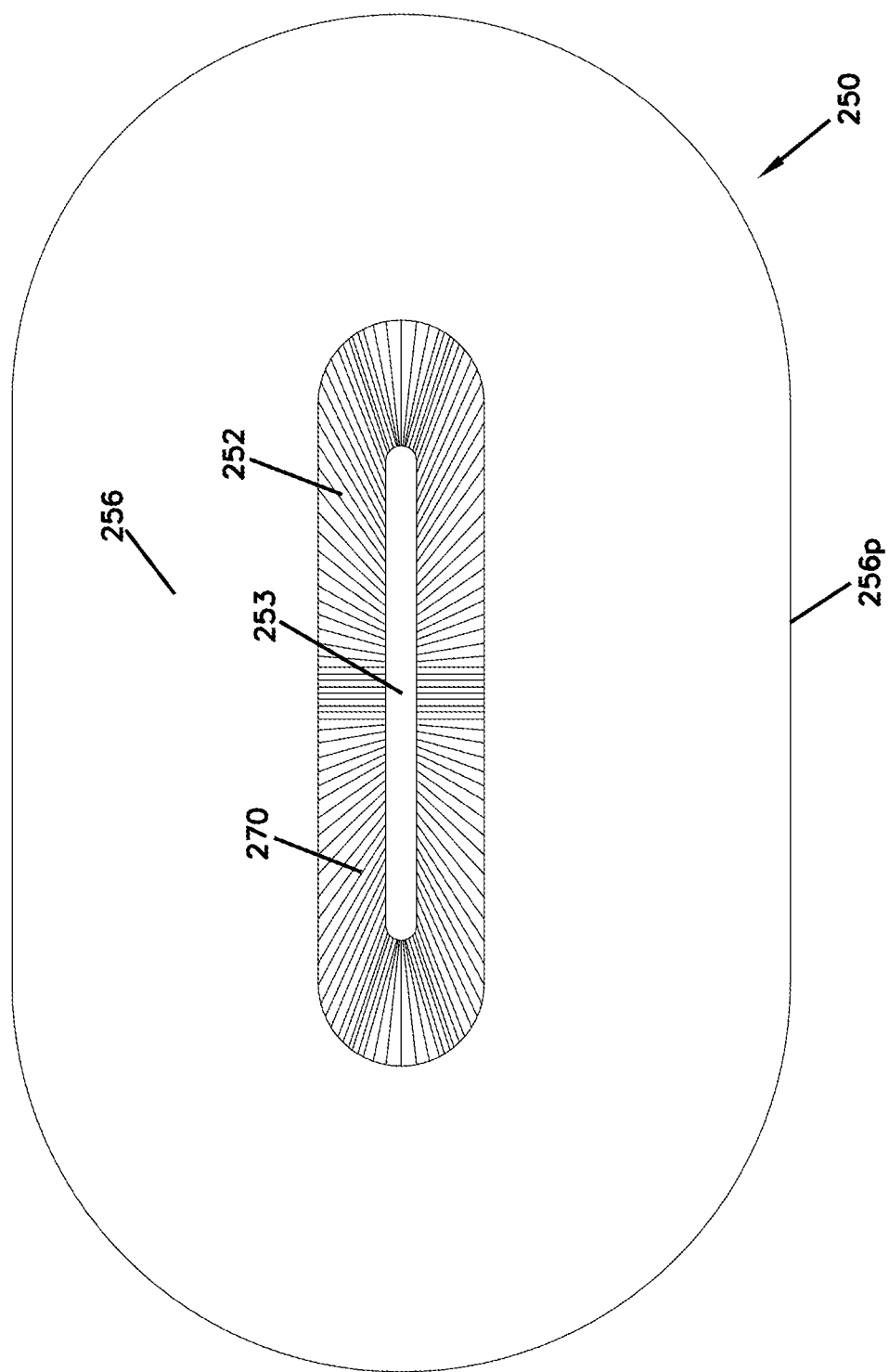
FIG. 8A is a schematic opposite flow end view to the view of FIG. 8.
Figure 8B:
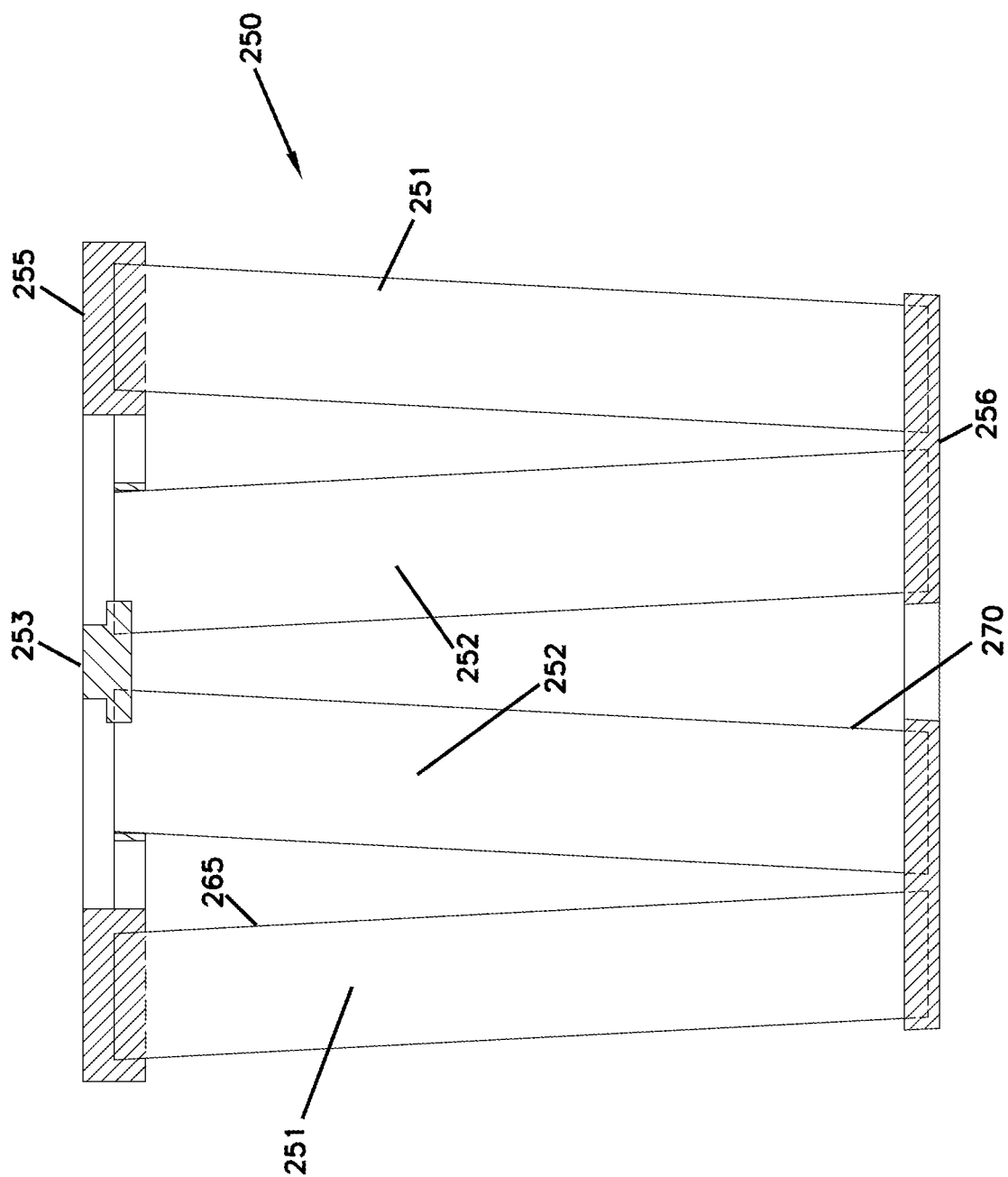
FIG. 8B is a schematic cross-sectional view of the media pack of FIGS. 8 and 8A.

In FIG. 8A, an end 256 of the cartridge 250, opposite end 255 is viewable. Here, an interior of loop 252 can be seen, surrounding an open gas flow region 270. When air is directed through cartridge 250 in a general direction toward end 256 and away from end 255, the portion of the air that passes through loop 252 will enter central region 270 and exit therefrom at end 256. Of course air that has entered media loop 251, FIG. 8, during filtering would generally pass around (over) an outer perimeter 256p of end 256.

In FIG. 8B a schematic cross sectional view of cartridge 250 is provided. Selected identified and described features are indicated by like reference numerals It will be understood from a review of FIGS. 8-8B, the above description, that the cartridge 250 described, is generally a cartridge which has media tips extending in a longitudinal direction between opposite flow ends 255, 256.

In the arrangement of FIGS. 8-8B, the media pack 250 is depicted with an oval, in particular racetrack, shaped perimeter. It is depicted in this manner, since the air filter cartridges in many examples below also have an oval or racetrack shaped configuration. However, the principles can be embodied in a variety of alternate peripheral shapes.

D. Other Media Variations, FIGS. 9-12B

Herein, in FIGS. 9-12B, some schematic, fragmentary, cross-sectional views are provided of still further alternate variations of media types that can be used in selected applications of the principles characterized herein. Certain examples are described in U.S. Ser. No. 62/077,749, filed Nov. 10, 2014 and owned by the Assignee of the present disclosure, Donaldson Company, Inc. In general, each of the arrangements of FIGS. 9-12 represents a media type that can be stacked or coiled into an arrangement that has opposite inlet and outlet flow ends (or faces), with straight through flow.

Figure 9:
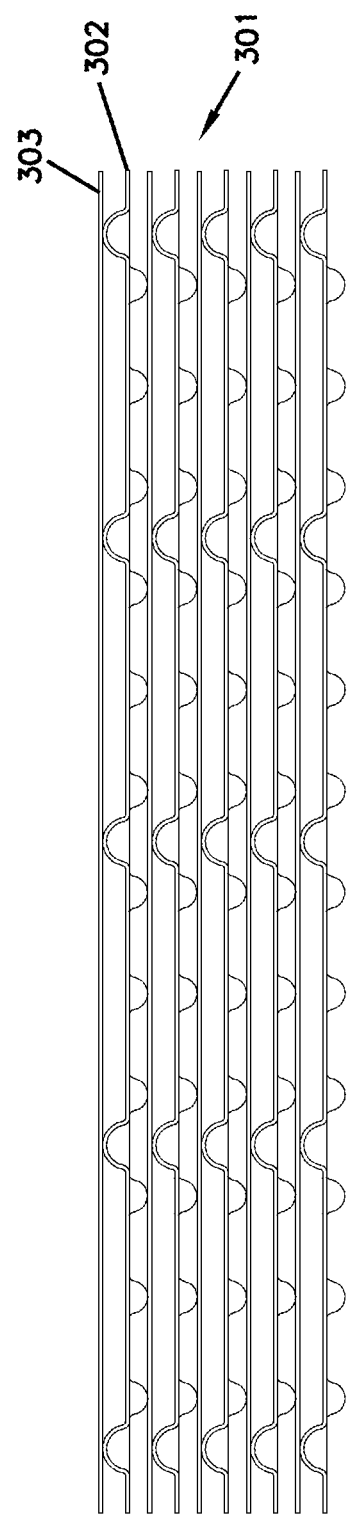
FIG. 9 is a schematic, fragmentary, cross-sectional view of a further alternate media type usable in a media pack of a filter cartridge having features in accord with the present disclosure.

In FIG. 9, an example media arrangement 301 from U.S. Ser. No. 62/077,749 is depicted, in which an embossed sheet 302 is secured to a non-embossed sheet 303, then stacked and coiled into a media pack, with seals along opposite edges of the type previously described for FIG. 1 herein.

Figure 10:
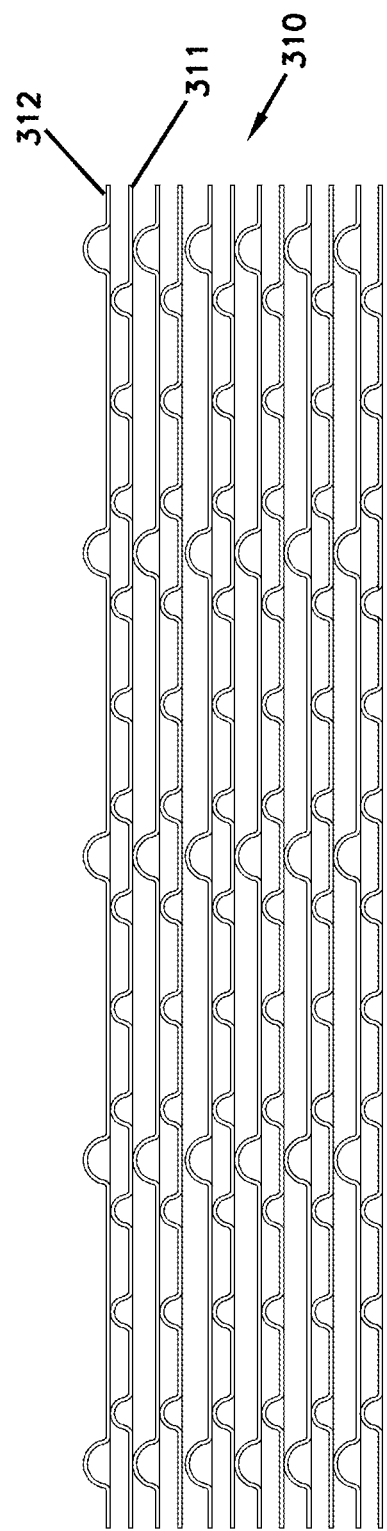
FIG. 10 is a schematic, fragmentary cross-sectional view, of a first variation of the media type of FIG. 9.

In FIG. 10, an alternate example media pack 310 from U.S. Ser. No. 62/077,749 is depicted, in which a first embossed sheet 311 is secured to a second embossed sheet 312 and then formed into a stacked or coiled media pack arrangement, having edge seals generally in accord with FIG. 1 herein.

Figure 11A:
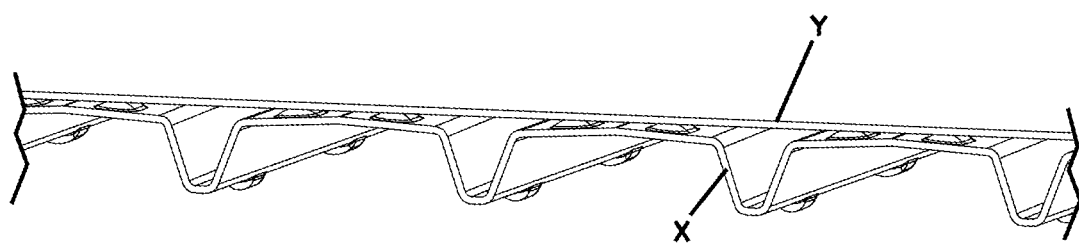
FIG. 11A is a schematic fragmentary depiction of another usable fluted sheet/facing sheet combination in accord with the present disclosure.
Figure 11B:
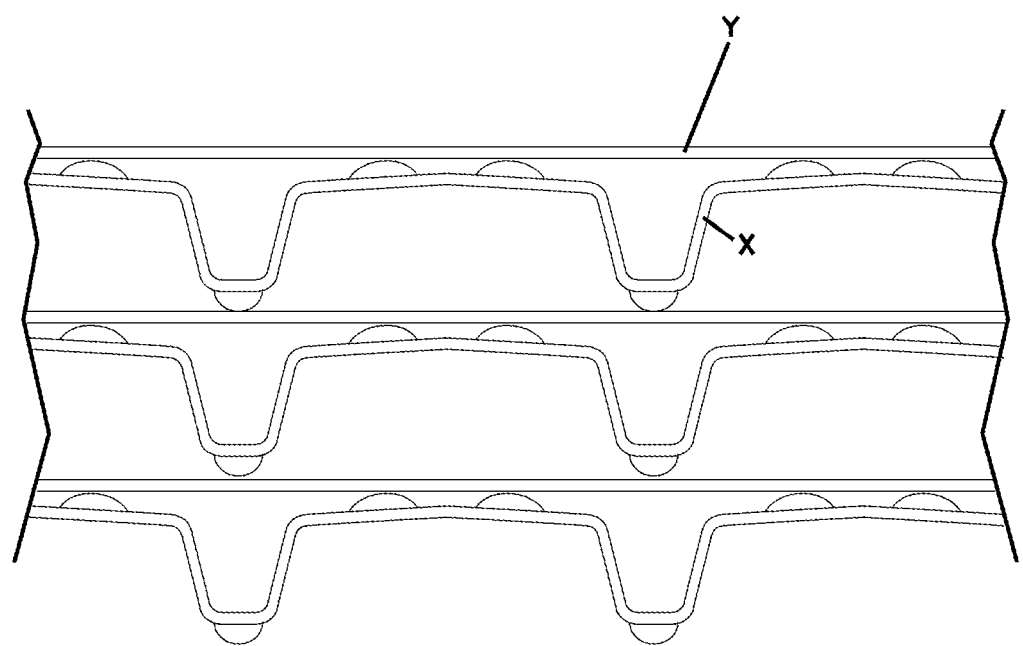
FIG. 11B is a fragmentary second schematic view of the type of media in FIG. 11A shown in a media pack.
Figure 11C:
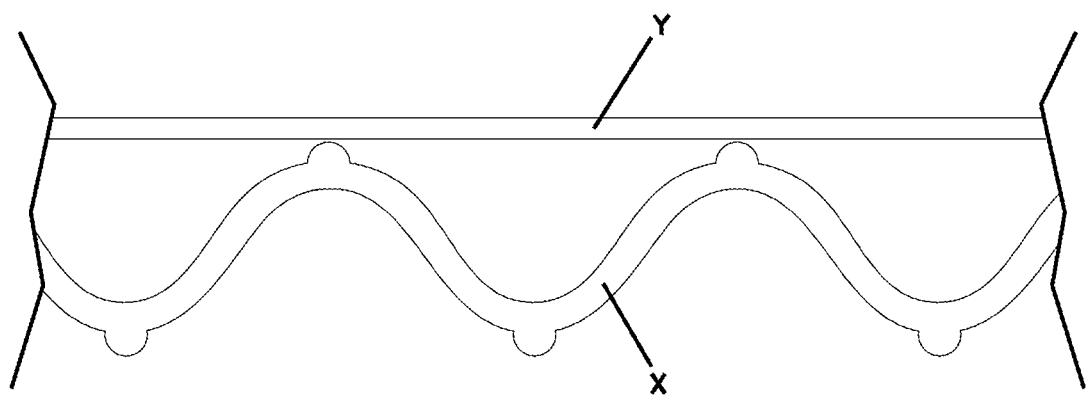
FIG. 11C is a schematic, fragmentary, plan view of still another media variation usable in arrangements according to the present disclosure.

In FIG. 11, a third example media arrangement 320 from U.S. Ser. No. 62/077,749 is depicted, in which a sheet 321, which is embossed on both sides, is secured to another layer 322 of a similar media, but inverted, and stacked or coiled into a media pack 320, with edge seals somewhat analogous to FIG. 1.

Edge seals can be conducted in either the upstream end or the downstream end, or in some instances both. Especially when the media is likely to encounter chemical material during filtering, it may be desirable to avoid a typical adhesive or sealant.

In FIG. 11A, a cross-section is depicted in which the fluted sheet X has various embossments on it for engagement with the facing sheet Y. Again these can be separate, or sections of the same media sheet.

In FIG. 11B, a schematic depiction of such an arrangement between the fluted sheet X and facing sheet Y is also shown.

In FIG. 11 C, a still further variation of such a principle is shown between a fluted sheet X and a facing sheet Y. These are meant to help understand how a wide variety of approaches are possible.

In FIGS. 12A and 12B, an example media arrangement 6401 is depicted, in which a fluted sheet 6402 is secured to a facing sheet 6403. The facing sheet 6403 may be a flat sheet. The media arrangement 6401 can then be stacked or coiled into a media pack, with seals along opposite edges of the type previously described for FIG. 1 herein. In the embodiment shown, the flutes 6404 of fluted sheet 6402 have an undulating ridgeline including a series of peaks 6405 and saddles 6406. The peaks 6405 of adjacent flutes 6404 can be either aligned as shown in FIGS. 12A and 12B or offset. Further the peak height and/or density can increase, decrease, or remain constant along the length of the flutes 6404. The ratio of the peak flute height to saddle flute height can vary from about 1.5, typically from 1.1 to about 1.

It is noted that there is no specific requirement that the same media be used for the fluted sheet section and the facing sheet section. A different media can be desirable in each, to obtain different effects. For example, one may be a cellulose media, while the other is a media containing some non-cellulose fiber. They may be provided with different porosity or different structural characteristics, to achieve desired results.

A variety of materials can be used. For example, the fluted sheet section or the facing sheet section can include a cellulose material, synthetic material, or a mixture thereof. In some embodiments, one of the fluted sheet section and the facing sheet section includes a cellulose material and the other of the fluted sheet section and facing sheet section includes a synthetic material.

Synthetic material(s) can include polymeric fibers, such as polyolefin, polyamide, polyester, polyvinyl chloride, polyvinyl alcohol (of various degrees of hydrolysis), and polyvinyl acetate fibers. Suitable synthetic fibers include, for example, polyethylene terephthalate, polyethylene, polypropylene, nylon, and rayon fibers. Other suitable synthetic fibers include those made from thermoplastic polymers, cellulosic and other fibers coated with thermoplastic polymers, and multi-component fibers in which at least one of the components includes a thermoplastic polymer. Single and multi-component fibers can be manufactured from polyester, polyethylene, polypropylene, and other conventional thermoplastic fibrous materials.

The examples of FIGS. 9-12B, are meant to indicate generally that a variety alternate media packs can be used in accord with the principles herein. Attention is also directed to U.S. Ser. No. 62/077,749 incorporated herein by reference, with respect to the general principles of construction and application of some alternates media types.

E. Still Further Media Types

Many of the techniques characterized herein will preferably be applied when the media is oriented for filtering between opposite flow ends of the cartridge is media having flutes or pleat tips that extend in a direction between those opposite ends. However, alternatives are possible. The techniques characterized herein with respect to seal arrangement definition can be applied in filter cartridges that have opposite flow ends, with media positioned to filter fluid flow between those ends, even when the media does not include flutes or pleat tips extending in a direction between those ends. The media, for example, can be depth media, can be pleated in an alternate direction, or it can be a non-pleated material.

It is indeed the case, however, that the techniques characterized herein are particularly advantageous for use with cartridges that are relatively deep in extension between flow ends, usually at least 100 mm, typically at least 150 mm, often at least 200 mm, sometimes at least 250 mm, and in some instances 300 mm or more, and are configured for large loading volume during use. These types of systems will typically be ones in which the media is configured with pleat tips or flutes extending in a direction between opposite flow ends.

III. An Example Air Cleaner Assembly and Features, FIGS. 13-35

In FIGS. 13-35, an example air cleaner assembly is depicted that includes features, as characterized herein, usable with filter cartridges that include media types as previously characterized herein. Although the media variations described above can be used, variations from them are possible. The specific choice of media is a matter of preference for cost, assembly and/or filter capability, efficiency or lifetime preferences. Typically, the selected media will be of the type of FIG. 1, with a length of extension between the two flow faces (or ends) of at least 100 mm, usually at least 150 mm, typically at least 200 mm, sometimes at least 250 mm. Indeed in some instances the length may be at least 300 mm or even more.

A. Some General Air Cleaner Features, FIGS. 13-17

Figure 13:
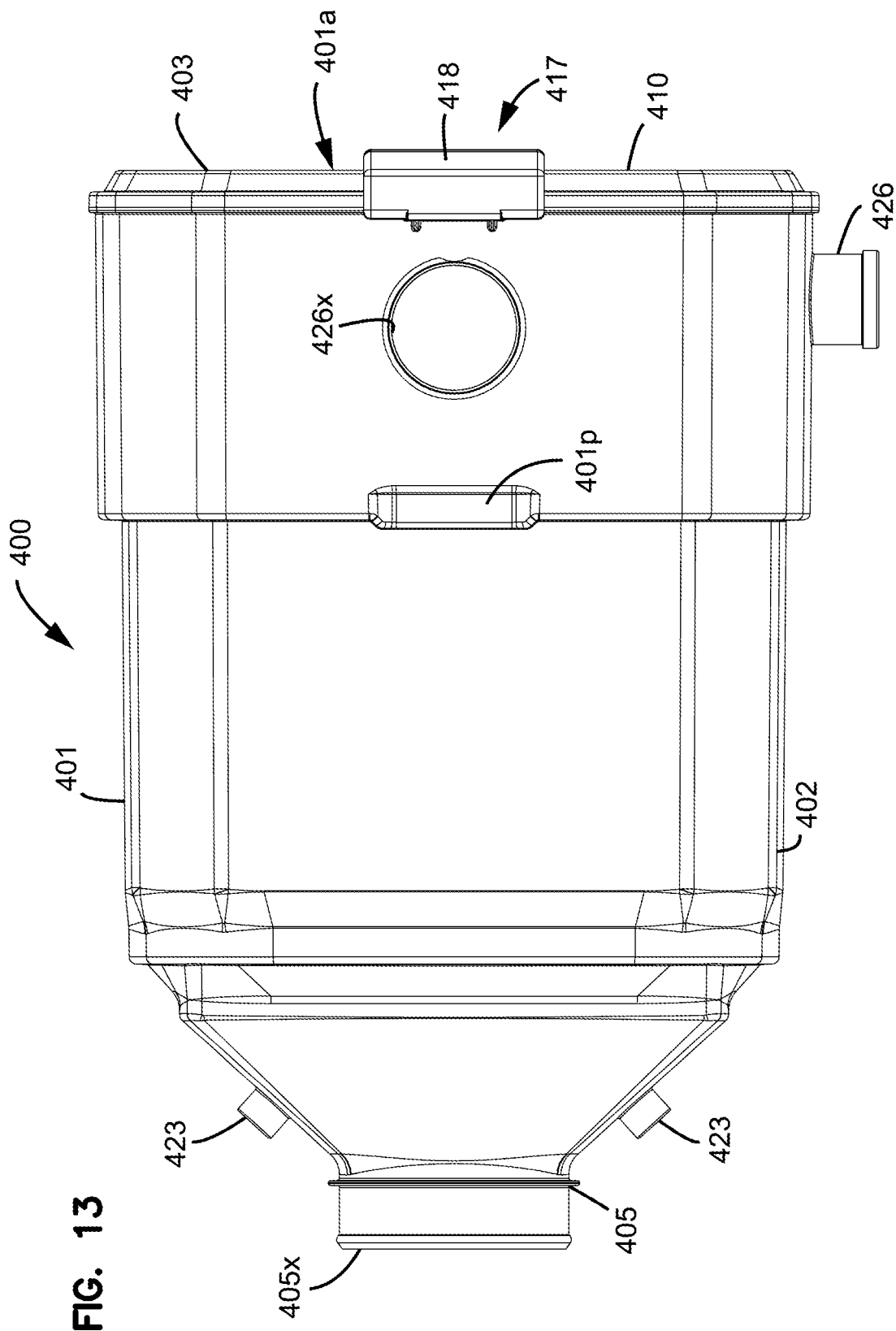
FIG. 13 is a schematic side elevational view of an air cleaner assembly according to the present disclosure.

The reference numeral 400, FIG. 13, generally indicates an example air cleaner assembly according to the present disclosure. The air cleaner assembly 400 generally comprises a housing 401. The example housing 401 includes a body 402 with a removable service or access cover 403 thereon, by which access to internally received componentry such as filter cartridges can be obtained.

Referring to FIG. 12, the air cleaner 400, includes, (in the example positioned on the body 402), an outlet arrangement 405. The outlet arrangement 405 is generally positioned for exit of filtered air, from the air cleaner assembly 400, in the example through outlet 405x. The outlet arrangement or assembly 405 can be made separately from a remainder of the body 402 and be attached thereto, or it can be formed integral with a remainder of the body 402. With arrangements in which the outlet arrangement 405 is separately made, modular assembly practices can be used, to provide alternate outlet arrangements 405 for different systems of use.

The housing 401 can be constructed from a variety of materials, when various principles according to the present disclosure are provided. The features characterized, are particularly well adapted for use with a housing that is primarily made from molded plastic components. The housing 401 of FIG. 13 is generally such a component, and selected housing features, such as body 402, can be made to include various structural ribbing members thereon, not fully detailed herein, for strength and integrity; see for example the arrangement of WO 2016/105560, incorporated herein by reference.

In general, the housing 401 can be characterized as including an air flow inlet arrangement 401a, through which air to be filtered enters the assembly 400. The particular assembly 400 depicted, also includes a precleaner with a contaminant ejection port or port arrangement 426, discussed below.

Figure 14:
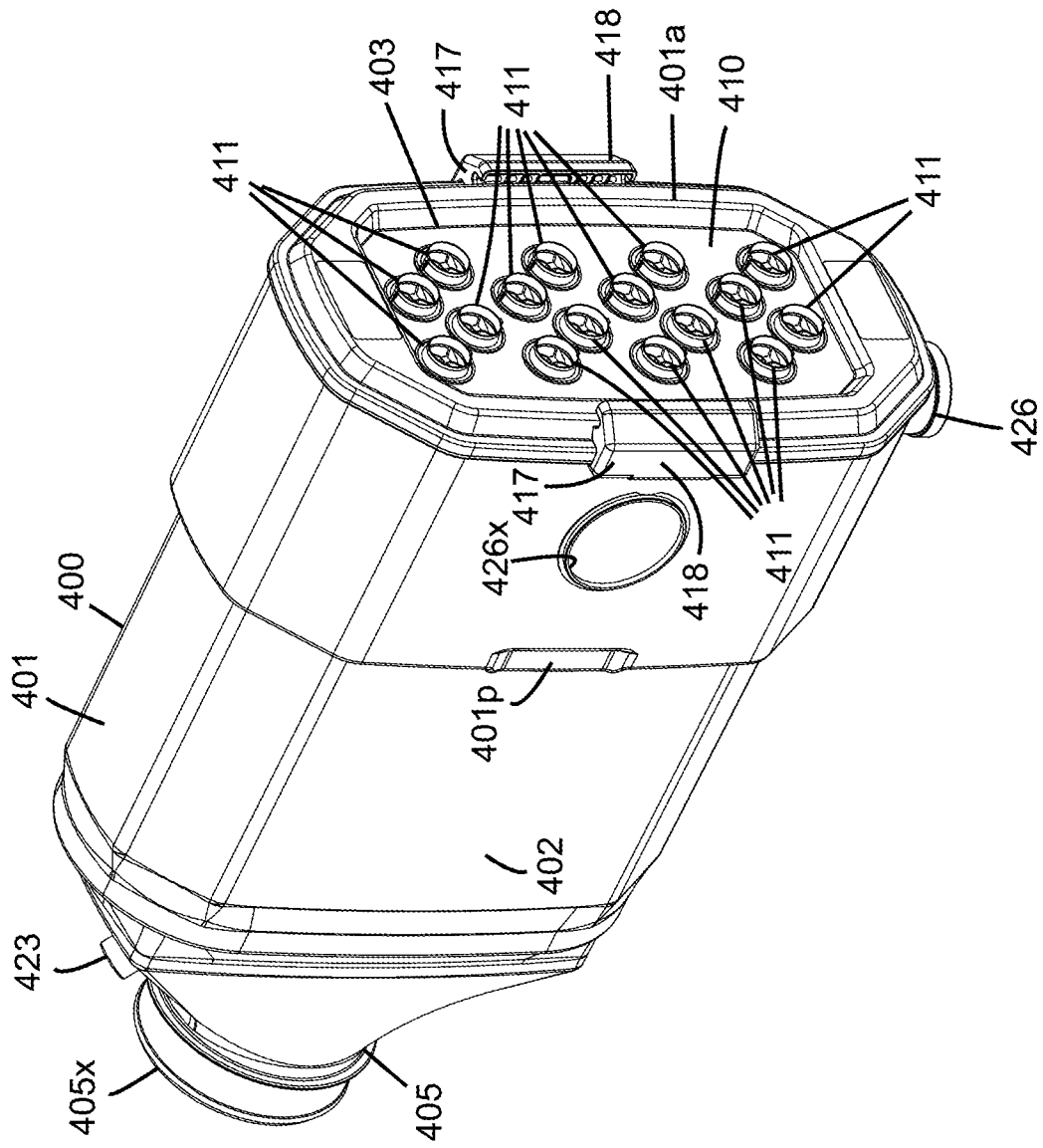
FIG. 14 is a schematic inlet end perspective view of the air cleaner assembly of FIG. 13.

Referring to FIG. 14, the particular air cleaner assembly 400 depicted, is a two-stage air cleaner assembly, and includes a precleaner 410 therein. The precleaner 410, in the example depicted, comprises a plurality of separator tubes 411, FIG. 14, for example, as characterized below. The precleaner 410 is usable to preclean selected material (contaminant) carried by an air stream into the air cleaner assembly 400, before the air reaches the filter cartridge(s) positioned therein. Such precleaning generally leads to substantial removal of liquid particulate such as rain water or splashed water, etc. and/or various (especially larger) dust or other particles. Operation of the precleaner 410, and preferred configurations thereof, are described herein below. It is noted that particular example precleaner 410 depicted, comprises a portion of the access cover 403. Such precleaners are generally described in references such as WO 2016/105560, incorporated herein by reference.

Many of the principles characterized herein can be applied in air cleaner assemblies that do not have a precleaner positioned as a component thereof, i.e. for which the precleaner is separate component or is not used at all.

A mounting pad arrangement can be provided, by which the air cleaner assembly 400 can be secured to equipment for use. Mounting pad arrangements would generally comprise a plurality of feet or pads attached to (or molded integral with) housing body 402. An example is shown at 409, FIG. 16. Mounting pads or pad arrangements can be provided in a manner common in plastic air cleaner manufacture, such as for example described in WO 2016/105560, incorporated herein by reference.

Referring again to FIG. 14, the particular access cover 403 depicted, is secured in place by a connector arrangement 417, and in the example depicted comprising a pair of latches 418. Of course, an alternate number or location can be used; and/or, alternate connector arrangements can be used, including for example, bolts or other fasteners.

The particular air cleaner housing 401 depicted, generally has a cross-sectional shape with a long axis (in a plane perpendicular to an axis or general direction of air flow) and a shorter axis perpendicular to the longer axis. In FIG. 14, the air cleaner assembly 400 is depicted configured so that in use it would typically be mounted with the longer cross-sectional axis generally vertical, and so that the ejector 426 is pointed down. The principles described herein can be applied in alternate arrangements, as will be apparent from discussions below.

Referring again to FIG. 13, at 423, ports in the outlet arrangement 405 are depicted. The ports 423 can be used for restriction indicators or other equipment. In addition, if desired, a mass air flow sensor (MAFS) arrangement can be mounted on outlet arrangement 405 or in ducting further downstream therefrom.

In FIG. 13, attention is directed to contaminant evacuation port arrangement 426. The (outlet) port 426 arrangement is positioned for removal of particulate and/or water (contaminant) collected by the precleaner 410, from the housing 401 and upstream of internal cartridges. It can generally be characterized as a contaminant "evacuation" port or port arrangement due to this function. It will typically be oriented in a portion of the housing 401 directed downwardly in use. Thus, if it is desired to mount the air cleaner assembly 400 differently than with mounting pad arrangement 409, for example along an opposite side, an additional mounting arrangement on that side would need to be provided; or, the port arrangement 426 would need to be positioned at a different location or in the housing body, for example oppositely.

In general terms, for typical applications, the outlet port arrangement 426 would be directed downwardly for gravity assist to material evacuation from the precleaner assembly 410. The port arrangement 410 can be provided with an evacuator valve assembly therein, or it may be attached to a scavenge duct to facilitate removal of material from the precleaner 410.

Still referring to FIG. 13, it is noted that the particular contaminant evacuator port arrangement 426 depicted, is positioned in the housing body 402. Alternate locations, for example, in a portion of an alternate access cover, are possible in some applications of selected techniques described herein.

Referring to FIG. 13, attention is directed to structure 426x. This indicates a possible alternate evacuation outlet location, for example if the air cleaner 400 is to be mounted with the long axis directed horizontally. In the particular example depicted, port location 426x is a closed molded structure. However, if the air cleaner assembly 400 was being configured for use with a long axis horizontal, port location 426x could be molded open and with an extension thereon to operate as a primary ejector port; and, ejector port 426 could be molded closed and typically without a tubular extension thereon.

Figure 15:
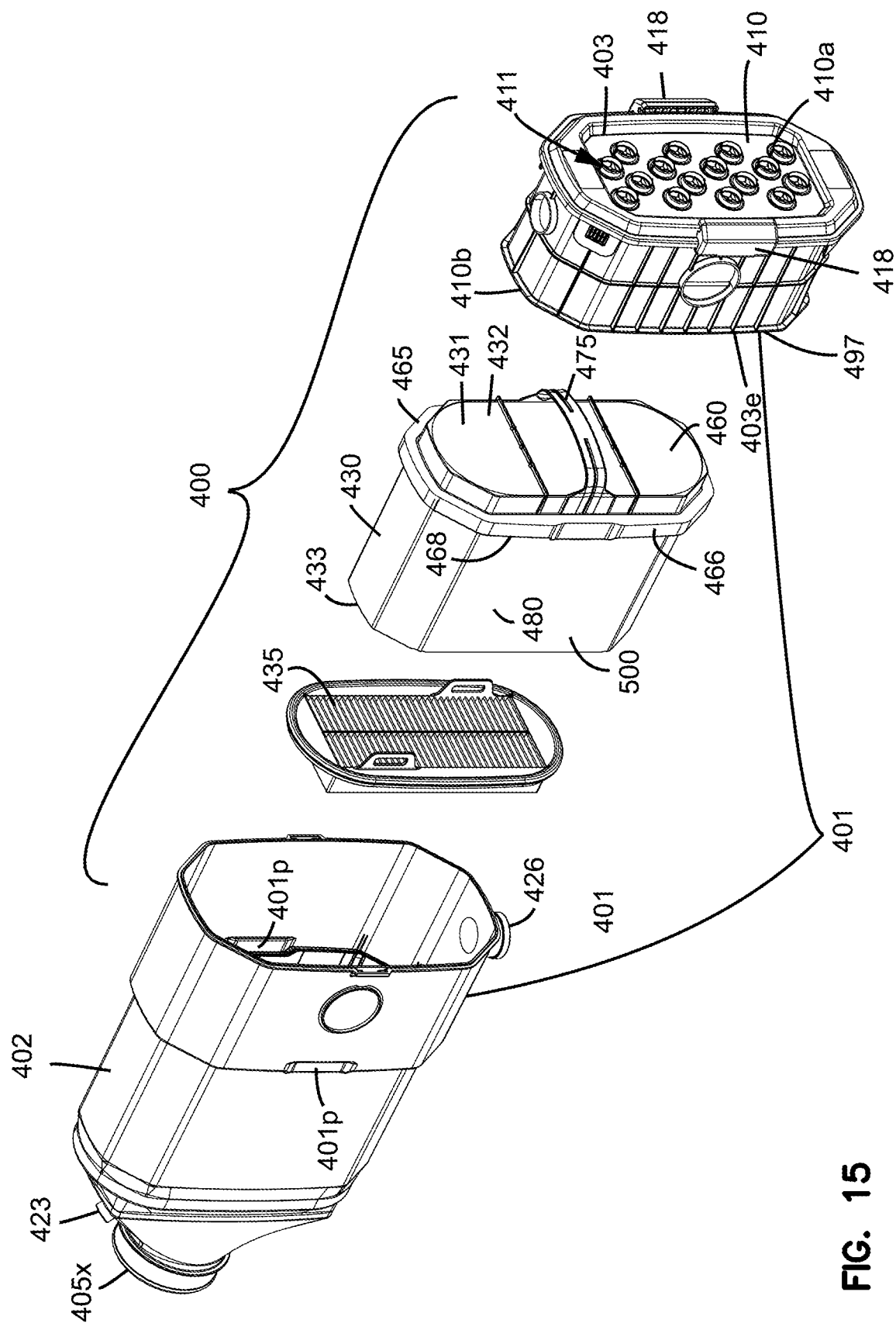
FIG. 15 is an exploded, schematic, inlet end perspective view of the air cleaner assembly of FIGS. 13 and 14.

Attention is now directed to FIG. 15, an exploded perspective view of the air cleaner assembly 400. At 402, the housing body is depicted. At 403, the access cover is depicted, in the example comprising a precleaner 410. The precleaner 410 depicted, comprises two shell or cover components secured to one another: an outer (inlet) cover portion 410a and an inner (outlet tube) cover portion 410b, referenced further below. In some applications characterized herein, the components 410a, 410b are snap-fit or otherwise secured together, but configured to be separable to facilitate cleaning. However, in some applications of the techniques characterized herein, the two covers or shell components 410a, 410b can be secured together during assembly, and not be separable again.

The general operation of the precleaner 410, again, is to separate certain material (contaminant) upon entering into the air cleaner to allow for evacuation through outlet port 426 in housing body 402, and upstream of internally received filter cartridge componentry (specifically media). This inhibits certain materials from ever reaching internally received filter cartridge.

In FIG. 15, at 430 a filter cartridge is depicted. The filter cartridge 430 is generally a main or primary filter cartridge, and in use selectively separates particulate or containment material not separated by the precleaner 410. Cartridge 430, is (generally) a service part (or removable component), i.e. periodically during the lifetime of the air cleaner 400, the filter cartridge 430 would be removed and be refurbished or be replaced. The filter cartridge 430 comprises filter or filtration media 431 which may be any of a variety of types, for example various ones of these characterized herein above. The typical cartridge 430 used with principles according to the present disclosure, is a "straight through flow" arrangement, which has a first (inlet) flow face or end 432 and an opposite second outlet (flow) face or end 433, with filtering flow of air through the filter cartridge 430 generally being from the inlet end 432 to the outer end 433.

Still referring to FIG. 15, the particular air cleaner assembly 400 depicted includes an optional secondary or safety filter 435. The (optional) safety or secondary filter 435 is generally positioned between the main filter cartridge 430 and the outlet 405x. In a typical arrangement, the (optional) secondary filter cartridge 435 is removably positioned within the air cleaner assembly 400, and can be a service component. However, it is typically not subject to very significant dust load in use, and may be rarely, if ever, changed. It is an advantageous feature that the safety filter 435 is structurally separate from the main cartridge 430, since it can remain in place protecting internal components from dust, even when the main filter cartridge 430 is removed.

Figure 16:
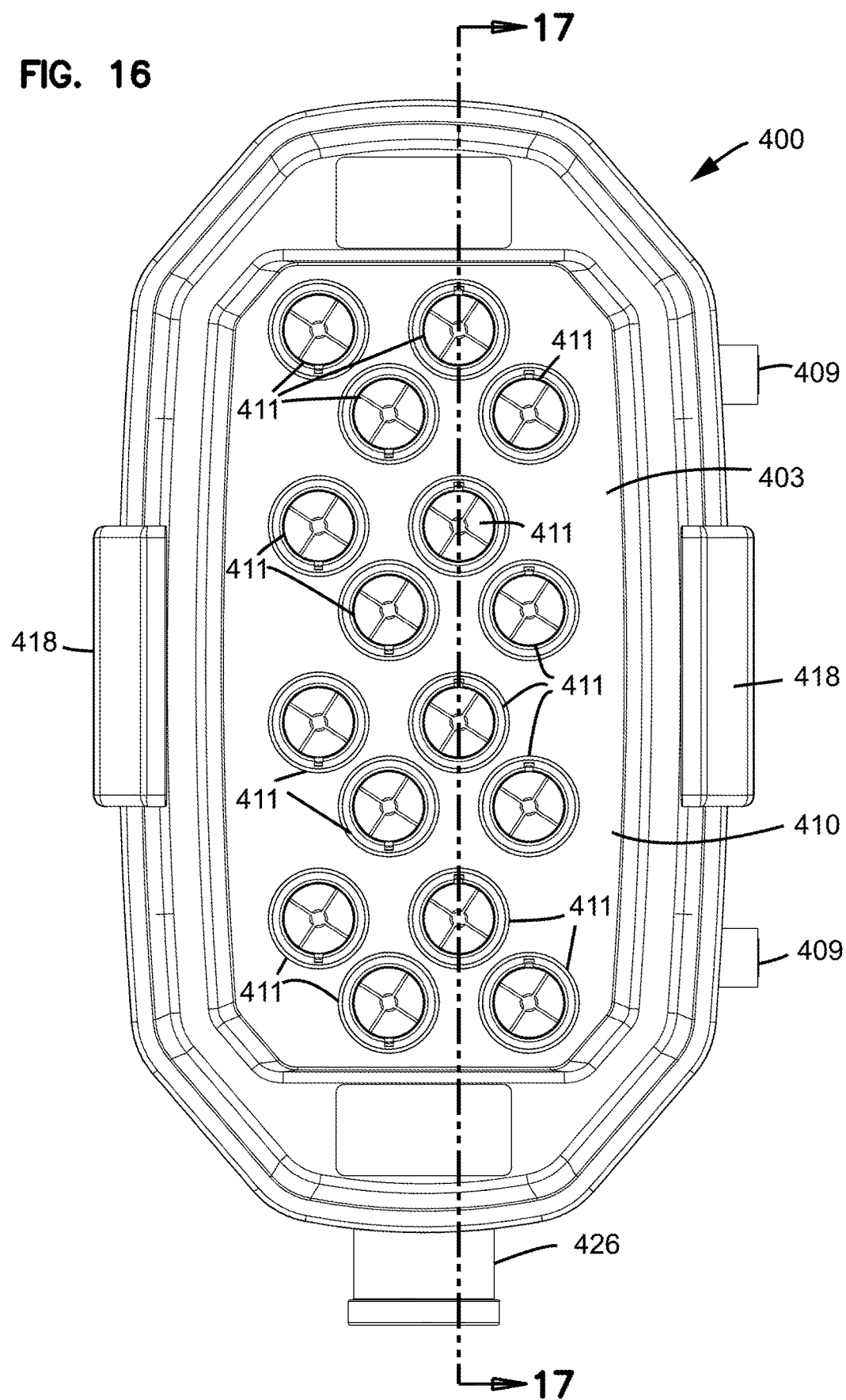
FIG. 16 is a schematic, inlet end, elevational view of the air cleaner assembly of FIGS. 13-15.

In FIG. 16, an inlet end elevational view is depicted. Features previously discussed include: access cover 403 comprising precleaner 410 with various flow tubes 411; latches 418; and, ejector port arrangement 426.

Here, optional mounting posts 409, referenced above, are also depicted.

In FIG. 17, a cross-sectional view taken generally along line 17-17, FIG. 16 is depicted. Here, selected previously discussed features are indicated as follows: the air cleaner assembly 400 with housing 401 comprising body 402 and access cover 403; an internally positioned main filter cartridge 430; safety cartridge 435; outlet arrangement 405 with outlet port 405x; and, dust ejector port arrangement 426. Air entering inlet end 401a is directed to dust ejector tubes 411. In a first encountered portion of the tubes 411, the air is directed into cyclonic flow via vane arrangements 411v. The air exits the vane arrangements 411v with spinning, causing contaminant ejection through slide slots discussed below, eventually directing the contaminant to be ejected by/through the port arrangement 426. The remaining air flow is then directed through (to) exit sections 411e, to be further directed downstream of the general direction of arrow 437, into inlet end 431, of the main filter arrangement 430. The air, being filtered by media in the main filter 430, cartridge exits at end 433, after which it enters media 435m of safety filter cartridge 435. Having passed through the safety cartridge 435, the air is then directed to outlet 405x.

Figure 17A:
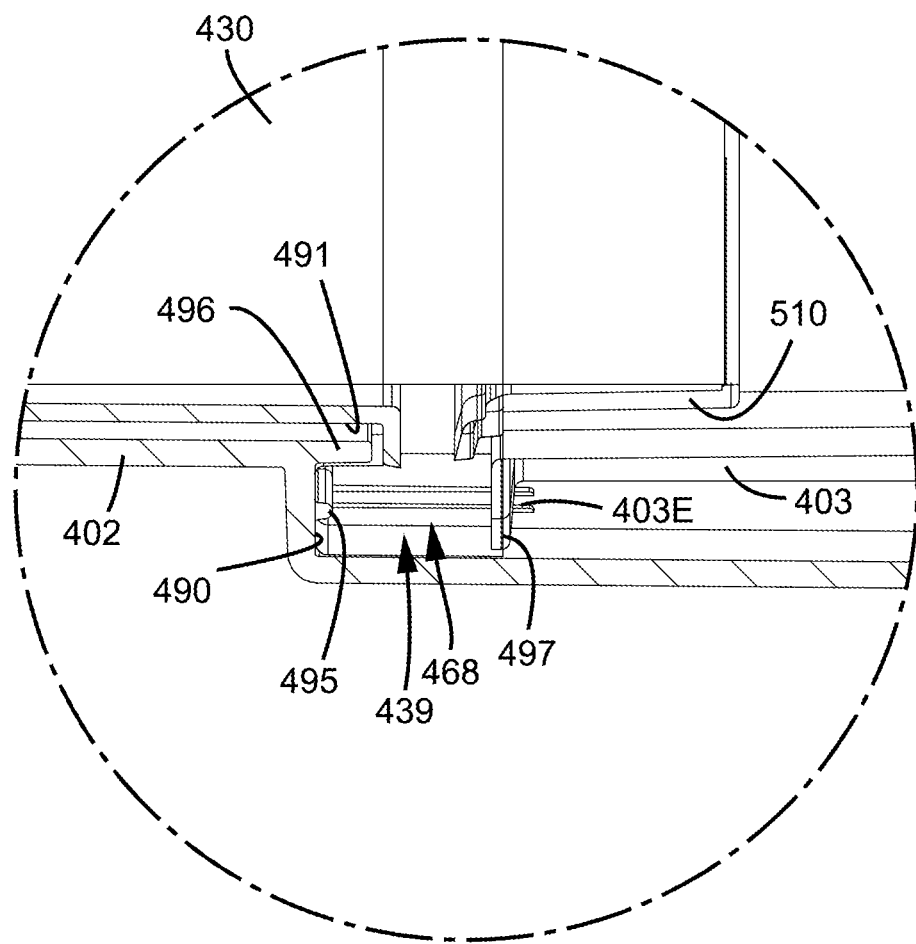
FIG. 17A is an enlarged fragmentary view of an identified portion of FIG. 17.

It is desirable to provide a seal arrangement between main filter cartridge 430 and the housing 401. In the example depicted, the seal arrangement (not detailed) will comprise a perimeter, axial, pinch seal, discussed below. Referring to FIG. 17A, the sealing will occur by compression of the seal (not shown) being compressed between a portion or shelf 490 of the housing body 402 and a portion or tip 497 of the access cover 403.

Preferably the safety cartridge is also sealed to the housing body 402. Such a seal is preferably provided by seal arrangement 440 (FIG. 17) discussed below.

It is noted that FIGS. 17 and 17A are not precise but are schematic in the region where the seal member (not shown) would be located, the abutment between where the parts occurs. They are intended to show general locations and not specific features at these regions.

B. The Optional Safety Filter Cartridge, FIGS. 18 and 19

Figure 18:
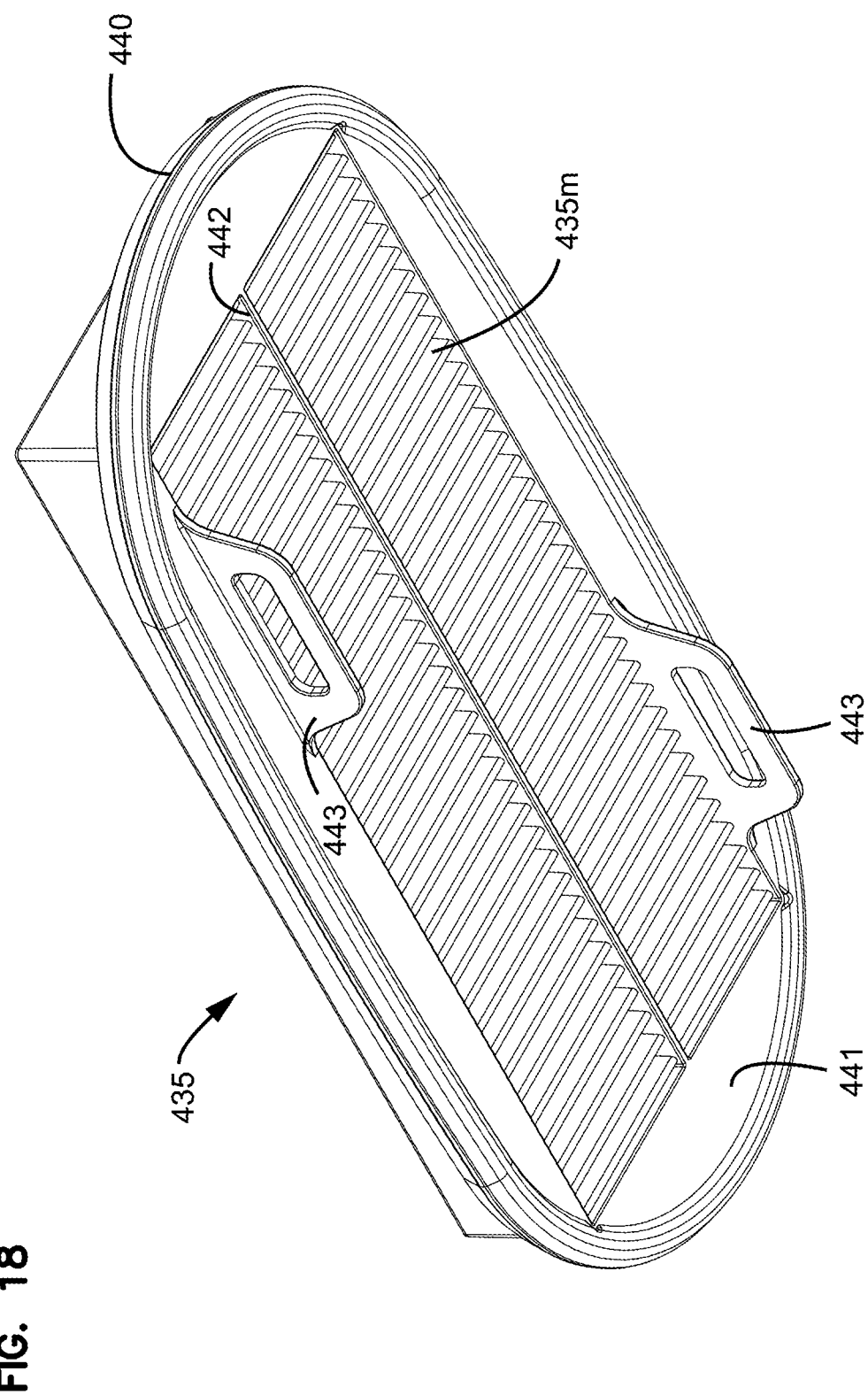
FIG. 18 is a schematic, inlet end, perspective view of an optional safety filter cartridge of the assembly of FIGS. 13-15.
Figure 19:
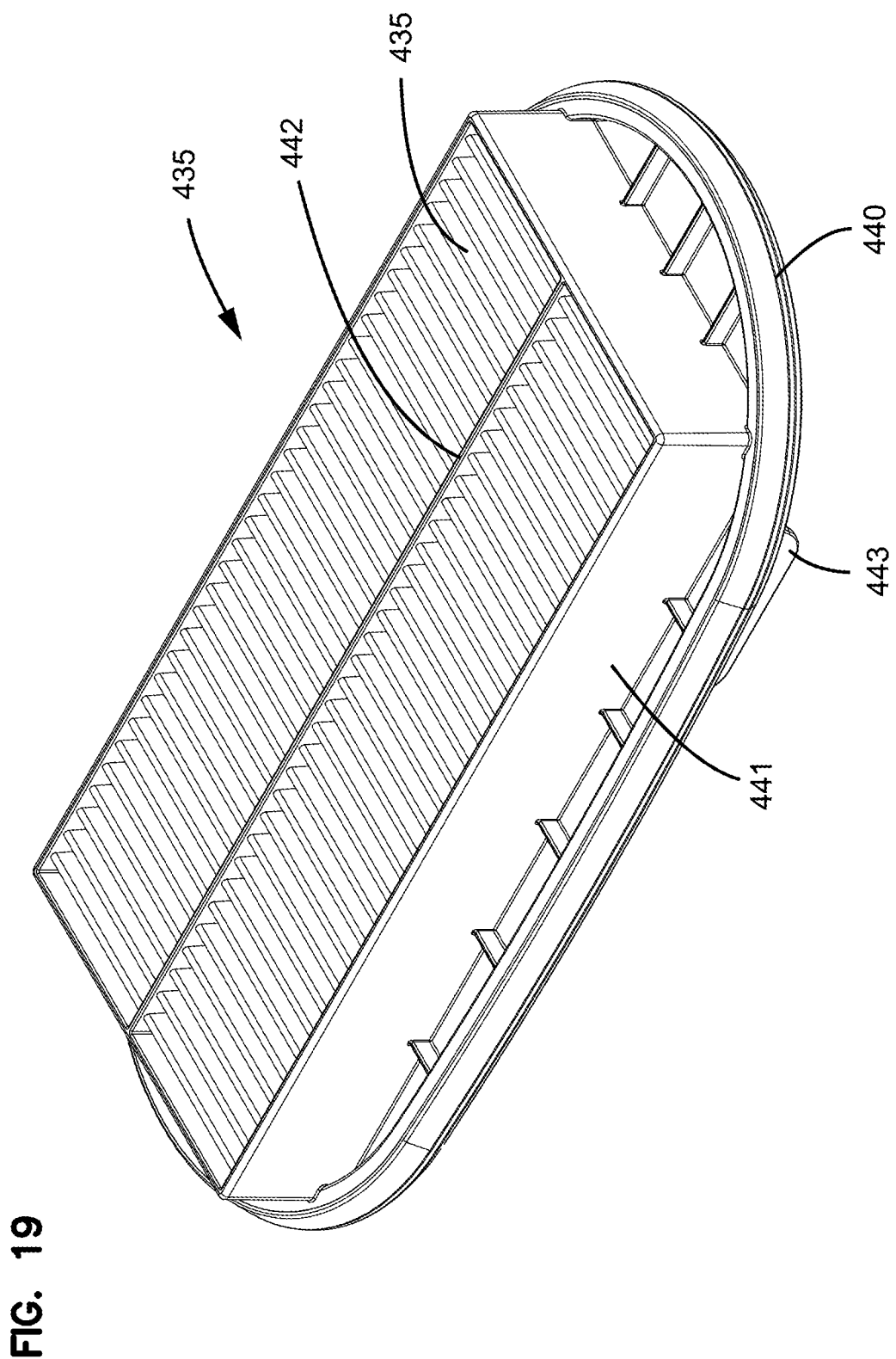
FIG. 19 is a schematic, outlet end, perspective view of the safety filter cartridge of FIG. 18.

Referring to FIGS. 18 and 19, the optional safety filter cartridge 435 is depicted. Referring to FIG. 18, the safety filter cartridge 435 comprises media 435m in the example, pleated media, although alternatives are possible) secured within framework 441. The framework 411, may, for example, comprise molded plastic construction with the media 435m secured thereto during molding. Seal arrangement 440 is shown positioned on a perimeter location of the molding 441. In the example depicted, it would comprise an outwardly directed radial seal, i.e. it is configured to seal along an outer perimeter periphery to surrounding portions of the housing 401. In alternative arrangements, an axial pinch seal (a seal arrangement pinched between housing components) could be used at this location, but typically a radial seal is preferred.

Still referring to FIG. 18, it is noted that the molding 441 includes pleat spacer arrangement 442 and a handle arrangement 443. The handle arrangement 443, in the example depicted, comprises two handle members directed upstream when the cartridge 435 is installed. In the view of FIG. 17, it can be seen that the handle arrangement 443 projects toward the main filter cartridge 430.

In FIG. 19, an alternate view of cartridge 435 is shown, taken generally toward an outlet side or downstream end of the cartridge. Features already characterized and viewable in FIG. 19 include: media 435m; seal arrangement 440; molded framework 441; pleat spacer 442; and, handle arrangement 443.

C. Main Filter Cartridge Features (Generally), FIGS. 20-23A

Referring back to FIG. 15, as indicated the assembly 400 depicted, as characterized, includes a main filter cartridge 430. The main filter cartridge 430, again, is a service part, and, in use, normally becomes loaded with dust and other contaminant as the air cleaner 400 is used. In due course, the main filter cartridge becomes sufficiently occluded, that servicing of air cleaner 400 is warranted, by opening the access cover 403, removing the filter cartridge 430 and then either refurbishing it or replacing it. In some instances, this operation may also involve removal and replacement or refurbishment of the optional safety filter 435 when present, but in many instances it will not.

In general terms, the main filter cartridge 430 comprises permeable filter media (media pack 460) configured so that the air must pass therethrough, with filtering for air entering an inlet end (face) to exit an opposite outlet end (face). The filter media may be any of a variety of types. In typical applications, according to the present disclosure, the filter media will be configured in a media pack that conducts filtration of air, as the air passes in a flow direction from an inlet end of the filter media pack to an opposite outlet end of the filter media pack. Example filter media types that can be used in this matter were described herein above, and many of them may be used to some advantage and applications according to the present disclosure.

Figure 20:
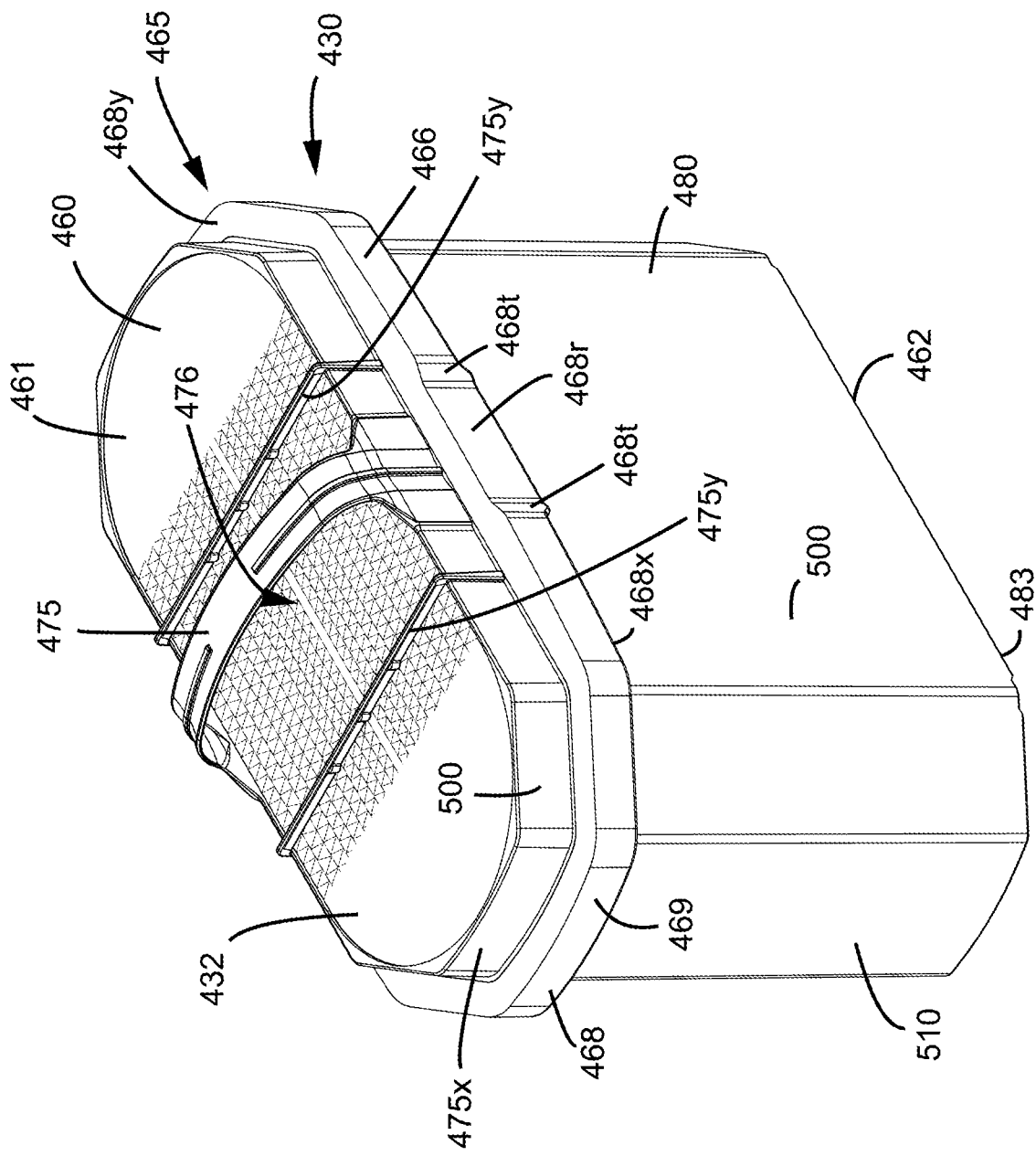
FIG. 20 is a schematic inlet end perspective view of a main filter cartridge usable in the assembly of FIGS. 13-15.

In FIG. 20, an example filter cartridge 430 is depicted. In general terms, the filter cartridge 430 comprises a media pack 460 (media) positioned in extension between an inlet flow end (or face) 461 and opposite outlet flow end (or face) 462. In general terms, the filter cartridge 430, has opposite inlet and outlet flow ends (faces) 432, 433 respectively, the inlet flow end 432 of the cartridge 430 corresponding to the inlet flow end 461 of the media pack 460; and, the outlet flow end 433 of the filter cartridge 430, corresponding to the outlet flow end 462 of the media pack 460. Thus, in general, the filter cartridge 430 has a straight-through flow construction, i.e., in general air enters one end and exits the other without making a substantial turn within the media pack. At least, in this manner, such filter cartridges are readily distinguishable from various well-known cylindrical pleated media filter cartridges, in which the media is coiled around an open (flow) interior. In general terms, in addition to the media pack 460; filter cartridge 430 generally includes a housing seal arrangement 465, thereon. The housing seal arrangement 465 generally comprises a housing seal member 466 (corresponding to seal 439, FIG. 17A) secured to a remainder of the filter cartridge 430 in a manner, and at a location, such that it can form a releasable seal with an air cleaner housing in use, to inhibit air from bypassing the media pack 460 during use. To facilitate this, the seal member 466 will typically be a resilient material of a type typically used for such sealing purposes. Examples are described in WO 2016/105560 and WO 2014/210541, incorporated herein by reference.

The example seal member 466 depicted, and as a result the overall housing seal arrangement 465, is configured and positioned as a pinch seal (or axial pinch seal) member 468. More specifically, it is a perimeter pinch seal member. By this, it is meant that the seal member 468 (and housing seal arrangement 465 generally), extends around a perimeter of the cartridge 430 at a position so that it can be pinched between two housing components under sealing pressure during use. The pinch seal member 468, depicted, is sometimes referred to as an "axial" pinch seal member, since it is configured for sealing pressure (between two housing components) applied in an axial direction, i.e., in a general direction of extension of an axis extending through the media 460 from the inlet end 461 to the outlet end 462. Other types of seal arrangements (for example radial) can be used with selected principles in accord with the present disclosure, but the principles are particularly well adapted for use with axial pinch seals.

Herein, the term "radial seal" is meant to generally refer to a seal of a type that sealingly engages either a surrounding portion of the housing or other structure (an outwardly directed radial seal) or which itself surrounds a structure as it seals thereto (inwardly directed radial seal). The term "radial" is meant to reference that the sealing forces are directed toward or away from a central axis that extends through the region surrounded by the characterized seal member.

Still referring to FIG. 20, the particular filter cartridge 430 depicted, includes an optional handle arrangement 475 thereon in the example oriented adjacent the cartridge inlet end 432 and projecting therefrom in a direction away from the outlet end 433. This positions and orients the handle arrangement 475 where it can be readily grasped to manage servicing of the air cleaner 400. The particular example handle arrangement 475 depicted, includes a central handle bridge 476 in axial alignment with media end 461 to define a space under the handle bridge 476 through which a person's fingers can extend during grasping of the handle member 475.

The particular handle arrangement 475 depicted is one that includes a handle bridge 476 that extends over and across a short cross-sectional axis of the media pack 460, although alternatives are possible.

In a typical assembly, as discussed below in connection with FIG. 34, the handle arrangement 475 is part of a preform or structure that includes a perimeter frame portion 475x oriented to surround the media 460, and to be engaged by the seal member 468, for example by being embedded the seal member 468 during assembly. Optional grid work 475y is depicted extending across media 432 to provide for support and structural integrity to such framework 475x and to the media 431.

Referring to FIG. 15, the depicted filter cartridge 430 includes an optional protective shell 480. The depicted shell 480 surrounds the media pack 460 and protects the media pack 460 during handling and use. It also can be used to facilitate assembly, as discussed below. The particular shell 480 depicted, extends at least from the seal arrangement 466/468 to media pack end 462. The shell 480 can be constructed in a variety of ways, and an example is discussed herein below. The shell 480, in a typical application, would comprise a portion of a preform of molded plastic into which the media pack 460 is positioned during assembly of the cartridge 430.

Still referring to FIG. 20, in the particular filter cartridge 430 depicted the media 431 has a non-circular cross-sectional perimeter shape, although principles described here can be applied in alternate arrangements. The particular cross-sectional shape of the media 431 is generally oval, although, again, alternatives are possible. In many applications of the present techniques, the media 431 will have a cross-sectional shape with a long cross-sectional axis in a plane perpendicular to air flow (through the media pack); and, a short axis perpendicular to the long axis and located along a mid-point of the layer axis with: the ratio of a length (D1) of the long axis to a length (D2) of the short axis (at a location half-way along the length of the long axis) being at least 1.4, often at least 1.7 typically at least 1.8, and often within the range of 1.6-3.0, inclusive (for example, within the range of 2.0-2.6 inclusive). While alternatives are possible, such ratios will be typically preferred for arrangements according to the present disclosure, in part because they would relate to an air cleaner having an overall profile that is relatively low in one cross-dimension by relation to a perpendicular cross-dimension.

Typically, the media pack 431 is at least 100 mm long in extension between flow ends, often at least 150 mm, long, in some instances at least 200 mm long. It can be 250 mm or longer.

In FIG. 21, a side elevational view of cartridge 430 is depicted. Selected features previously characterized are viewable as follows: a preform 310 with handle 475, and bridge 476; and, a preform 500 including shell 480; and a seal arrangement 465 with seal member 468.

In FIG. 21, attention is directed to seal member 468. Seal member 468 includes a first, axially directed axial (housing) seal surface 468x directed toward cartridge end 433, and in use (FIG. 17) toward the air flow outlet 405x. Surface 468x will sometimes be referred to as the "downstream" pinch seal surface (or housing seal surface) or by various similar terms, since it is the axial pinch seal surface of seal member 468 directed to the downstream side. This will typically be the more critical seal surface, since it is (in installation) sealed to (against) a more downstream housing component (i.e. to housing body 402) in use.

The surface of seal member 468 opposite surface 468x, indicated in FIG. 21 at 468y will sometimes be referred to as the perimeter upstream axial surface or by similar terms. It may or not be a seal surface, but generally it is surface of the seal arrangement 468 against which a portion or tip 403e (or 497) of the access cover 403 applies pressure, to cause sealing of surface 468x against a housing, when the cartridge 430 is installed. Surface 466y will typically be non-contoured or featureless (basically flat) in perimeter extension, but alternatives are possible.

An outer peripheral or perimeter edge of the seal arrangement 468 indicated at 468p is typically not involved in sealing, as the seal arrangement 468 is (in a typical application) a pinch seal (an axial pinch seal) and not a radially directed seal. The surface 468p, however, may optionally have contour features (often recessed) of import with respect to engagement with the housing or housing componentry as discussed below.

Still referring to FIG. 21, surface 468x is a "contoured" sealing surface. By the term "contoured" in this context, it is meant that the surface 468x is not merely flat or planar in its (perimeter or peripheral) extension around the cartridge 430, but rather comprises a surface having at least one projection/recess contour therein. Contour arrangements comprising projection/recess contours that are useable include those described in WO 2014/210541 and/or WO 2016/105560, incorporated herein by reference.

Referring to FIG. 21, at 469 a projection of an example projection/recess contour is shown. The particular cartridge 430 depicted has two projection contours 469, one on each side of the cartridge 430 in overlap with long, in the example (straight), side portions of the cartridge 430, although an alternate number of projections (for example, only one) is possible.

In the particular example depicted, the two contours 469 are the same and oriented as mirror images of one another in the cartridge 430. Alternatives are possible.

Figure 21A:
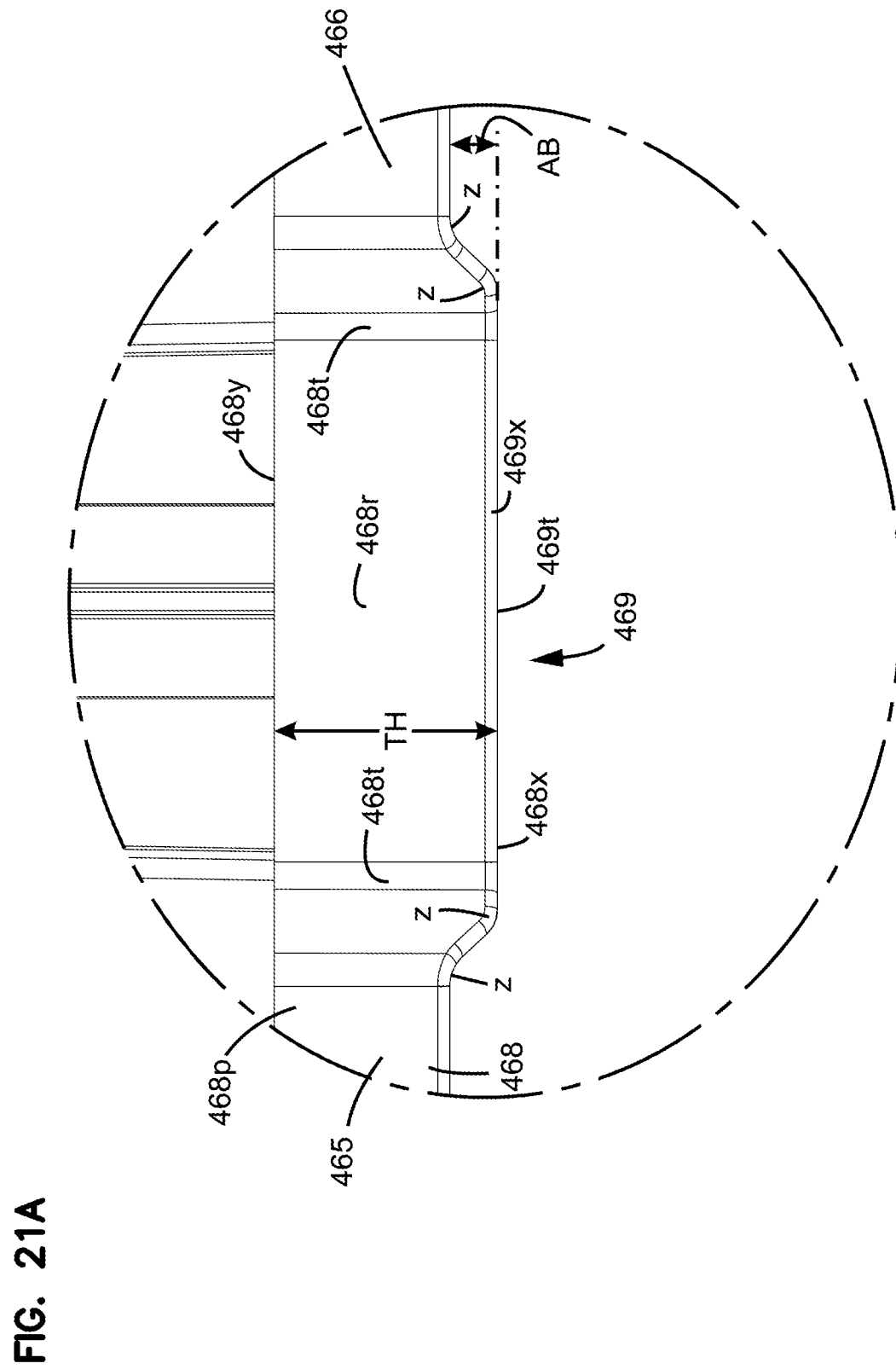
FIG. 21A is an enlarged, schematic, fragmentary view of a portion of FIG. 21.

In FIG. 21A, an enlarged fragmentary view of the seal arrangement 465 (seal member 468) in the region of a projection contour 469 is shown. Features of a typical preferred arrangement depicted in FIG. 21A are discussed further below.

Figure 21B:
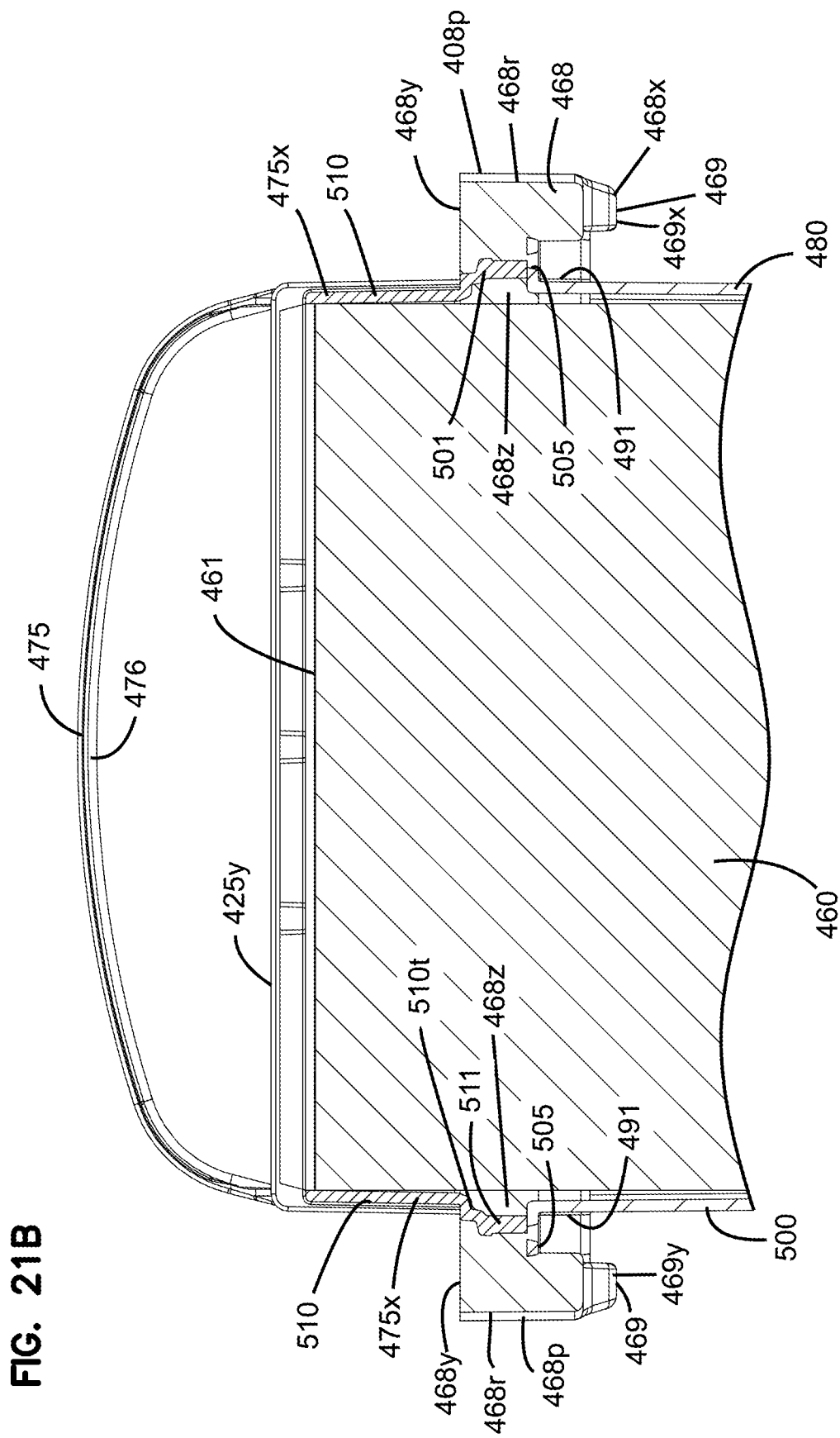
FIG. 21B is an enlarged, fragmentary, cross-sectional view taken generally along line 21B-21B, FIG. 21.

Attention is now directed to FIG. 21B, an enlarged fragmentary view taken generally along line 21B-21B, FIG. 21. Here, it can be seen that the seal arrangement 468 includes an axial seal surface 468x with two opposite projection sections 469 (469x, 469y). Selected features already discussed and also viewable in FIG. 21B include: handle arrangement 475 with handle bridge 476; media 460 with inlet end 461; rib 475y; perimeter preform section 475x; and, shell 480.

Figure 22:
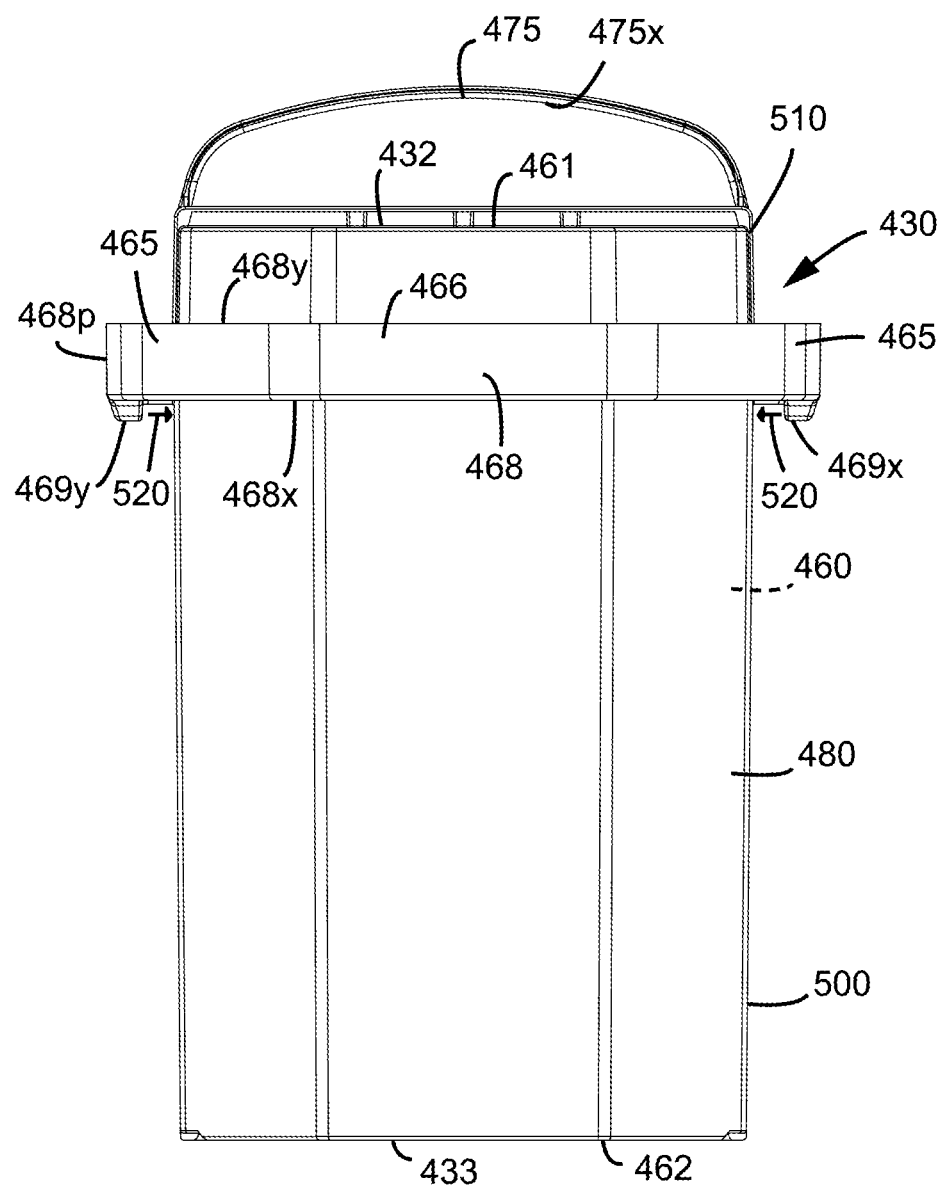
FIG. 22 is a schematic narrow end elevational view of a filter cartridge of FIG. 20.

In FIG. 22, an end view of the cartridge 430 (toward a narrow end) is shown, also allowing the two opposite projection contours 469 (469x, 469y) to be viewed.

Figure 23:
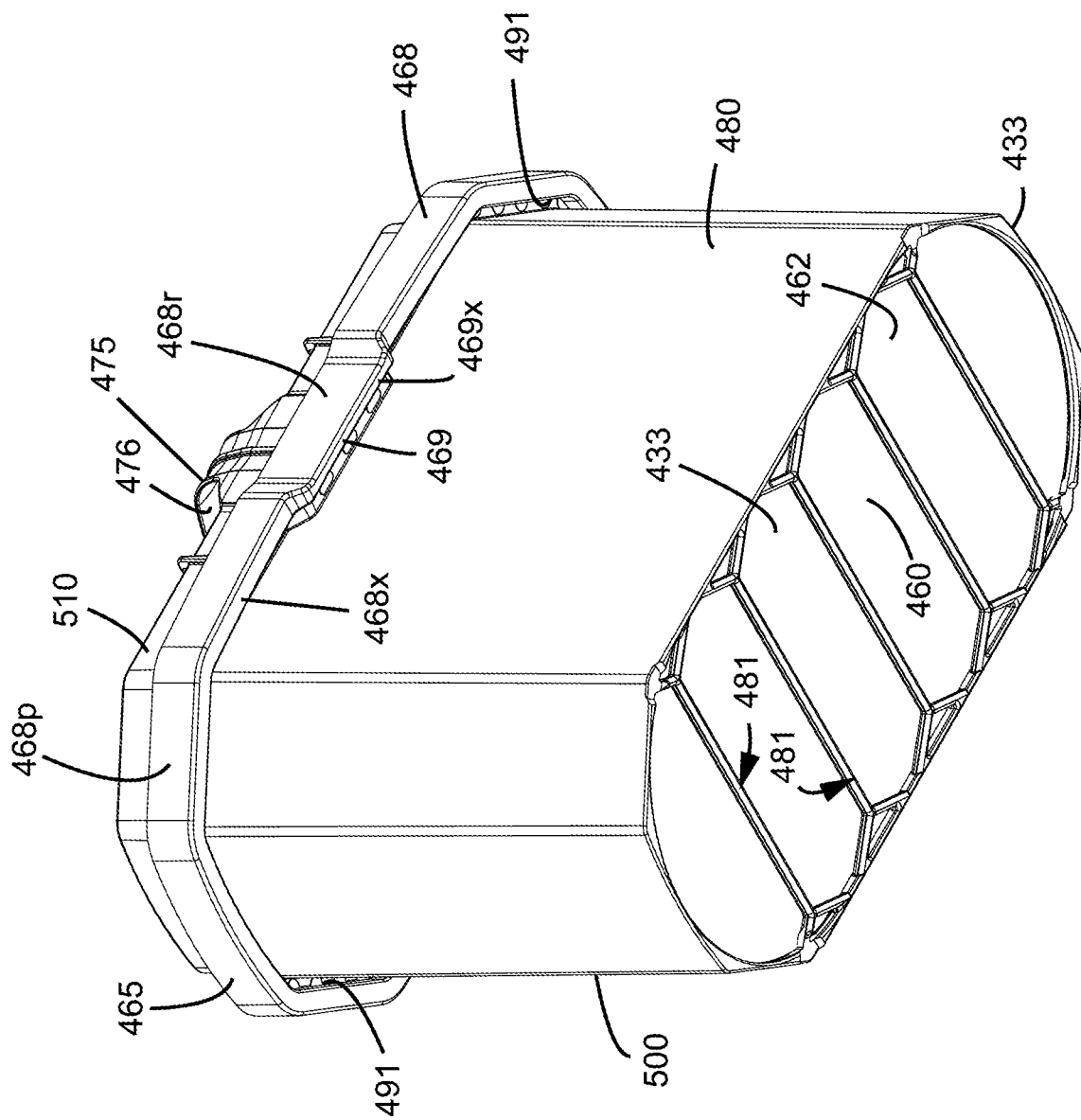
FIG. 23 is a schematic outlet end perspective view of a filter cartridge of FIG. 20.

In FIG. 23, a perspective view taken toward outlet end 433 (462) is shown. Here, grid work 481 in a preform 500 comprising shell 480 is shown, supporting media end 462 at this location. A variety of configurations for the grid work 481 can be used; the one depicted merely showing an example. The grid work 481 can be configured for preferred air flow patterns, for decoration and/or for source indicating function if desired.

Referring to FIG. 23, attention is directed to receiver recess 491. Receiver recess 491 is, generally, a receiver recess positioned between surface 468x and the media pack 460 (for the example depicted, a portion of the shell 480 surrounding the media pack 460). The receiver recess 491 is configured to receive, projecting therein, a portion of the housing body 402 during installation. The receiver recess 491 may be continuous in extension around a perimeter of the media pack 460 (as shown) but such is not required in all applications of the techniques described herein. Receipt of a housing projection into the receiver recess 491 during installation, helps to ensure that the cartridge 430 is properly positioned in the housing body 402 before the access cover 403 is applied. Also, it helps the service provider know that the cartridge 430 is a proper one (properly positioned) for the air cleaner 400 being serviced. A typical receiver recess 491 would be at least 5 mm deep, usually at least 7 mm deep, and sometimes more. It will also typically be at least 9 mm wide and often 9-15 mm wide. Also, typically the seal arrangement 485, adjacent the receiver 491, will typically be relatively thin, often less than 15 mm, and sometimes 10 mm or less. Indeed, adjacent a tip in a region where a projection is located, it may be less than 8 mm thick.

It is noted that the outer perimeter 468p may be provided with some taper toward the media, in extension along its length. This is not required, however.

Also referring to FIG. 23, attention is directed to the perimeter surface 468p of the housing seal arrangement 468. The perimeter surface 468p, for the example depicted, includes a recess arrangement 468r therein, in the perimeter. Referring to FIG. 21B, the recess arrangement 468r depicted comprises two recesses 468r positioned as mirror images of one another in the cartridge. In the example depicted, each recess 468r is positioned in perimeter alignment (i.e. overlap) with a contour projection 469 in surface 468x. This is typical and preferred for reasons discussed below, but alternatives are possible.

Attention is now directed back to FIGS. 17 and 17A. The housing body 402 includes a seal shelf 490 against which surface 468x of seal arrangement 468 is compressed, during sealing. Attention is directed to the enlarged view of FIG. 17A, in which seal surface or shoulder 490 is viewable. Surface 490 includes an optional central seal rib 495 thereon, against which seal surface 468x is pressed, to facilitate sealing. Seal rib 495 in the example depicted, is a continuous rib extending completely around the media pack, in surface 490, when the cartridge is installed. The rib 495 can be discontinuous if possible. A typical rib will be on the order of 0.2-2 mm high in relief relative to adjacent portions of the shelf 490. Usable such ribs are described, for example, in WO 2016/105560 and WO 2014/210541, incorporated herein by reference.

Also, viewable in FIG. 17A is projection 495 on the housing body, extending into receiver recess 491 on the cartridge 430. Further, and still referring to FIG. 17A, one can see where tip 497 of the access cover 403 would press against the seal arrangement 468 to cause sealing pressure.

In general, the housing body 402 will be configured so that sealing shelf 490 is contoured in a manner that mates with the contoured sealing surface 468x; and, so that any surrounding outer wall of the housing body 402 is configured to mate with any recess arrangement 468r in the perimeter of the sealing arrangement 468. In FIG. 13, a perimeter portion of the housing body 401 at 401p is shown pressed inwardly to mate with such a recess 468r. Such a feature can be molded into the housing body 402 when formed.

D. Assembly of the Main Filter Cartridge 430, FIGS. 23-25A, Generally

From a review of FIGS. 23-25A, an approach to manufacturing a cartridge analogous to cartridge 430 will be understood. This can be in general accord with related descriptions in WO 2016/105560 and WO 2014/210541, incorporated herein by reference. Further, some preferred features will be understood.

Figure 24:
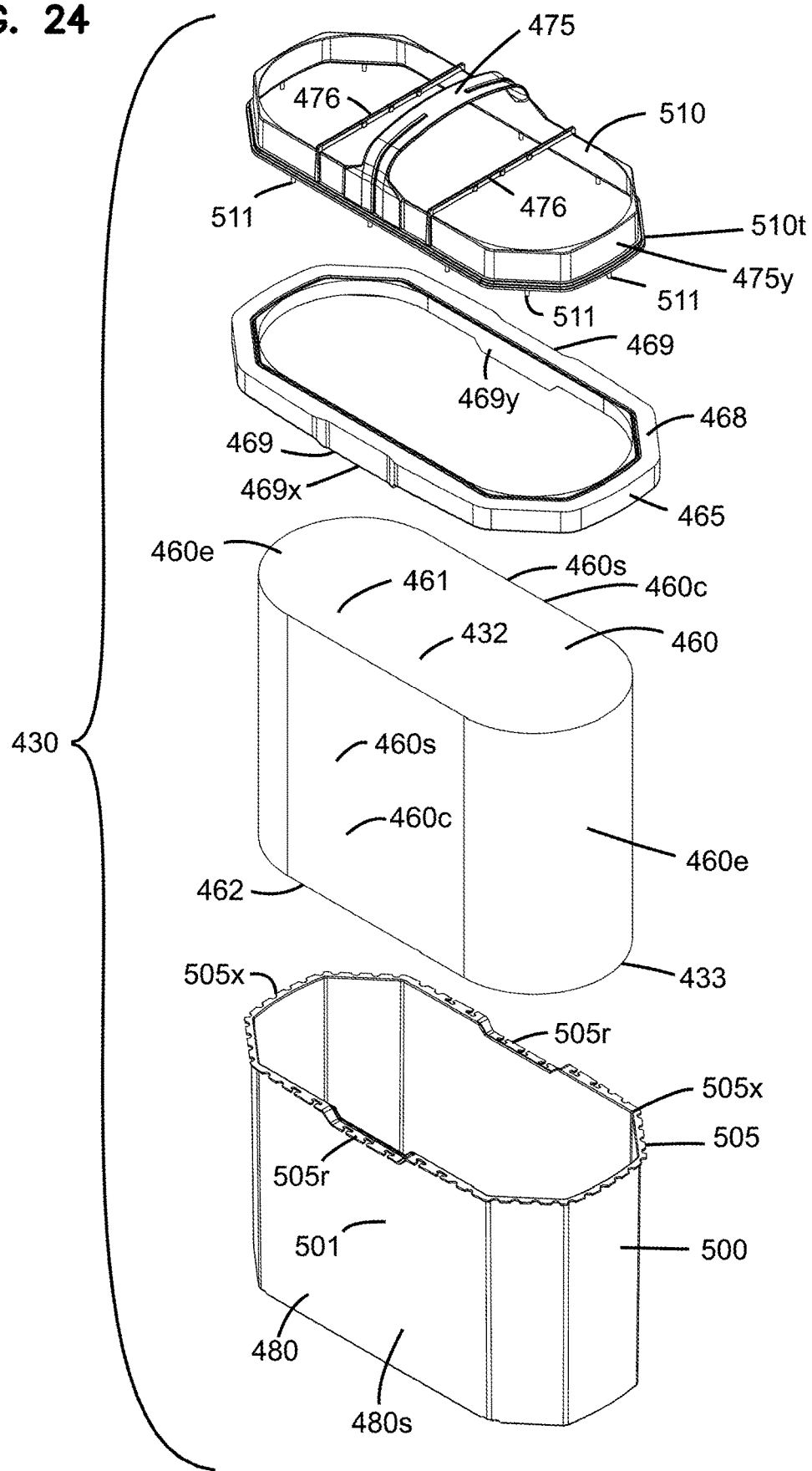
FIG. 24 is a schematic, exploded, inlet end perspective view of the filter cartridge of FIG. 20.

Referring first to FIG. 24, an exploded perspective view of cartridge 430 is depicted. Attention is first directed to media pack 460. The example media pack 460 is, generally, an oval shaped media pack having opposite curved (typically semi-circular) ends 460e; and, opposite sides 460s extending therebetween. The particular oval configuration depicted, is sometimes referred to herein as a "racetrack oval" since the opposite sides 460s include central straight sections 460c, that are generally parallel to on another. Such media packs can be configured using coiled arrangements discussed above in connection with FIG. 6, but alternate media choices can be used. It is noted that alternatives to oval shapes can be used with principles according to the present disclosure. However, in many applications, the principles will be applied with (racetrack shaped) oval arrangements having a long axis and a short axis perpendicular to the long axis, with a ratio of the long axis to the short axis being at least 1.4, often at least 1.5 and typically within the range of 1.8-3.0.

The media, when it comprises a coil of media, may be provided with a preformed center core, or it may be provided without such a core, for example in accord with U.S. Pat. No. 8,226,786, incorporated herein by reference.

Still referring to FIG. 24, attention is directed to preform 500, in the example comprising shell 480. By the term "preform" herein, it is meant that the referenced component is formed prior to construction of the cartridge 430 and is then used as a component 500 in the construction of the cartridge 430. The particular preform 500 depicted includes a peripheral perimeter sidewall or section 501 that surrounds the media or media pack 460; and, a radially outwardly extending peripheral projection 505 which is embedded in the seal arrangement 465 when the cartridge 430 is formed. The projection 505 is discussed further herein below.

In FIG. 24, a second preform 510 is also depicted, which is separate from (first) preform 500 and includes the handle member 475, the periphery 475x, and grid work 476, previously discussed. The preform 510 also includes optional axial spacer projections 511 that extend into the seal arrangement 465 when the seal member 468 is molded. The projections 511 operate, during assembly, as spacers to properly position the preform 510 relative to preform 500 in the mold. With respect to this, attention is directed to FIG. 21B, in which selected spacers 511 are shown abutting projection 505.

From this description of FIG. 21B, it will be understood that the projections 511 can be used, as the cartridge 430 is assembled, to properly position the two preforms (represented by the handle preform 510 and the shell preform 500) adjacent one another in the mold while leaving resin flow space therebetween. Of course, the projections 511 might not engage projection 505 where projections 505 has a dip or modification in it, such as where a projection 469 is located, as discussed below.

At 468, the seal member is depicted, in FIG. 24. This would not be a preformed component, but typically would be molded-in-place once: the media pack 460; first preform 500; and, the second preform 510 are properly positioned in a mold. In a typical approach to construction, the seal arrangement 488 would include a portion molded directly to and surrounding the media 460, to form a seal therewith. It would then have the projections 511 extending therein, as well as tip 510*t* of preform 510, FIG. 12B.

Typically, the seal arrangement 468 will be molded from a flowable resin. A variety of materials, that can be provided in an uncured flowable form, which will then cure to a structure retaining its shape, but sufficiently which is compressible to operate as seal member, are known. Examples are described in WO 2014/210541 and WO 2016/105560, incorporated herein by reference and which are discussed below.

Still referring to FIG. 24, it is noted that a perimeter shape of sidewall 480*s* of shell 480 is not a perfect perimeter match to the oval perimeter shape of media pack 460. Rather, the depicted perimeter 480*s* generally comprises some relatively straight sections. Of course, shell side 480*s* could be made oval to mate with oval media pack 460. However, the example of FIG. 24 shows that alternatives are possible. Space between the media pack 460 and the sidewall 480*s* would generally be filled (adjacent an end having projection 505 therein) by resin having flowed between the shell 480 and the media pack 460 at this location. Alternately stated, when the resin that forms arrangement 468 is poured into the mold, it will typically be positioned to flow against and engage the media pack 460. This can be seen, for example, in FIG. 21B at 468*z*.

In FIG. 25, an exploded perspective view of cartridge 430 taken toward the outlet end is shown. Features previously described are indicated, generally, as follows: first preform 500; media 460; molded seal arrangement 465; and, second preform 510.

Figure 25A:
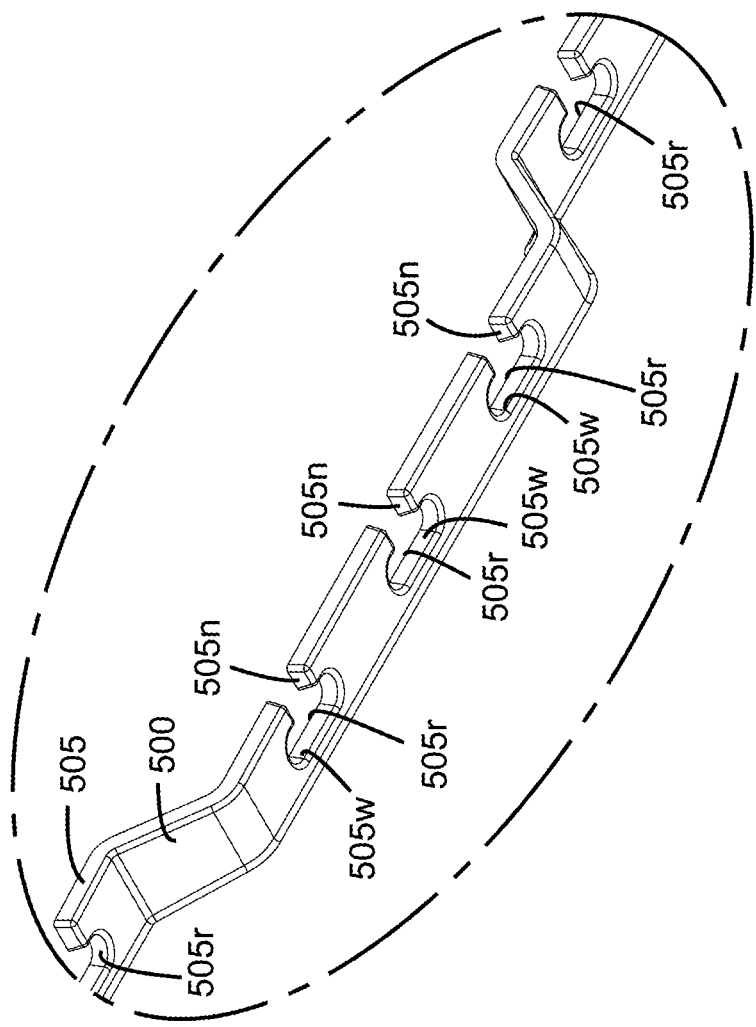
FIG. 25A is an enlarged schematic fragmentary view of an identified portion of FIG. 25.

In FIGS. 24 and 25, peripheral projection 505 on preform 500 is depicted. The particular projection 505 shown, includes peripheral resin (or resin flow) recesses 505*r* therein (FIG. 25A) into which resin can flow during molding of the arrangement 468. This can help secure the components together. The receiver arrangement can (alternatively) comprise a plurality of apertures through flange 505. However, in the example depicted, it comprises a plurality of resin flow recesses, each having a T-shape, and each with a wide section 505*w* radially inwardly from an outer edge, and narrow end or neck 505*n*. These can be seen, for example, in FIG. 25A, with wide T-tips 505 and narrow necks 505*n*. As the resin flows into flange 505, it will help secure the resulting in seal arrangement 468 from being pulled away from the preform 500 (or the preform 500 from being pulled away from the seal arrangement 468). Typically and preferably, the wide sections 505*w* are at least 30% wider than the narrower necks 505*n*.

E. Example Preferred Contour Features in Seal Arrangement 468, FIGS. 21-21B
1. General As described above, in the example cartridge 430 depicted, the housing seal arrangement 468 has: an axial pinch seal sealing surface 468*x* configured with a projection/recess contour; and, an outer perimeter 468*p* with a perimeter recess arrangement 468*r* therein. In this section, some example dimensions and features of typical preferred arrangements are provided. Alternatives are possible.

Referring to FIGS. 21 and 21A, a selected projection 469*x*, 469*y*, in the projection arrangement 469 is sometimes referred to herein as a "step." Again, it is noted that the particular seal arrangement 468 depicted, includes two steps 469 (469*x*, 469*y*) one aligned with each of the opposite sides of the cartridge 430. Referring to FIGS. 21 and 21A, in the example each of the steps 469*x*, 469*y* is a "single step", i.e. each does not itself include multiple steps. Alternatives are possible, for example such as those described in, WO 2014/210541, incorporated herein by reference.

2. Seal Symmetry

In this section, features of symmetry/asymmetry are discussed with respect to the housing seal arrangement 465. A variety of possibilities can be practiced with the techniques described herein.

A first characterized concept with respect to seal symmetry, is rotational symmetry. Rotational symmetry, as discussed herein, is symmetry in rotation around an axis that extends through a center of the cartridge 430, in the direction between the opposite flow ends (432, 433) or flow faces (461, 462). It can be characterized as a central axis around which the housing seal arrangement 465 extends. A seal member housing or seal arrangement 485 (or seal member 468) has rotational symmetry, specifically 180° rotational symmetry, if it can be rotated 180° and align with itself. Examples of rotational symmetry or 180° rotational symmetry, in the seal arrangement 465, is provided for example, by the embodiment depicted in FIG. 20-23A.

Planar symmetry or asymmetry can also (or as an alternative) be defined for the housing seal arrangement 465 or seal member 468. In general, for arrangements that have a long cross-sectional axis and a shorter cross-sectional axis, (perpendicular) generally the longer axis plane would be a plane through the center of the housing seal arrangement 468 in long-dimension; and, a short-dimension (axis) plane would be a plane through the short dimension at a center of, and perpendicular to, the long dimension. With respect to any defined plane, planar symmetry would be a situation in which the housing seal arrangement defines a mirror image, in shape, on an opposite side of the plane from a first side. With asymmetry, there would be no such mirror image.

An example of long-dimension planar symmetry, in the seal arrangement 465 (or seal arrangement 469), is provided, for example, in the embodiment of FIGS. 20-23A. Short-dimension planar symmetry, in the seal arrangement 465 (or seal member 469), is also shown in the embodiment of FIGS. 20-23A.

Thus, a seal arrangement 468 can have both long-dimension planar symmetry and a short-dimension planar symmetry. Another alternate arrangement can have long-dimension planar symmetry and short dimension planar asymmetry. An alternate arrangement can have long-dimension asymmetry and short dimension symmetry. An arrangement can be asymmetric with respect to each of a long-dimension plane and a short dimension plane.

Any of the variety of arrangements in variations characterized herein, can be applied with any of the types of symmetries or asymmetries characterized. The selected symmetries/asymmetries features with respect to rotational and the two planar definitions can be used in a variety of ways to advantage.

For example, 180° rotational symmetry can be used to allow that a cartridge can be rotated in either of a two orientations during installation, which can be convenient in some applications. On the other hand, if it is desired to allow for only one rotation, for example to manage a possible MAFS (mass air flow sensor) issue or other issues, this can be accommodated as well by providing no such rotational symmetry. Further, the combination of symmetry/asymmetry characterizations can be used to provide a unique appearing cartridge with respect to any selected system. This can facilitate servicing, i.e. recognition of the appropriate service part for the system of concern.

It is noted that the seal arrangement 465 is not oval, in perimeter shape, although oval shapes could be used. Rather, the particular perimeter shape of the seal arrangement 465 is one which generally corresponds to surrounding portions of the housing body 402. This will be typical. Alternatives, of course, are possible.

3. Example Seal Step Definition(s)

In the example embodiment characterized herein, the contoured axial surface section of the projection/receiver housing axial seal arrangement, is shown as having a contour (i.e. stepped or step) configuration. In general terms, each contoured section (in the example projections 469) within a contoured surface, will have a tip that tends to not extend over more than about 200 mm (dimension AA, FIG. 21), typically not more than about 180 mm, and usually not more than 150 mm, in extension along a periphery or perimeter of the media 460. Typically, within a stepped region, each step has a non-contoured (flat) section or tip extending at least 10 mm, and usually at least 30 mm, often at least 40 mm, in many instances within the range of 40-120 mm.

Typically, each step 469, FIG. 21 in maximum axial direction relief from an immediately adjacent portions of the housing seal surface 468x, extends at least 3 mm, often at least 4 mm, typically at least 5 mm, usually not more than 12 mm, and in many applications, within the range of 4-10 mm, inclusive. This is represented by dimension AB, FIGS. 21 and 21A. By "immediately adjacent" and variants thereof, as used herein, reference is meant to a feature in the construction that is adjacent to the other feature characterized. Thus, an immediately adjacent housing seal surface 468x to each step 469, is a non-contoured surface portion of the housing seal surface 468x next to where each step 469 is positioned.

Generally, and referring to FIG. 21, an angle (indicated at AC, FIG. 21) of extension of a straight transition section to a first step section or other flat tip section of the seal arrangement is within the range of about 95°-150°, typically 120°-150°, with a radius of curvature at each end being non-sharp, to facilitate engagement with the housing surface. These angles are indicated at AC, FIG. 21. Preferably the radius of curvature where the transition section engages a flat perimeter section (either one of the steps or a non-contoured portion of the adjacent axial seal surface) has a radius of at least 2 mm, usually within the range of 2-10 mm, often within the range of 4-8 mm, inclusive. In some instances, it can be characterized as having a radius of at least 8 mm, and can be quite large. The issues relating to the radius of curvature at the similar sizes of the transition ends (not too sharp a radius so as to inhibit sealing) is different than issues control the radius of curvature at the larger end of the range. It should typically be sufficiently large for good sealing, but not so large that undesirable extra length of perimeter is needed to manage the transition. Examples of these ends of transition sections are shown at Z, FIG. 21A.

It is also noted that when the peripheral perimeter edge 468p has one or more peripheral recesses 468r toward the media 460, the contours or recess 468r will have end transition regions 468t (FIG. 21A) where they engage the non-contoured portion of the edge. Typically, the radius of curvature at these locations should be within the range of 2-6 mm, inclusive for convenient transitions.

Typically, each peripheral recess 468r has a maximum amount of recess relative to immediate end; and, outermost portions of the perimeter 468p of at least 0.4 mm, typically not more than 3 mm, and often within the range of 0.5-2 mm, although alternatives are possible.

Typically, when the regions 469 are stepped, for example as characterized in FIG. 21A, the stepped tip portion 469t (FIG. 21A) of each projection has a non-contoured tip portion 468t in a plane generally parallel to the non-contoured surface section of the non-contoured portion of the same axial seal surface, with the planes separated by at least 2 mm, usually at least 3 mm, sometimes at least 4 mm. In some instances, it can be quite large. This is the plane separation indicated at AB, FIG. 21A.

Referring to FIGS. 21 and 22, it is noted that the overall seal arrangement 468 has an outer perimeter with a thickness (axial direction) typically of no greater than 50 mm, usually at least 15 mm, and often within the range of 15-40 mm, although alternatives are possible. This is indicated at dimension TH, FIG. 21A. It is noted that there will be a variation in axial thickness between the portions with the steps 469 and portions without. This difference, of course, is a height of maximum relief dimension of the steps 469.

Referring to the example of FIGS. 21-21A, the seal surface 468x can be characterized as having "projection" sections 469; and, non-projection or non-contoured transition sections therebetween. Typically, the total perimeter length represented by the projection sections is relatively short by comparison to a total extension of the surface 468x. Typically, the projection sections 469 when measured in this manner, in total comprise no more than 50% of the total perimeter extension of the seal surface 468x in which they are positioned, usually no more than 40%; and often no more than 30%, and in some instances, even less.

While a variety of materials can be used to form the molded-in-place seal portion 468, typically the materials will be sufficient soft and resilient to the contouring of the surface 468 can fully engage housing features in a sealing manner. Typically, a foamed polyurethane material or similar foam material will be used. Examples of usable materials are ones that can be molded to an as molded density (desirable for providing sealing) of typically no greater than 450 kg/cm$^3$, usually no greater than 355 kg/cm$^3$; and, often no greater than 290 kg/cm$^3$, for example 190-300 kg./cm$^3$. Typically, it will be molded to a hardness, Shore A, of no greater 40, typically no greater than 30; and, often greater than 22, for example 10-20. A variety of usable materials can be obtained from resin suppliers.

From a review of the above characterized process, and in the general configuration of housing seal arrangement 465, one can understand why it is advantageous to include axial alignment between the contoured sections 469 (in surface 468x) and edge projection/recess contour sections 468r. A reason for this is that edge recess sections 468r make the housing seal arrangement 465 thinner (in cross-dimension perpendicular to air flow) and thus can facilitate resin volume management in the mold creating the contoured projections 469. Alternately stated, a resin volume reduction provided by recesses 468r can be accompanied by a resin volume expansion resulting from projection sections 469. This will be typical and advantageous, but is not required in all applications of the techniques described herein.

In more general terms, a projection member of a projection/recess contour on a axial sealing surface can be characterized as having a flow direction cross-dimensional area of $A_1$. In some instances, the housing seal arrangement will also be configured so that in a non-contoured section, the flow direction cross-dimension area would be area $A_2$, with a $A_1$ being substantially similar to $A_2$ (in this context, substantially similar meaning $A_1$=0.9-1.1 $A_2$). Typically, the two sections will be shaped with a cross-section area as would be $A_1$=0.92-1.08 $A_2$, preferably, $A_1$=0.95-1.05 $A_2$. Herein, the term "flow direction cross-sectional dimension" or similar terms are meant to refer to a cross-section in a plane parallel to the direction between the opposite flow ends of the cartridge. $A_1$ would be the cross-sectional area taken through a maximum portion of projection; and, $A_2$ would be a cross-sectional area taken through a portion of the seal arrangement that does not have a contour therein. These are described in WO 2016/105560 and WO 2014/210541, incorporated herein by reference. Of course, alternatives are possible.

F. Features Relating to the Receiver Recess 491; and/or Inhibition of Undesired Roll or Deformation in the Seal Surface 468x 1. General Referring again to FIG. 22, attention is directed to the projection contours 469 (469x, 469y). It can be seen that these are regions of the seal surface 468x that extend further toward cartridge end 433 (or media end 462) than adjacent portions of the surface 468x. As a result of these projections 469, corresponding molded seal portions can have a tendency to deform during handling and installation, for example by rolling inwardly in a direction indicated by arrows 520, FIG. 22. It is desired to provide the cartridge 430 with features to inhibit any undesirable deformation or roll of this type. Features of the cartridge 430 that are provided to facilitate this, can be understood from the following.

The example preferred cartridge 430 is provided with a preform having a seal deformation inhibition projection arrangement thereon, which extends into the molded resin of the seal arrangement 465 at a location in perimeter alignment with the contoured projection(s) 469 (469x, 469y), and in a position to help stabilize the projections 469 against undesirable roll or deformation.

In the particular cartridge 430 depicted, the preform arrangement in which such a deformation inhibition projection arrangement is provided is the preform 500 (in the example comprising the shell 480); and, in particular, the deformation arrangement is provided in peripheral projection 505. This can be understood from a review of FIGS. 24-25A.

In particular, and referring to FIG. 24, peripheral projection 505 of preform 500 includes sections 505x and 505r. Sections 505r are recessed portions in the projection 505 (relative to sections 505x) and are located, in the preform 500, in perimeter alignment with where the contoured projections 469 (469x, 469y) will be located in the molded seal arrangement 465 (seal member 468). These sections 505r are recessed (from sections 505x) toward downstream end 462 of the media pack 460 (or end 433 of the cartridge 430). As a result of their configuration, they (sections 505r) are engage the molded-in-place seal arrangement 465 at a location further toward tips of the projections 469x, 469y than are other portions 505x of the projection 505. This will help provide support against roll or deformation of the type described above. With respect to this, it is noted that it is not necessary that the recesses 505r extend into the actual projections 469 at locations lower than remaining (non-projecting) portions of surface 468x. This choice can be a matter of convenience for assembly. Typically, each recess 505r will be at least 2 mm deep, usually at least 3 mm deep and often within the range of 3-10 mm deep, relative to a tip of the preform 500 represented by sections 505x.

It is noted that the particular preform 500 depicted, includes shell 480. However, the technique can be practiced in arrangements in which the associated preform does not extend all the way along the length of the media 460 (as does shell 480) but rather is positioned adjacent media end 461 where the seal member 465 is positioned. That is, as an alternative to preform 500, a preform can be used which extends around the media pack and provides for projection 505 (with sections 505x, 505r) but does not provide side extensions that extend the complete length of the media pack 460.

Referring to FIG. 24, it is noted that the projection 505, with sections 505x, 505r, is generally configured to mimic a shape of surface 468x, with projection sections 469 thereon. This is typical, but not required. For example, although the recess sections 505r have approximately the same perimeter length and shape as the projections 468x, for perimeter alignment along a flow length of each, stabilization against roll or deformation can be managed with smaller sections 505r.

There is also no specific requirement that the arrangement which provides inhibition of roll, be a portion of flange 505. It can comprise alternate projections in a preform in an appropriate location, if desired.

It is also noted that section 505r can be characterized as "projection" when viewed as a portion of the preform 505 projecting toward an outlet end or flow face 433 of the cartridge 430.

It is also noted that the flange 505 can be positioned to help prevent deformation or roll in portions of the seal arrangement 468 where projections 469 are not located. This is facilitated by having the flange 505 located as far down toward surface 468x as possible. In the example depicted, flange 505 is located at an end of recess 491, as discussed below. This will be useful for the anti-deformative purposes, but some advantage can be obtained even without such a location.

Typically and preferably, when the projection arrangement 505 is positioned to help inhibit roll, or undesired deformation, it is positioned in engagement with the seal member 468 at a location within 20 mm of edge 468x, usually within 15 mm of such an edge, and often within about 12 mm of such an edge. Alternatives are possible, however.

2. Features in the Housing to Accommodate the Modified Projection 505 (with Recesses 505r)

Figure 26:
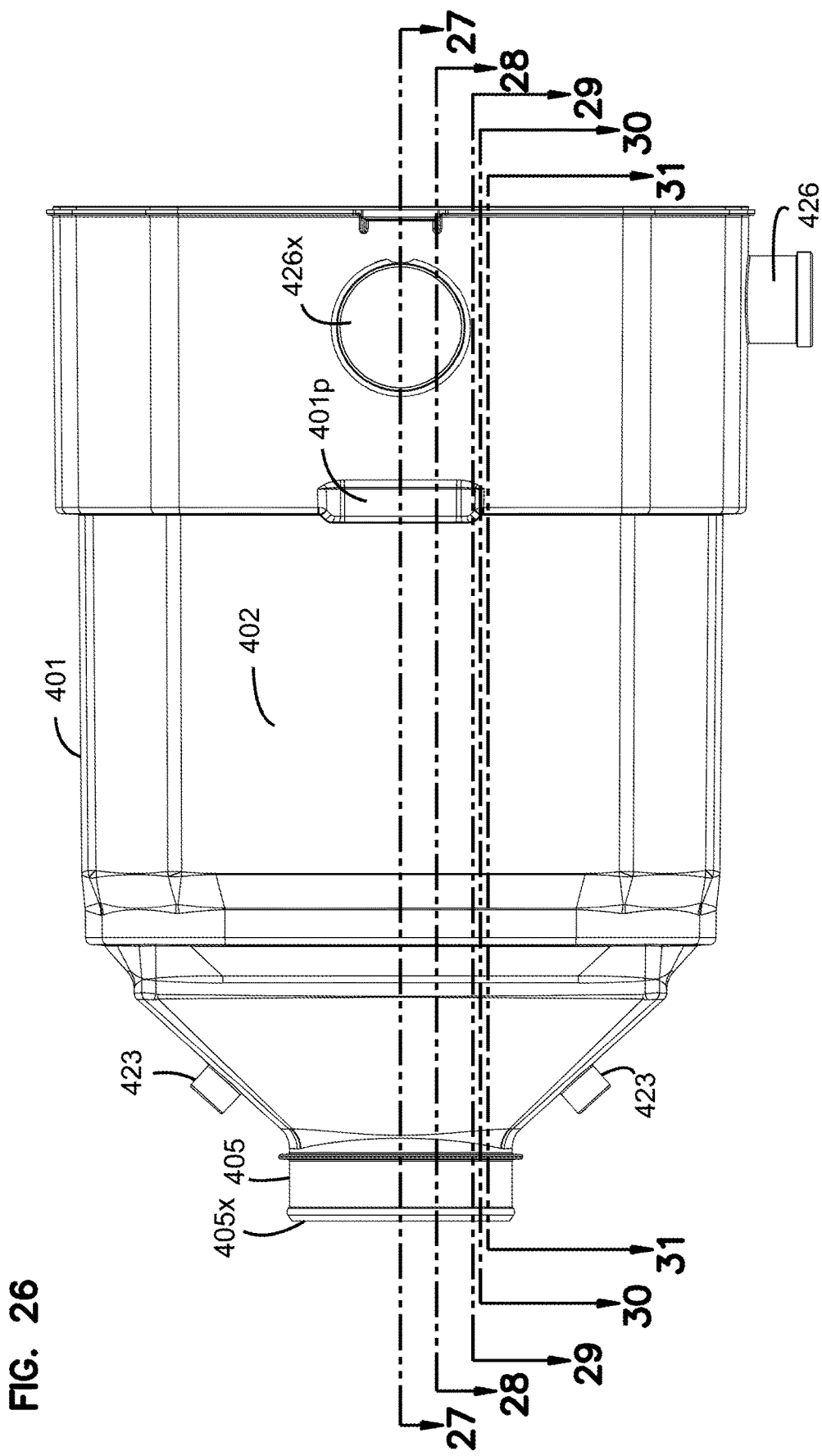
FIG. 26 is a second schematic side elevational view of the air cleaner assembly of FIGS. 13-15.
Figure 27A:
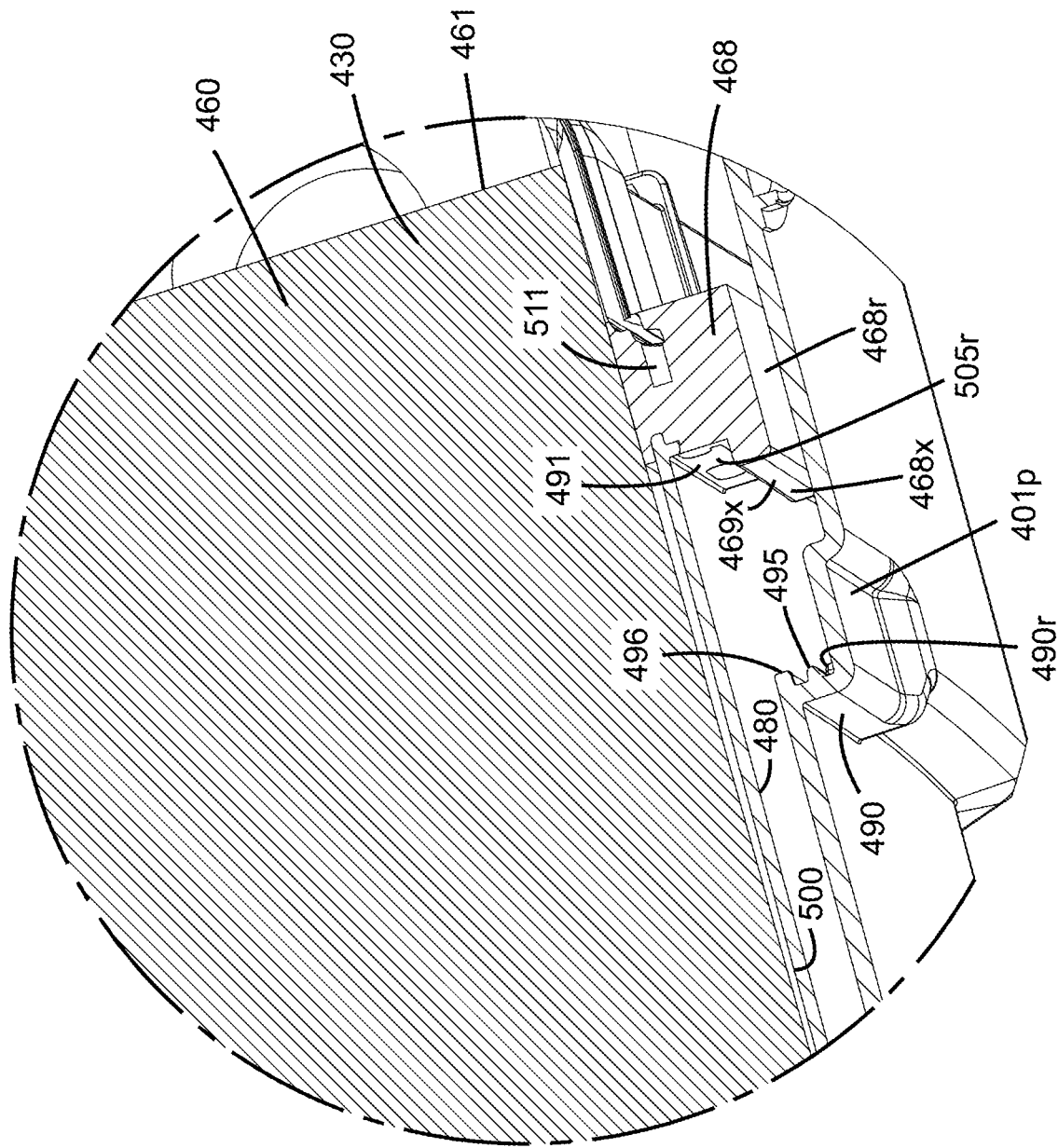
FIG. 27A is an enlarged fragmentary view of an identified portion of FIG. 27.
Figure 27B:
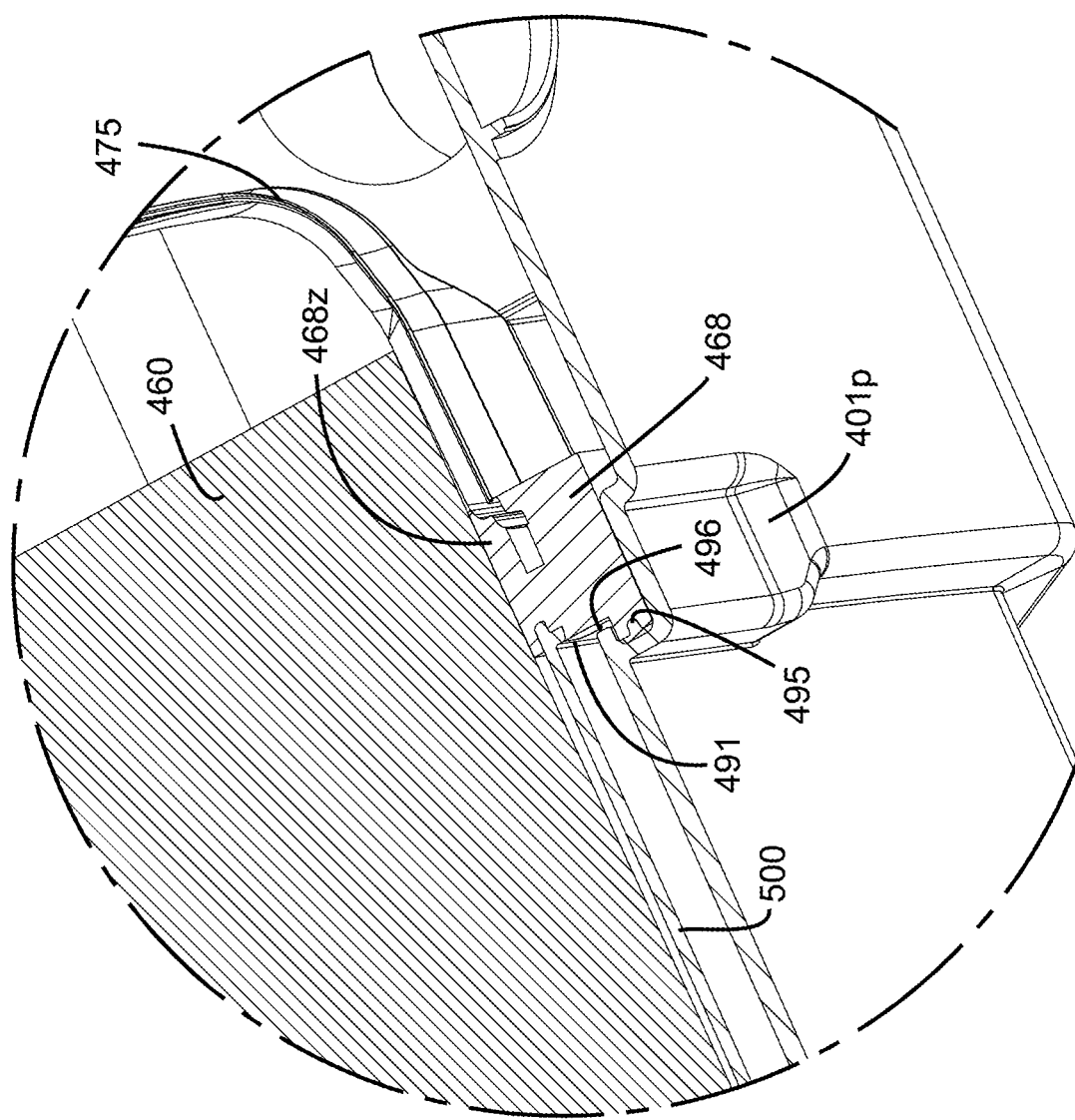
FIG. 27B is a schematic view corresponding to FIG. 27A, but depicting a cartridge in a non-exploded (or installed) orientation.
Figure 28A:
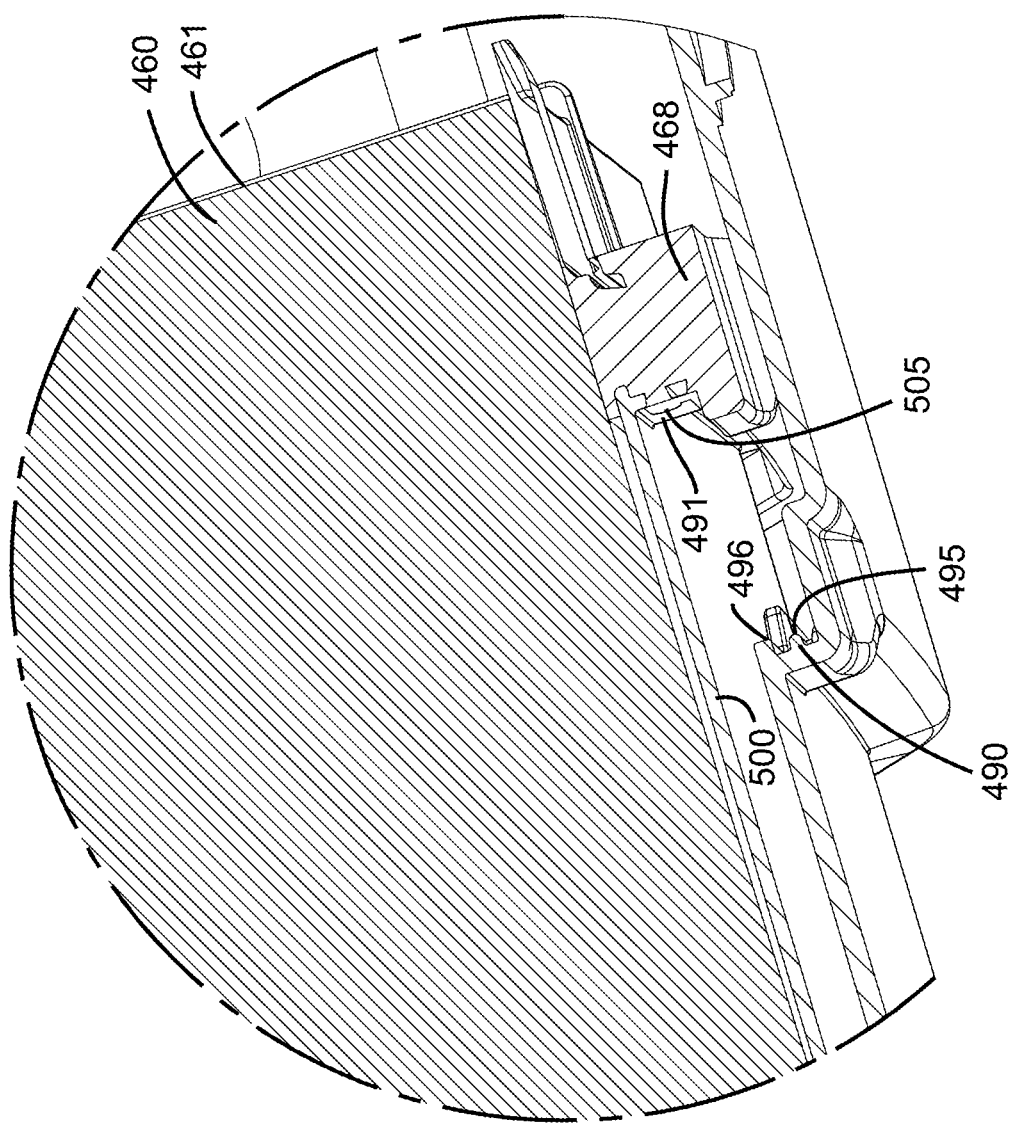
FIG. 28A is an enlarged schematic fragmentary view of an identified portion of FIG. 28.
Figure 28B:
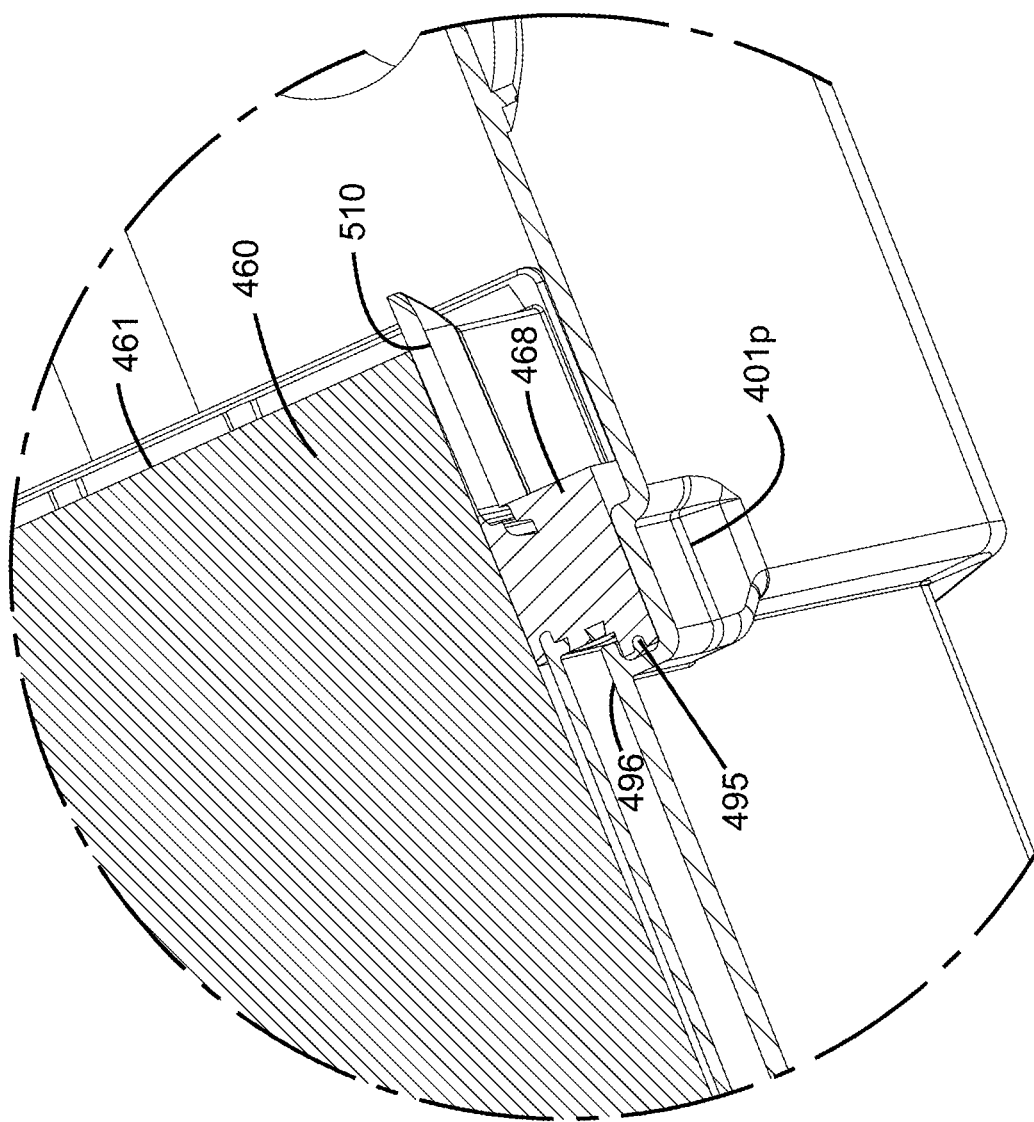
FIG. 28B is an enlarged fragmentary schematic view analogous to FIG. 27A, but depicting a cartridge in a fully installed orientation.
Figure 29A:
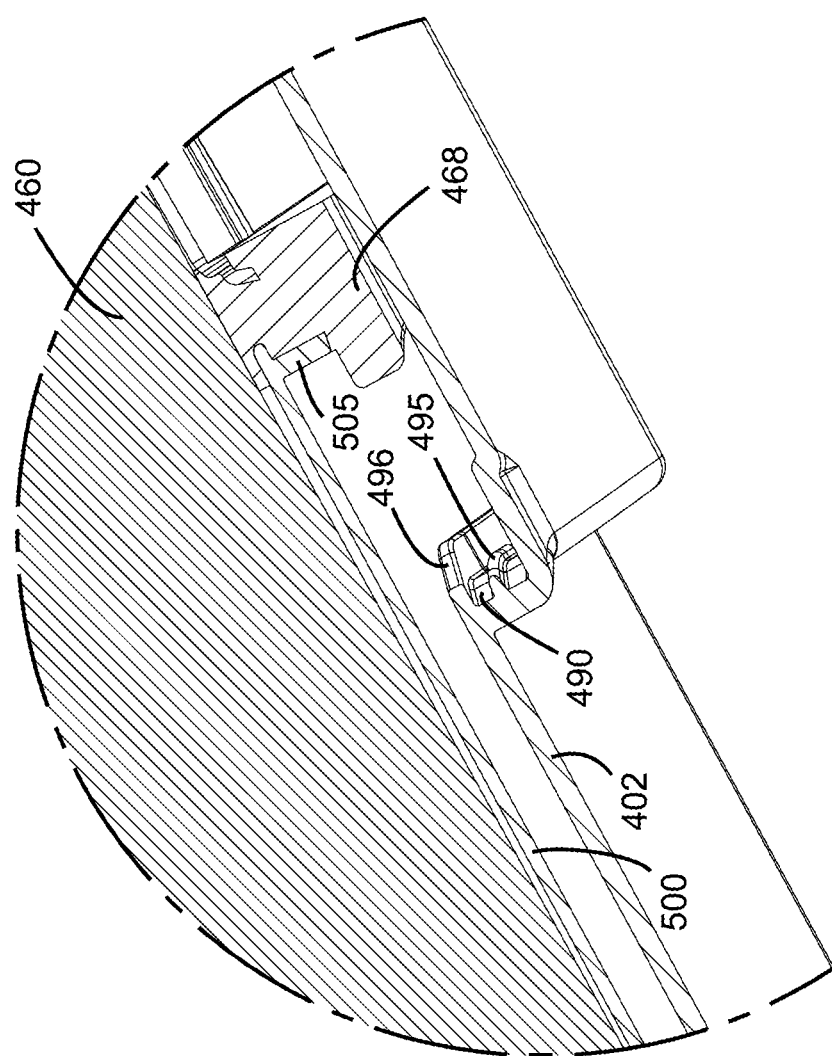
FIG. 29A is an enlarged fragmentary schematic view of an identified portion of FIG. 29.
Figure 29B:
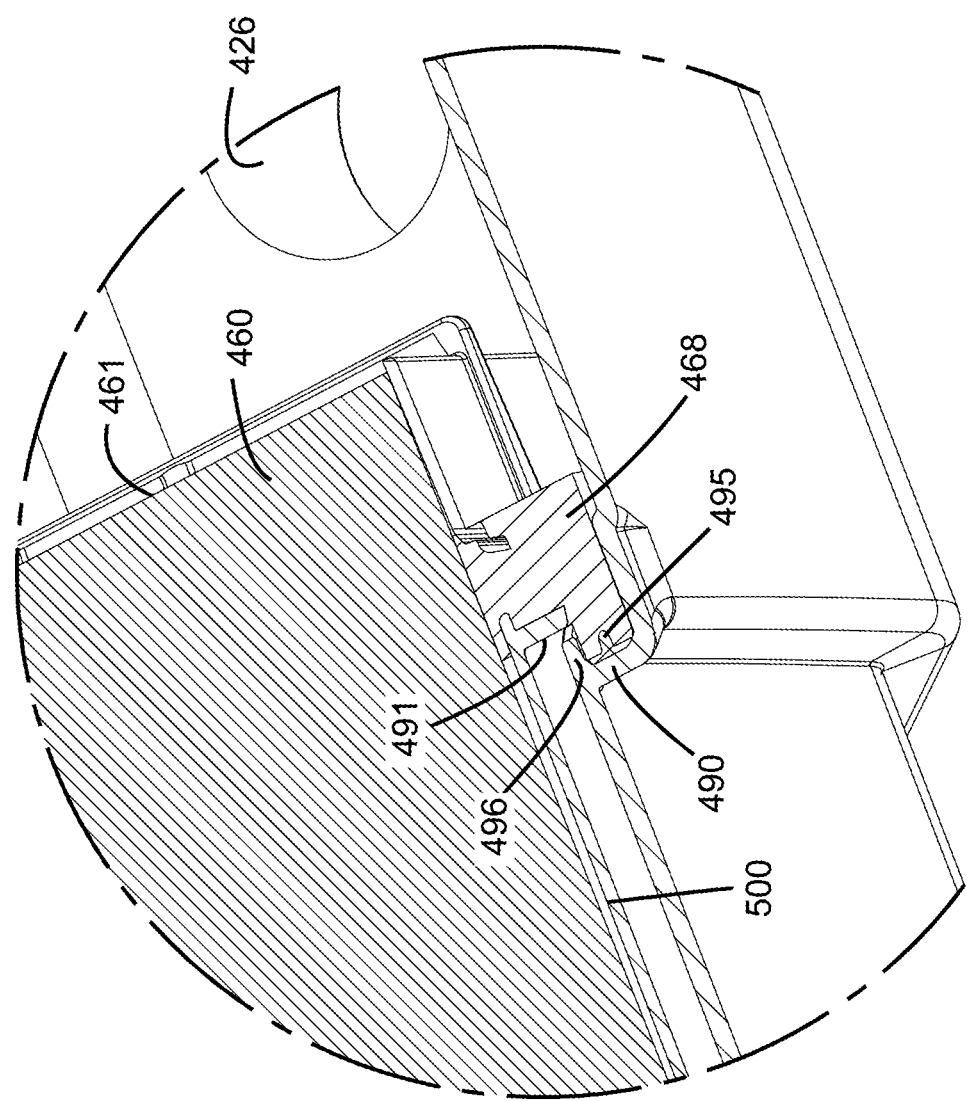
FIG. 29B is an enlarged fragmentary view analogous to FIG. 29A, except depicting the cartridge fully installed, rather than in exploded orientation.
Figure 30A:
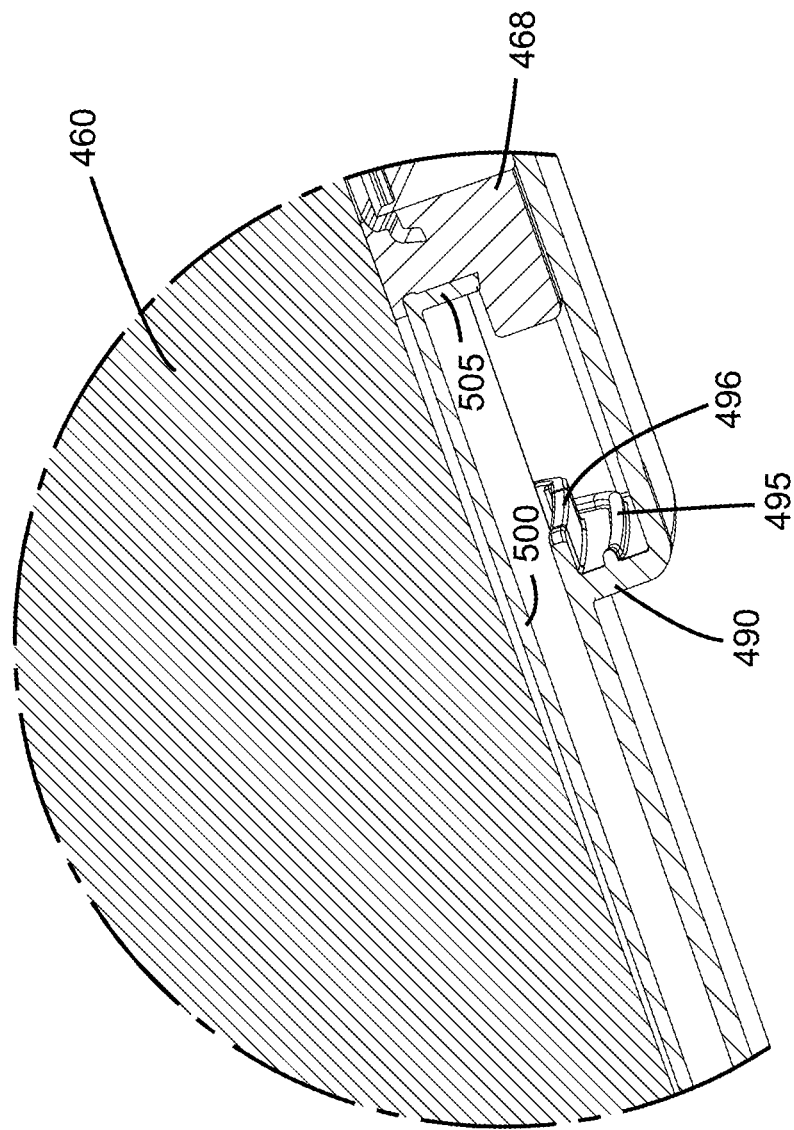
FIG. 30A is an enlarged fragmentary schematic view of an identified portion of FIG. 30.
Figure 30B:
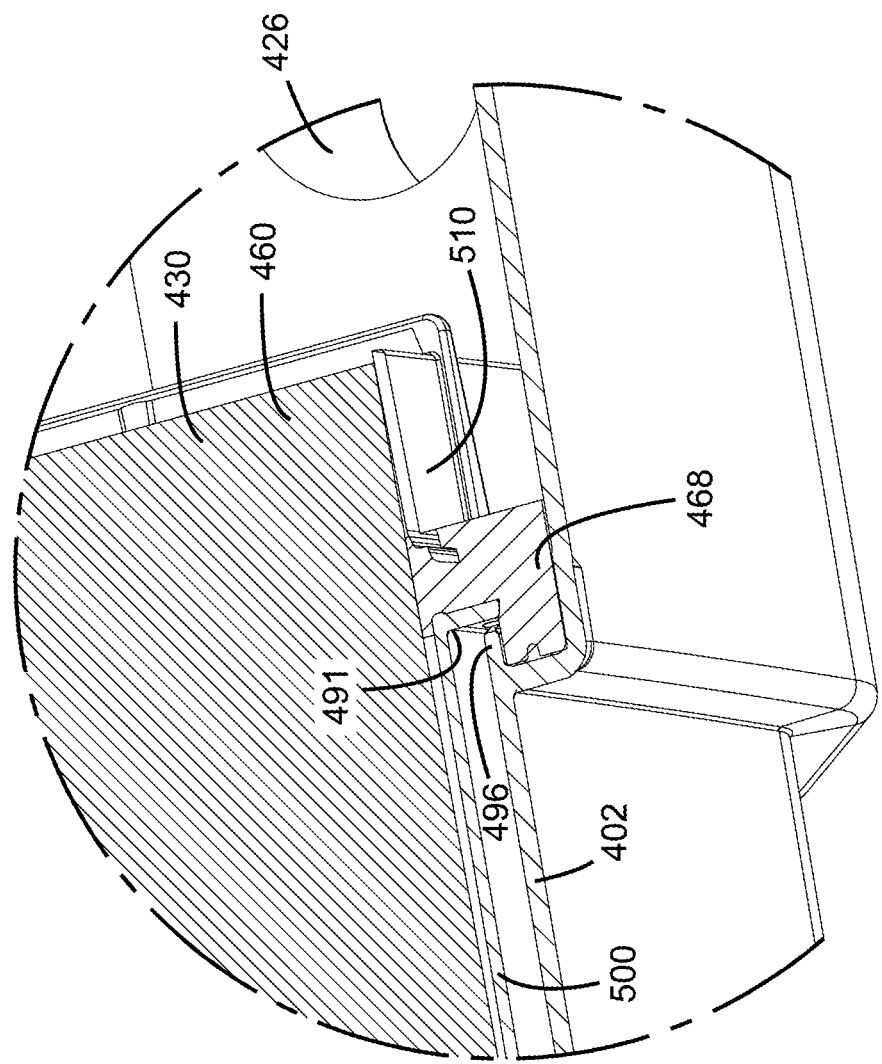
FIG. 30B is a view analogous to FIG. 30A, except depicting a cartridge in a fully installed orientation.
Figure 31A:
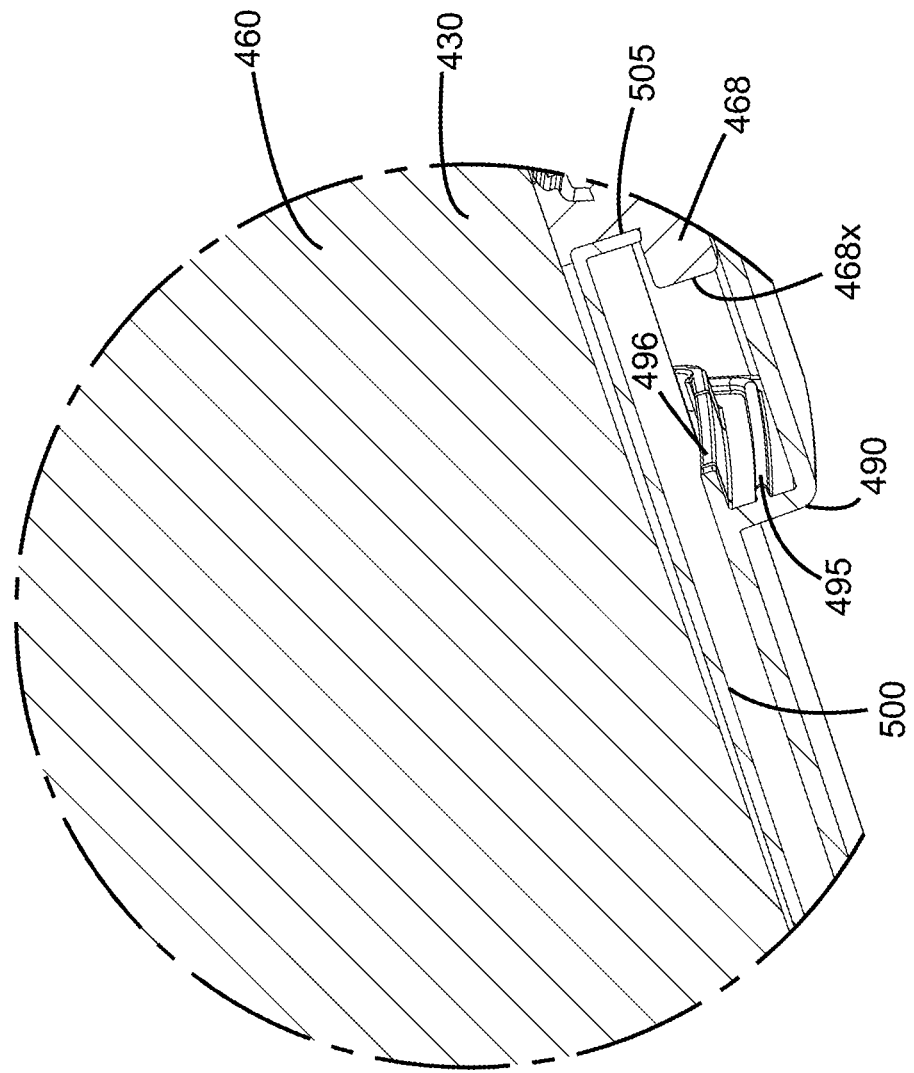
FIG. 31A is an enlarged fragmentary schematic view of an identified portion of FIG. 31.
Figure 31B:
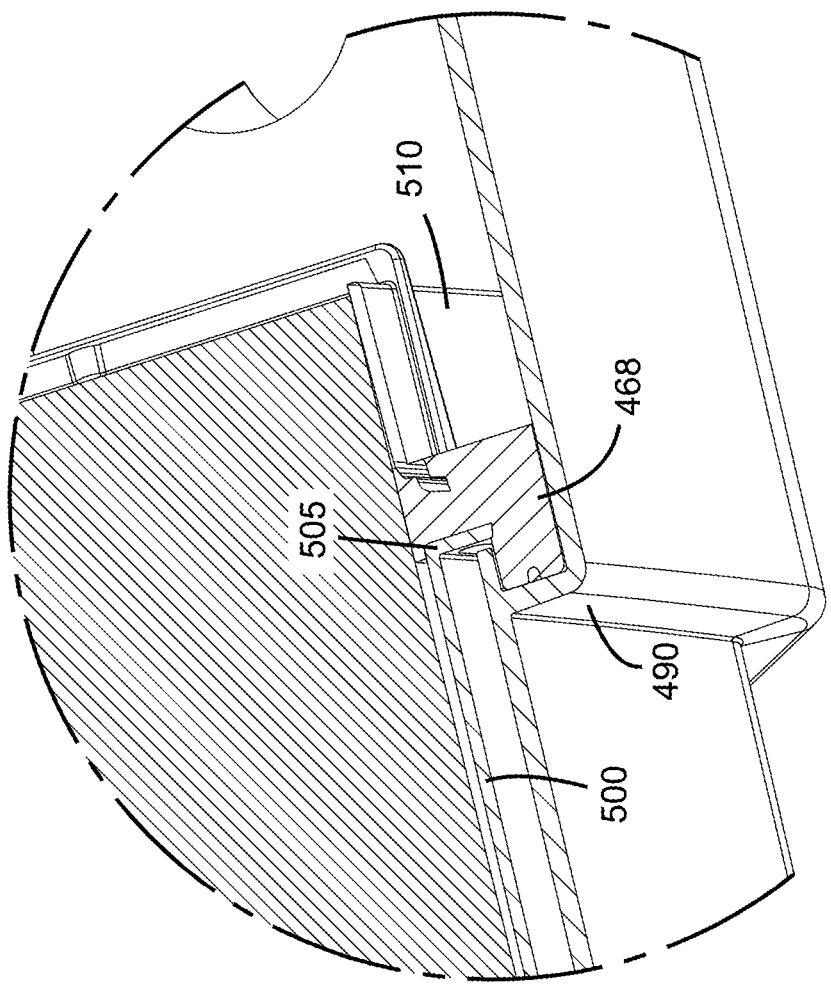
FIG. 31B is a view analogous to FIG. 31A, except depicting a cartridge in a fully installed (rather than exploded) orientation.

In FIGS. 26-31B, detail is shown which helps provide an understanding of the receiver recess 491 in interaction with the housing 401. In FIG. 26, a side elevational view analogous to FIG. 13 (but without the access cover 403) is shown with cross-section lines indicating FIGS. 27-31. From a review of FIG. 26, it will be understood that cross-sectional line 27-27 would be taken approximately midway through a projection 469 and recess 468r in the cartridge 430. In FIG. 28, it is taken through the projection 469 and recess 468r at locations closer to a non-recessed portion. FIG. 29 is through the seal arrangement 465 approximately where the projection 469 and recess end 468r are located. FIGS. 30 and 31 are taken through the non-contoured portions of seal arrangement 465.

Referring to FIGS. 27 and 27A, a partially exploded view is depicted. Again, the access cover (403, FIG. 13) has been removed. The cartridge 430 is shown during installation, but not fully installed. Again, the cross-section is taken approximately through a middle of the axial projections 469x, 469y and the peripheral recesses 468r. It can be seen that the shelf 490 is positioned with a central rib 495, FIG. 27A, to press into axial seal surface portion 468x of the seal 468. Referring to FIGS. 27 and 27A, it can be seen that the seal projections 469x, 469y are positioned to be pushed into the recesses 490r in the shelf 490. Further, it can be seen that the housing projection 496 is positioned to project into the receiver recess 491. The housing peripheral projection 401p is positioned to push into the peripheral perimeter recesses 468r, when the cartridge 430 is fully installed.

Note that housing projection 496 is relatively short at this location, and is not much higher in projection than rib 495, and accommodates sections 505r, referenced above. This will contrast with certain other portions of projection 496 viewable in later figures.

In FIG. 27B, a view analogous to FIG. 27A is shown, except with the cartridge 430 fully installed.

Attention is also directed to FIGS. 27-27B to region 468z of molded-in-place resin material 468, which shows where that material engages the media pack 460 to provide sealing thereround.

By review of the progression of FIGS. 26-31B, one can see how various features in the housing 402 and cartridge 430 are configured to accommodate recesses in the shelf 490 and projections 469 in the housing seal arrangement 468. It can be seen that in particular that housing projection 496 is shortest where the contour projections 469 are longest, and housing projection 496 extends further in recess 491 at locations where the contour projections 469 are not present. This is not specifically required, but can be advantageous. It is also noted that there is no specific requirement that the projection 496 be continuous, but it typically will be in preferred arrangements.

3. Comments Regarding the "Contoured" Preform Projection Surface

Figure 23A:
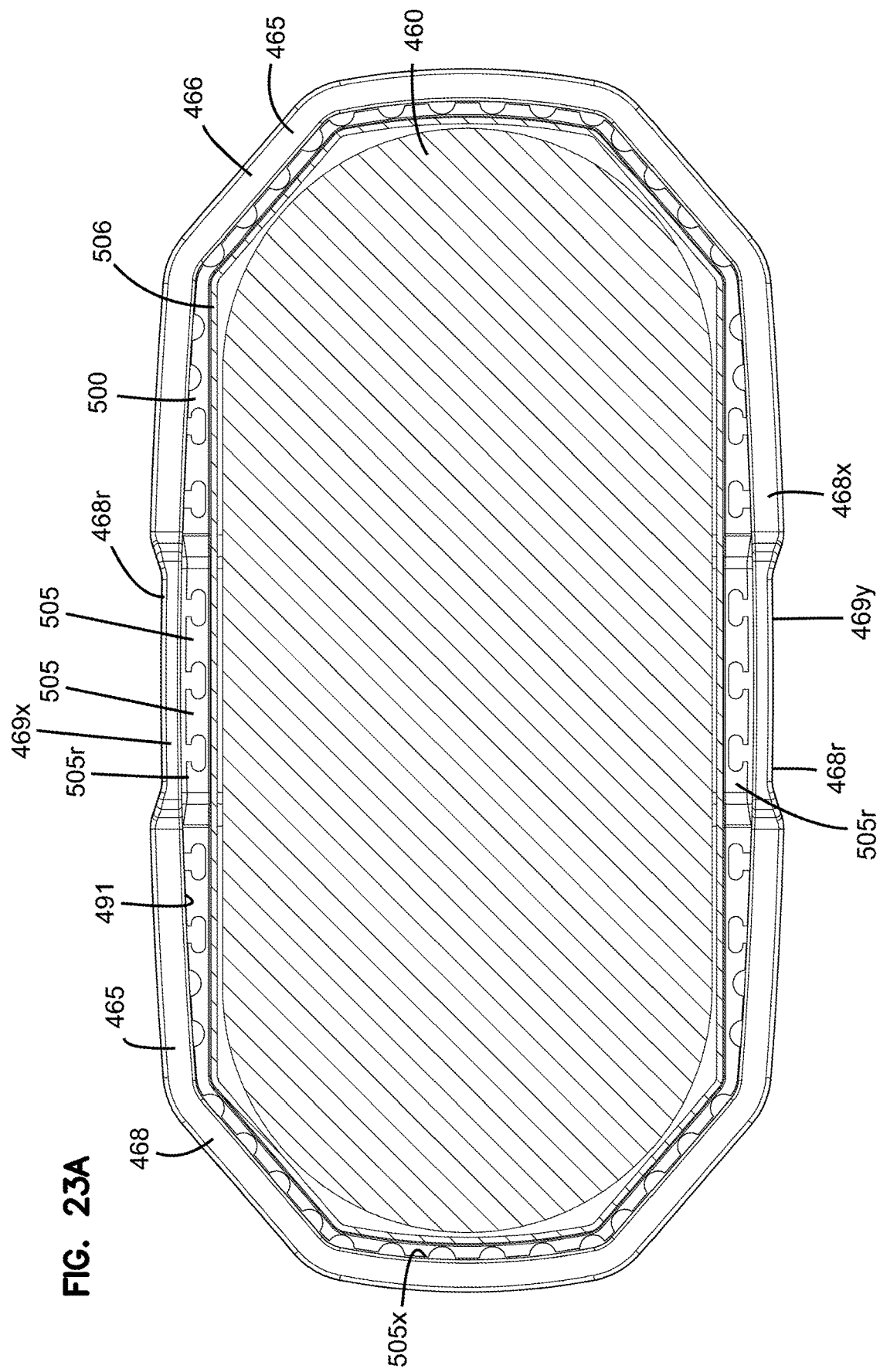
FIG. 23A is an enlarged cross-sectional view taken generally along line 23A-23A, FIG. 21.

It is noted that in the resulting cartridge 430, the preform projection surface 505 can be characterized as being a "contoured" preform projection surface. This can be understood, for example, by reference to FIG. 23A. FIG. 23A is a schematic cross-sectional view taken generally along line 23A-23A, FIG. 21.

In FIG. 23A, one can view, in the cross-section, the receiver recess 491.

Projection 505 on preform 500 traverses that recess between the seal arrangement 465, and a portion of preform 500 surrounding the media pack 460. At 469x, 469y, projections in the seal surface 468x can be seen projecting toward the viewer. It can also be seen that aligned (in a perimeter or peripheral fashion) with these sections are provided the peripheral recesses 468r. Further, sections 505r in the preform projection 505 can be seen projecting toward the viewer in alignment with these same sections 469x, 469y.

In general, terms, then, in the particular cartridge 430 depicted, supporting projection or flange 505 traverses the receiver recess 491, but has a non-planar configuration; i.e. a projection/recess contour configuration; with a contour shape in alignment with the projection/recess contour of the seal arrangement 465.

It is noted that in the depiction, molded seal material is not shown extending beneath projection 505, see for example FIG. 27A. This is typical, but not required in all instances. In more general terms, it is not required that the resin flow completely through (to projection downwardly from) the various apertures or spacers in the perimeter projection 505 of the preform 500 during resin cure, in an axial direction. This can be done, but is not specifically required.

Herein, in this section, and elsewhere, reference is sometimes made to features being "in alignment", "in perimeter alignment", "in peripheral alignment" or by similar terms. Examples are such as alignment between the perimeter recesses 468r and contour projections 469x, 469y; and, alignment involving these features and the recess 504r in the perimeter projection 505 of the preform 500. In this context, "alignment" and similar terms are meant to refer to a peripheral or perimeter alignment with one another, (perpendicular to axial) i.e. in alignment with one another or in overlap with another in extension toward the media pack 460.

Figure 32:
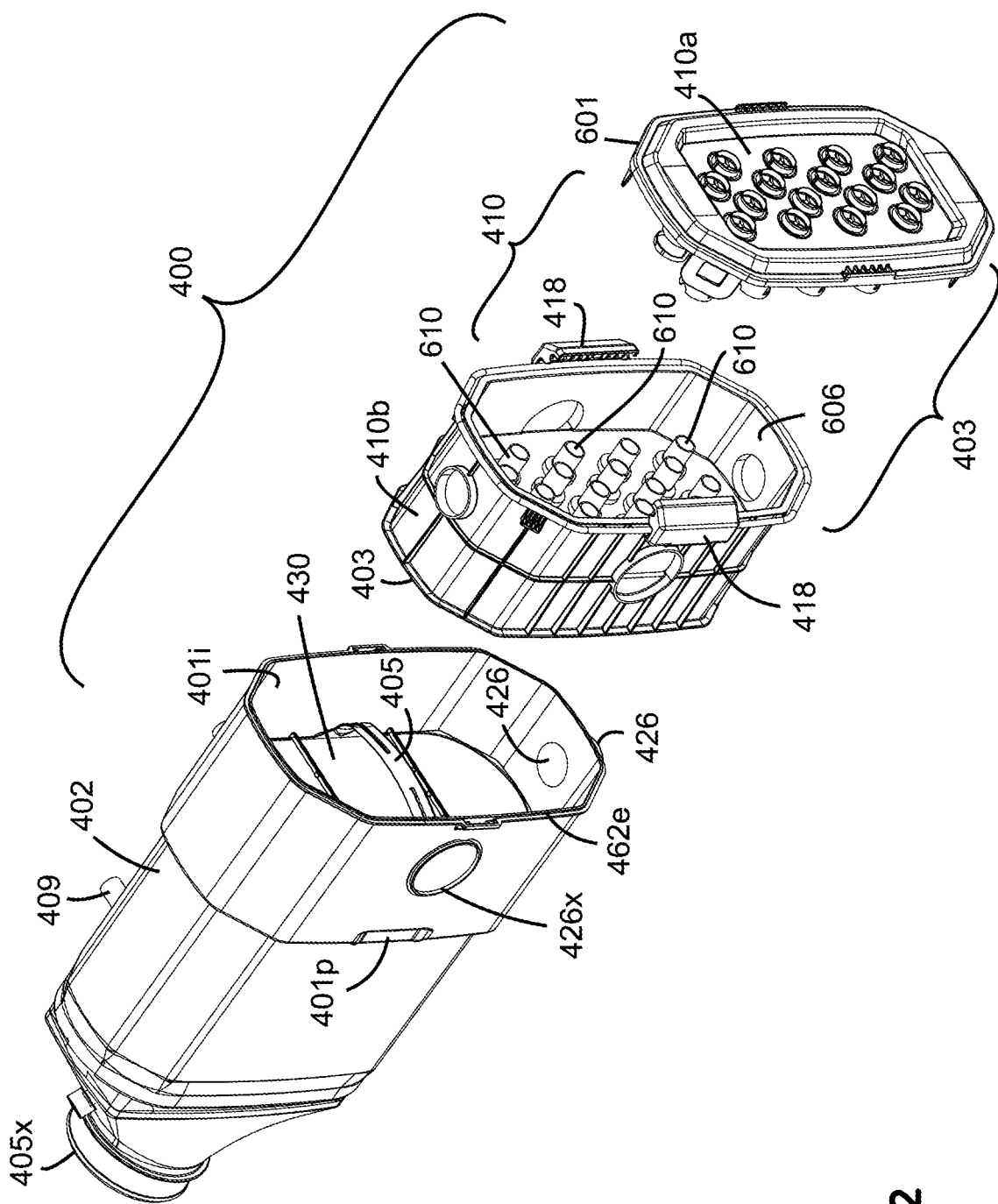
FIG. 32 is an inlet end, schematic perspective view of the air cleaner assembly of FIGS. 13-15, FIG. 32, depicting a portion of an access cover and precleaner in exploded view.
Figure 33:
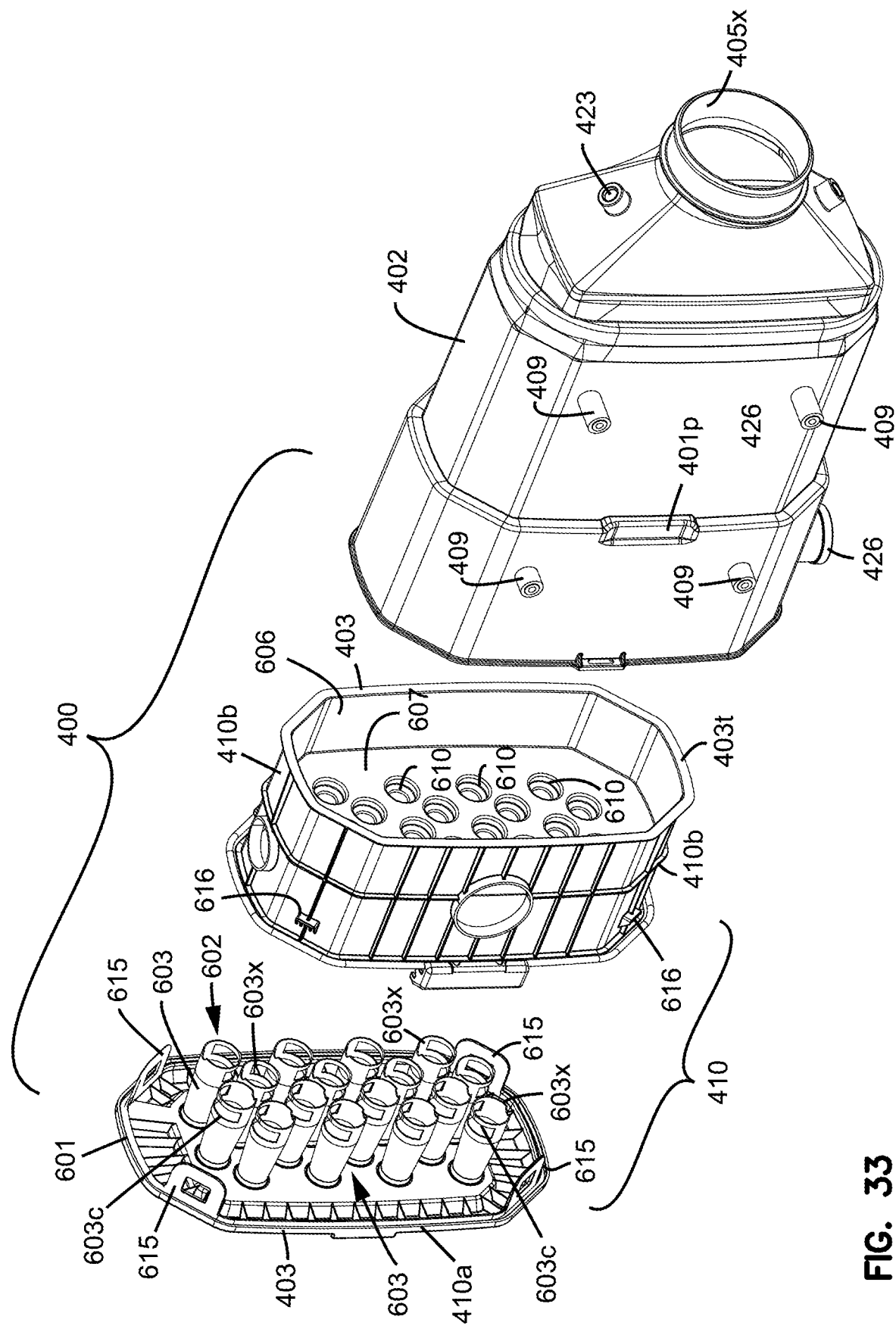
FIG. 33 is an exploded, schematic, perspective view analogous to FIG. 32, but taken from a perspective toward an outlet end of the housing.

IV. Some General and Optional Precleaner Features; FIGS. 32-34

As indicated previously, the particular access cover 403 depicted, optionally comprises an optional precleaner assembly 410. General features and operation of a preferred precleaner assembly 410 can be understood from reference to FIGS. 32-34.

In FIG. 32, a partially exploded view of air cleaner 400 is depicted. In particular, the precleaner 410 is shown separated from the air cleaner body 402, which includes filter cartridge 430 therein.

Referring to FIG. 32, the precleaner 410 as previously indicated, generally comprises an outer section or cover 410a and an inner section or cover 410b, normally secured to one another but shown exploded in FIG. 32. The outer cover 410a depicted, includes a perimeter mounting flange 601, which is aligned within end 402e of the housing body 402 during installation, with securement by latches 418, as previously discussed. In some instances, a weather seal member (not shown) such as an o-ring seal can be positioned between the access cover 403 and the housing body 402.

Figure 32A:
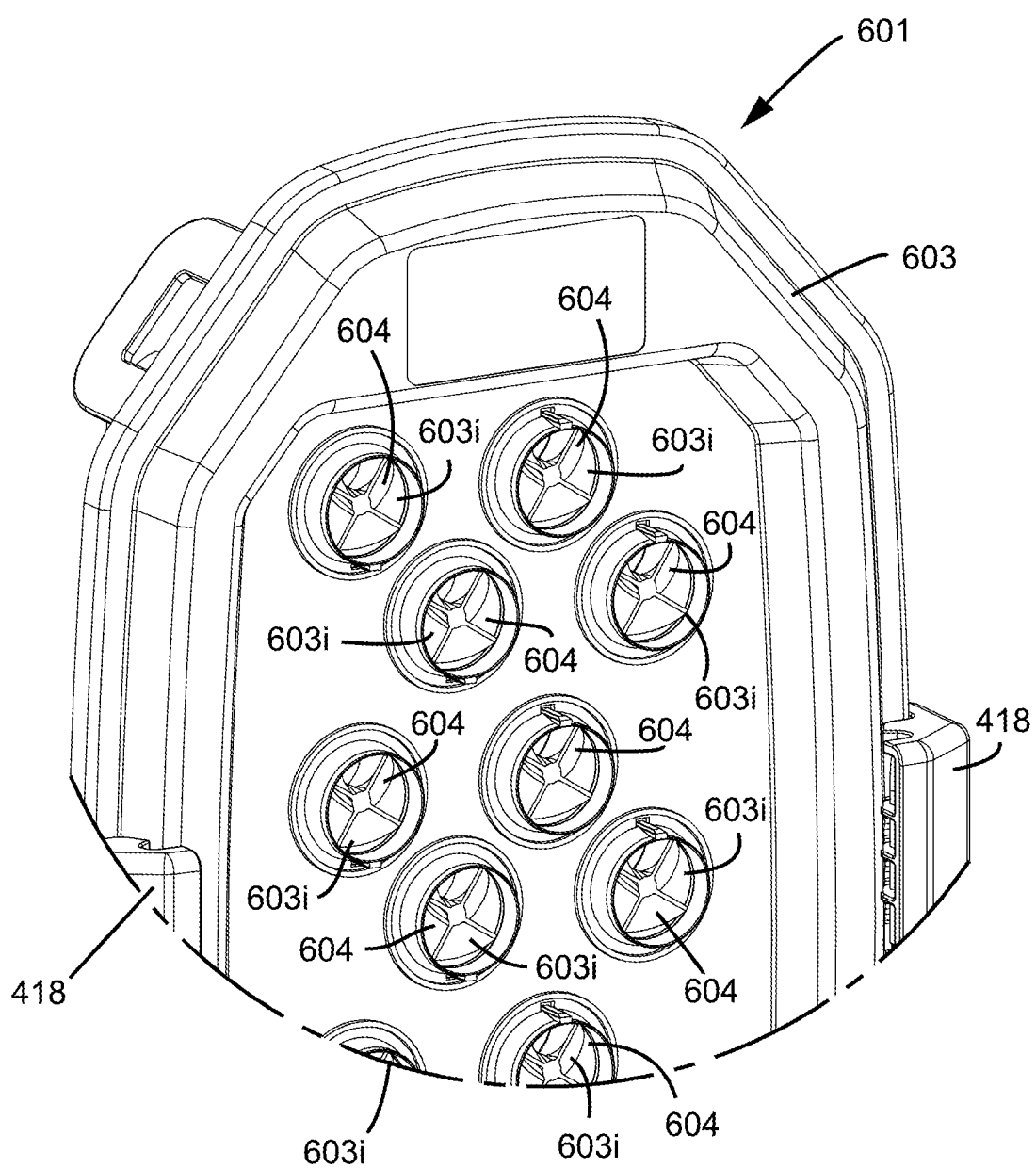
FIG. 32A is an enlarged, schematic, fragmentary view of a portion of FIG. 32.

In FIG. 32A, an enlarged fragmentary view of section 601 with flow tube inlet ends 603i is depicted. In FIG. 33, an exploded perspective view opposite that of FIG. 32, i.e. taken toward an inner portion of section 601 is viewed. Reference is made to three figures in the general description following.

The outer cover 410a, FIG. 33, includes an array 602 of flow separator (inlet) tubes 603 therein, (having the referenced inlet or inlet ends 603i, FIG. 32A). The inlet tubes 603 can be preformed and, for example, can be press-fit into apertures in the cover 601 during assembly. In general, each separator inlet tube 603 includes an upstream inlet end 603i, FIG. 32A, into which air (to be filtered) entering the air cleaner assembly 400 passes. In or adjacent to the end 603i, each inlet tube 603 includes a vane arrangement 604, FIG. 32A, configured to import (direct) a cyclonic flow for the inlet air. The inlet tubes 603 generally each include an end 603x (FIG. 33) opposite the inlet end 603i. Each separator tube end 603x includes a side (cyclonic outlet) slot 603c through which contaminant (dust, particulate contamination ejector or water) separated by cyclonic flow in the flow separator arrangement, exits the tubes 603 for eventual ejection through housing contamination ejection port arrangement 426, FIG. 16.

The inner cover 410b, FIGS. 32 and 33 includes a perimeter (outer) wall 606 and a central tube sheet section 607. The perimeter wall 606 extends around an outer portion of the precleaner 410, and engages the outer cover 410a. The perimeter (outer) wall 606 also includes pressure flange or tip 403t thereon, in the example depicted.

In more general, terms, the access cover 403 includes an inner perimeter tip or flange 403t that projects into the housing sufficiently far, to engage the filter cartridge 430, via the housing seal arrangement 465. That flange 403 is generally an innermost end of an inner perimeter shield or cover provided by wall 606.

A tube sheet section 607 extends across the perimeter wall 606. It includes a plurality of outlet tubes, examples indicated at 610. A selected one of these tubes 610 extends toward one each (selected) inlet tube 603, and receives flow of air that has entered that inlet tube 603 and allows that air to pass through the tube sheet 607 to an interior 401*i* (FIG. 32) of the housing 401, and eventually to the cartridge 430. Typically, the outlet tubes 510 are molded (formed) integral with the remainder of the inner cover 410*b*, but alternatives are possible.

The inner cover 410*b* would typically be made or molded separately from the outer cover 410*a* and be secured thereto. A variety of securing approaches can be used, including snap-fit or alternates. In the example, such a snap-fit is provided by loop projections 615 on section 410*a* which would engage projections 616 on section 410*b*. In some instances, the two sections 410*a*, 410*b* may be secured together in a manner that there cannot be supported. In other applications it may be desirable to configure them to allow disassembly for servicing or internal cleaning.

In more general terms, the precleaner assembly 410 can include a snap-fit arrangement between the inner cover 410*b* and the outer cover 410*a*. The snap-fit arrangement, in general, comprises a component positioned on each. In the example depicted, the component positioned on the inner cover 410*b*, is a projection arrangement 616; and, the member positioned on the outer cover 410*a* comprises a loop arrangement 615 for engagement with projections 416.

Figure 33A:
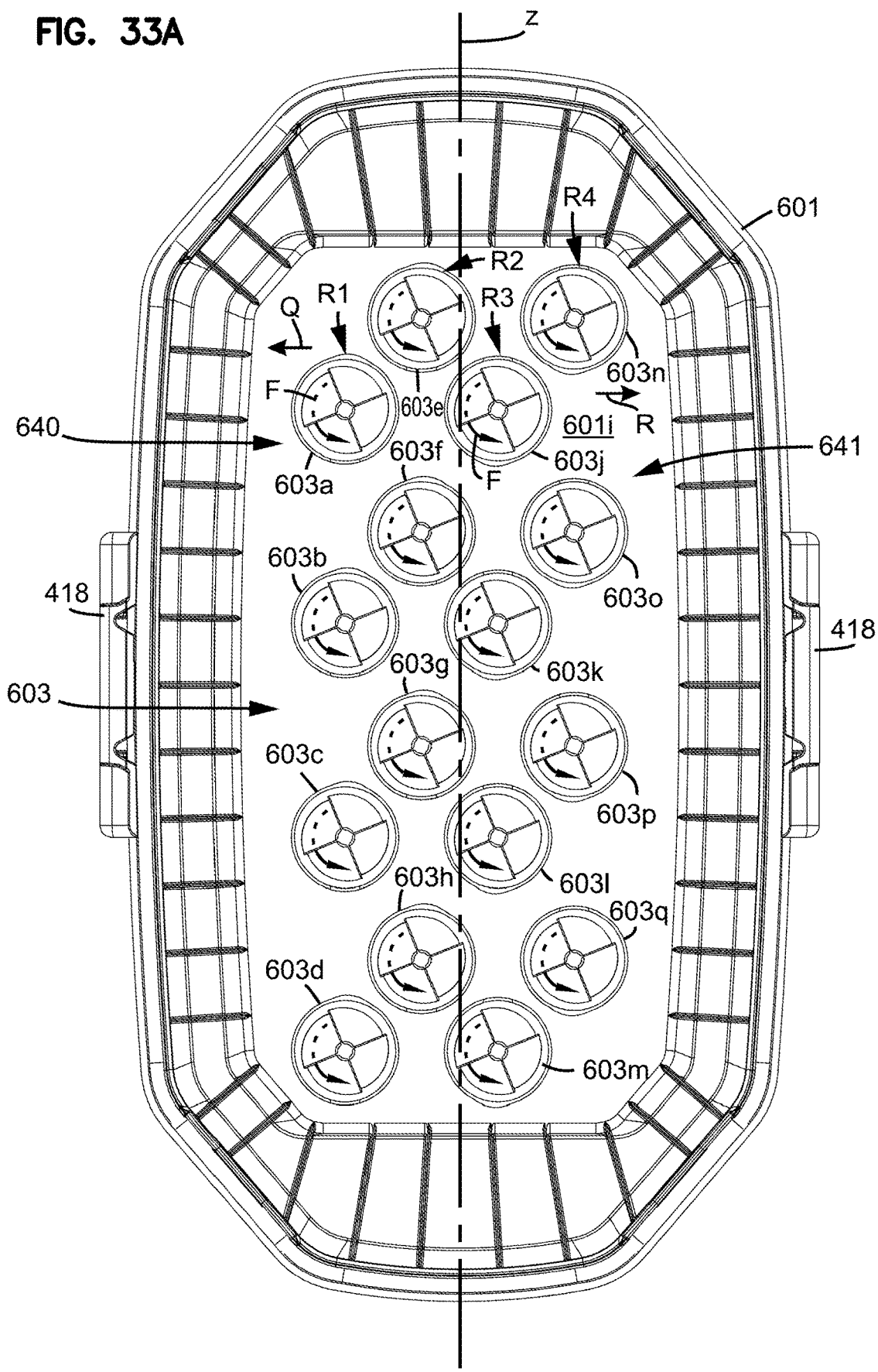
FIG. 33A is an enlarged schematic view of an inside surface of an access cover component depicted in FIG. 33.

In FIG. 33A, a view directed toward an interior surface 601*i* of section 601 is shown. Here, it can be seen that the array inlet of flow tubes 603 can be seen as oriented in various rows in the long dimension, corresponding to rows R1, R2, R3, and R4, respectively. The view depicted, is generally taken toward the orientation shown in FIG. 33. Referring to FIG. 33, row R1 would comprise flow tubes 603*a*, 603*b*, 603*c* and 603*d*. Row R2 would comprise flow tube 603*e*, 603*f*, 603*g* and 603*h*. Row R3 would comprise tubes 603*j*, 603*k*, 603*l*, and 604*m*; and, row R4 would comprise tubes 603*n*, 603*o*, 603*p*, and 603*q*.

In the example depicted, the various rows R1, R2, R3 and R4 are vertically oriented rows, in the air cleaner used. This is referenced further below.

In the example, depicted, the various flow tubes 603 are positioned with the inlet section 603 of each with vanes 603*v* oriented to spin incoming air in a counter-clockwise manner when viewed from the interior (clockwise when viewed from the exterior, FIG. 32A). This is represented by arrows F, FIG. 33A. In general, rows R1, R2, R3, and R4 can be viewed as separated into a "first set 640" comprising rows R1 and R2 and a second set 641 (comprising rows R3, R4).

Figure 34:
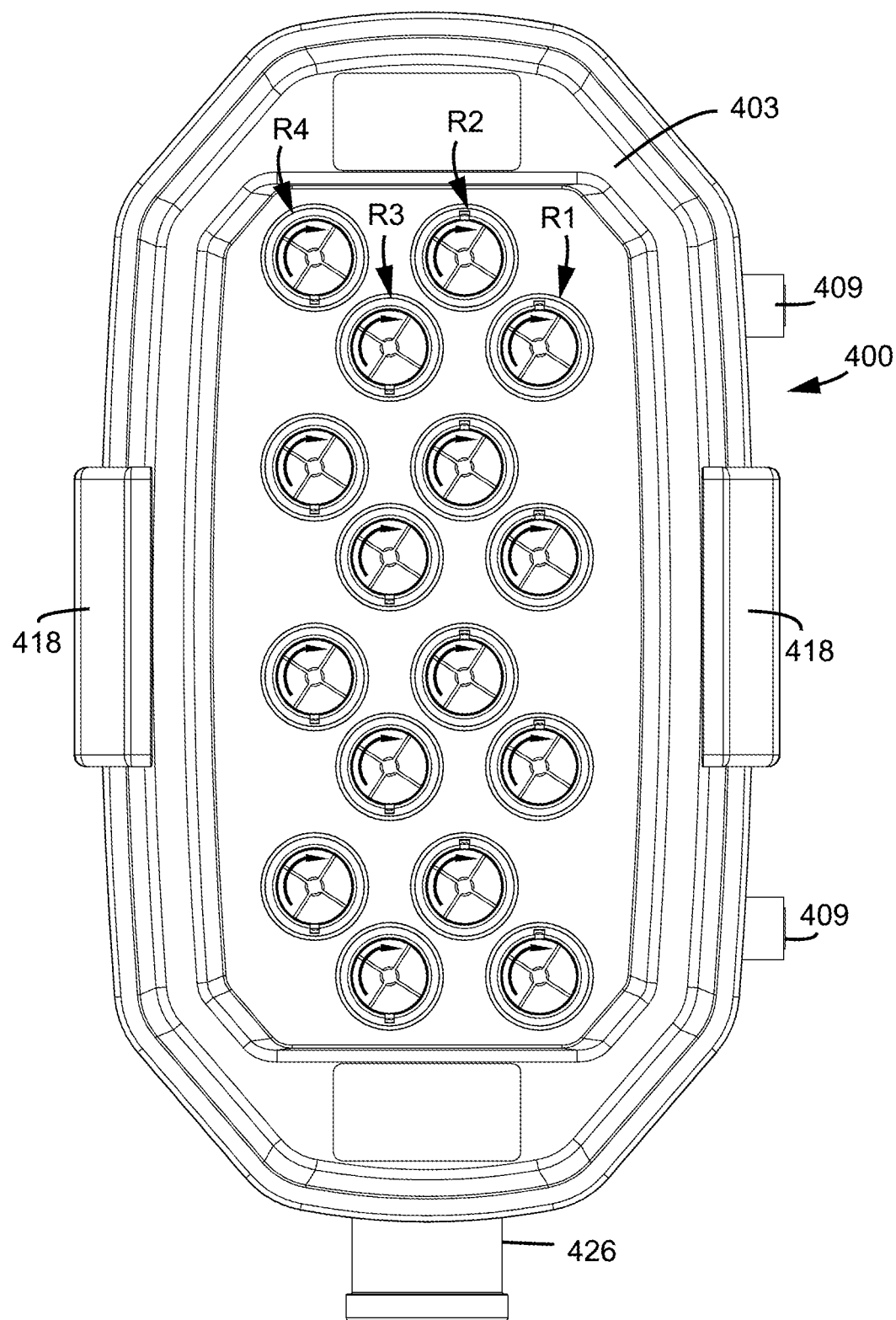
FIG. 34 is a schematic inlet end elevational view of an air cleaner assembly in accord with FIGS. 13-15.

In FIG. 34, an exterior view of the air cleaner assembly 400 is shown, with the access cover 403 positioned thereon. It can be seen that the tubes 603, when viewed from the exterior, are oriented so that the vane moves the air into a clockwise spin from the exterior (counterclockwise when viewed from the interior of FIG. 33).

To facilitate this, the array of inlet tubes positioned with a side dust ejector slots 603*c* of each oriented in a preferred manner. This will be understood from reference to FIGS. 33 and 33A.

Referring to FIG. 33, in general, each ejector slot 603*c* in each inlet tube 603 is oriented to extend across a portion of the tube corresponding to an arc of about 150°-190°. Typically, each will be oriented directed upwardly or directed downwardly, depending on in which direction the dust is to be ejected for that particular tube. Typically, dust will exit toward a downstream end of the opening, relative to cyclonic flow, somewhat tangentially to the curve of the corresponding tube. For example, and referring to FIG. 33A, for tube 603*a* with dust swirling counter-clockwise (when viewed from the interior as shown in FIG. 33A, the dust will eject from tube 603*a* in the general direction of arrow Q) and dust will eject from tube 603*n* in the general direction of arrow R.

In FIG. 33A, attention is directed to center line Z. A center line Z through an array of tubes 603 is generally a vertical line that would be centered in the housing in alignment with the dust ejector port 426. On a side of the center line Z, the tube will comprise a set oriented to direct dust away from the center line Z. Thus, the tubes of rows R1 and R2 are set to direct dust in the general direction of arrow Q, and the tubes of R3 and R4 generally are set to direct dust in the direction of arrow R. This will facilitate dust ejection and eventual movement to ejector port 426.

It is noted that similar principles could be applied if the array of tubes 603 was positioned with a longer axis horizontal. Again, one could organize the tubes into sets on opposite sides of an appropriate center line, and then orient the openings in the tube for ejection of dust, if desired.

Attention is now directed to FIG. 34. It is noted that the sidewall (606, FIG. 33) of the inner section 410*b* would typically have an aperture therein for dust ejected by the tubes 603, to pass through the wall 606 into ejector 426. Such an aperture would typically be located in a portion of the wall 606 upstream from tube 607, FIG. 33.

The above described general principles for the precleaner 410 are generally in accord with those described in WO 2016/105560, incorporated herein by reference and similar principles can be used.

V. Some Additional Variations in Features of Interest and Applicability, FIGS. 35-41

In general, many of the features discussed thus far relate to controlling undesirable deformation (roll) in certain types of pinch seal arrangements. In this section of the disclosure, example variations in selected cartridges using such features are shown. In addition, some useful variations in air cleaner assemblies and filter cartridges, that can be implemented independently of whether the cartridge has such anti-deformation (anti-roll) features, are described.

In FIGS. 35-41, example variations as characterized in the previous paragraph are provided. In these figures, features analogously depicted or positioned, or described as having analogous purposes, to features described in connection with previous embodiments, can be characterized using similar language terms and are subject to being used with analogous detail, variations and other variables previously described, accounting for differences depicted.

Figure 35:
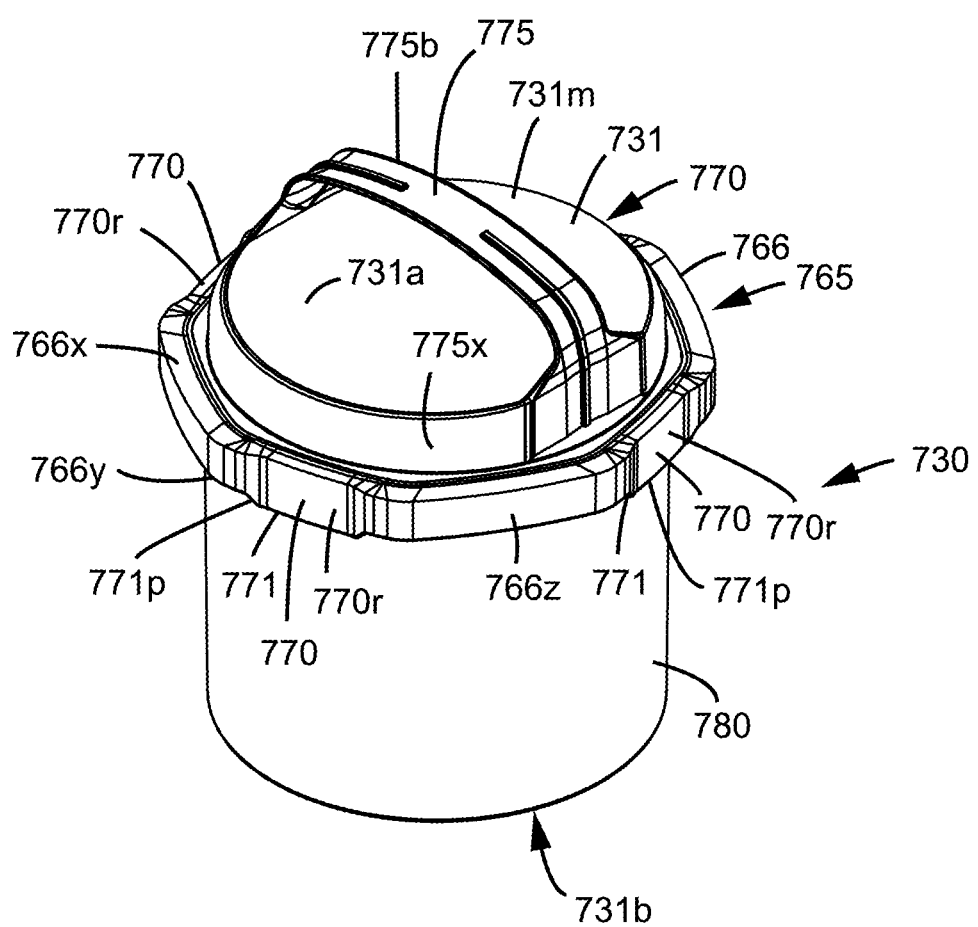
FIG. 35 is a schematic perspective view of an alternate filter cartridge including selected features in accord with the present disclosure.

1. Application of the Anti-Deformation Feature in the Context of Circular Media Pack Herein above, selected features of the filter cartridge usable in connection with certain pinch seal arrangements that have a tendency to deform (roll) during installation were disclosed and described. In FIG. 35, such features are depicted in the presence of a circular media pack. The applicability of such features to circular media packs was referenced previously, FIG. 35 merely providing an example.

Referring to FIG. 35, at 730, a filter cartridge is depicted. Many of the features of the cartridge 730 are analogous to cartridge 430 previously described, except in the context of a media pack having a circular shape.

Thus, cartridge 730 includes a media pack 731 (having media 731*m*) therein, having a circular cross-sectional shape. The media pack 731, may be, for example, a coiled arrangement of media comprising a fluted sheet and a facing sheet secured together in general, in accord with the descriptions above for FIGS. 1-6. Alternative media types can be used, including variations in referenced media herein above.

In FIG. 35, the media pack 731 is depicted schematically, and detail is not shown. When the media pack comprises a coil of media, for example, it may include a central plug or seal therein, for example in accord with U.S. Pat. No. 7,967,886, incorporated herein by reference. Further, individual flutes, if used, may include end features, etc., as described previously herein.

The cartridge 730, then, generally comprises a media pack 731 positioned in extension between a first (inlet) flow end (or face) 731a and a second, opposite (outlet) flow end (or face) 73 lb. Thus, analogously to cartridge 430, the cartridge 730 has a straight through flow construction.

Also, analogously to cartridge 430, the cartridge 730 includes a housing seal arrangement 765 thereon. The housing seal arrangement 765 generally comprises a housing seal member 766 secured to a remainder of the filter cartridge 730 in a manner, and at a location, such that it can form a releasable seal with an air cleaner housing in use. To facilitate this, the seal member 766 will typically be a resilient material analogous to that described above for seal member 466; and, except for modification to accommodate the circular shape in the media pack 731, seal member 766 can be secured in place using techniques and features as previously described, if desired.

As with seal member 466, seal member 766, in the example overall housing seal arrangement 765 depicted, is configured and positioned as a pinch seal (or axial pinch seal) 768. Thus, it extends around a perimeter of the cartridge 730 in a position that it can pinched between two housing components (analogously to cartridge 430) under sealing pressure during use.

Still referring to FIG. 35, the filter cartridge 730 depicted includes a preform 775x having an optional handle arrangement 775 thereon, in the example oriented adjacent the cartridge inlet end 731a and having a handle bridge 775b projecting therefrom in a direction away from the outlet end 731b. This positions and orients the handle arrangement 735 where it can be readily grasped to manage servicing of an air cleaner such as air cleaner 700, FIG. 37, with which cartridge 730 can be used. The preform 775x and handle arrangement 775 may be, but for specific shape, analogous to the preform and handle arrangement 475, described above.

It is noted that the cartridge 730 may optionally include grid work (not shown) as part of preform 775x including handle arrangement 775, analogous to optional grid work 475y, FIG. 20.

Still referring to FIG. 35, the depicted cartridge 730 includes an optional protective shell 780, analogous to optional protective shell 480 discussed above for cartridge 430. The particular shell 480 depicted extends at least from the seal arrangement 765 to media pack end 731b, although alternatives are possible. It may include an optional grid (not depicted) extending across end 731b, analogous to cartridge 430. The shell 780, in a typical application, would be analogous to shell 480, and thus can comprise a portion of a preformed molded plastic piece into which the media pack 731 would be positioned during assembly.

It is noted that the depicted shell 780 has a sidewall with a circular cross-section, matching the media pack 731. Alternatives are possible, and indeed the sidewall of the shell 780 may have a shape that does not mimic the shape of the media pack 731, for example analogously to the shell 480 discussed above.

Figure 36:
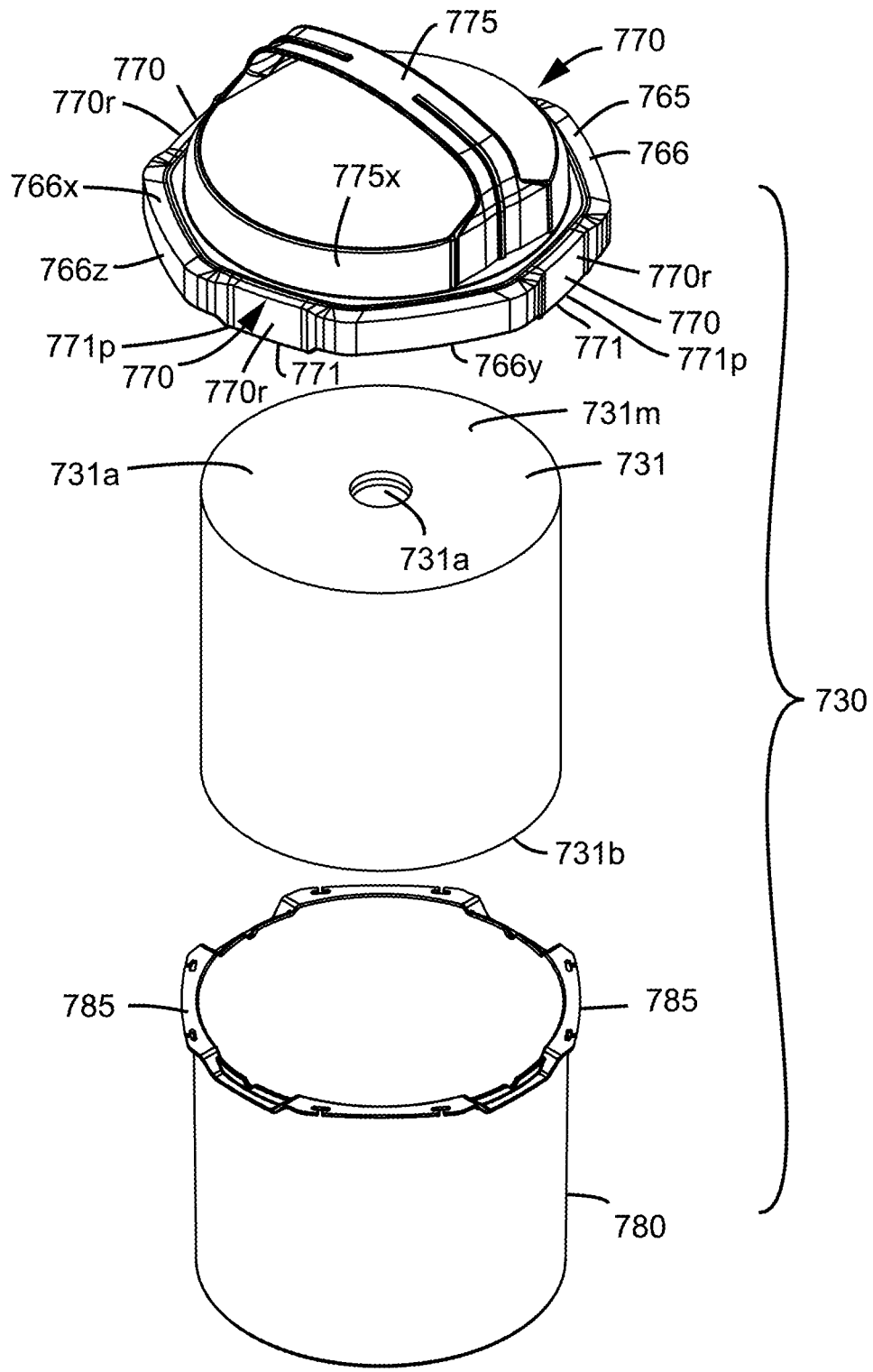
FIG. 36 is a schematic exploded perspective view of a filter cartridge in accord with FIG. 35.

Attention is directed to FIG. 36, in which cartridge 730 is depicted with selected portions in exploded view. It is noted that in FIG. 36, the preform 775x, with handle arrangement 775, is not shown exploded relative to the seal 768.

Referring to FIG. 36, it is noted that the media pack 731 is depicted as a coil around a center 731c, which center 731c is closed to passage of unfiltered air therethrough. Again, the typical approach would be to mold a center core in center 731c in accord with U.S. Pat. No. 7,967,886, referenced above.

Comparing FIGS. 35 and 36, it can be seen that the particular seal member 766 depicted comprises an arrangement having a first, axially directed, axial (housing) seal surface 766x and opposite second surface 766y. An outer perimeter 766z of seal member 766 is also viewable. The seal member 766 is a contoured pinch seal member, and optionally includes a perimeter projection/recess arrangement 770 and a pinch seal surface projection/recess arrangement 771 analogous to arrangements previously described for cartridge 430. Options previously described for such arrangements can be used.

In the particular cartridge depicted, the projection/recess arrangement 770 comprises four (in the example, evenly) spaced recesses 770r, and the axial pinch seal surface projection/recess arrangement 771 comprises four (in the example, evenly) spaced projections 771p around a perimeter of the media pack 731 and a remainder of the cartridge 730. Alternatives are possible. For example, there can be alternative in the spacing among any projection/recesses; and/or, there can be variations in the number of them.

In the example, and to advantage, the perimeter recesses 770r are each aligned with a seal surface projection 771p; i.e. the seal member 766 is axially aligned with these features, in accord with descriptions provided. Such a stepped arrangement can be as characterized previously herein, to advantage, but alternatives are possible.

As a result, the particular cartridge 730 does have 180° rotational symmetry with respect to the seal member 766. Indeed, it also has 90° symmetry, since the seal member will align with itself (or install) in any of four evenly radially spaced rotational orientations, with a proper seal surface and housing.

It is noted that the cartridge 730 can be provided with features as described herein, facilitating implementation of the seal arrangement 765 without deformation or roll problems. This can be understood by reference to FIG. 36, in which the protective preform 780 is shown with a perimeter projection 785 including features of the type previously described.

Of course, the cartridge 730 can be constructed as previously described, with the seal member 766 molded-in-place on: a first preform comprising the protective preform 786; and, a second preform, including the handle member 775, embedded in the resulting seal arrangement 765; and, with the molding engaging the media pack 731 as previously described. As indicated previously, however, alternatives are possible.

Figure 37:
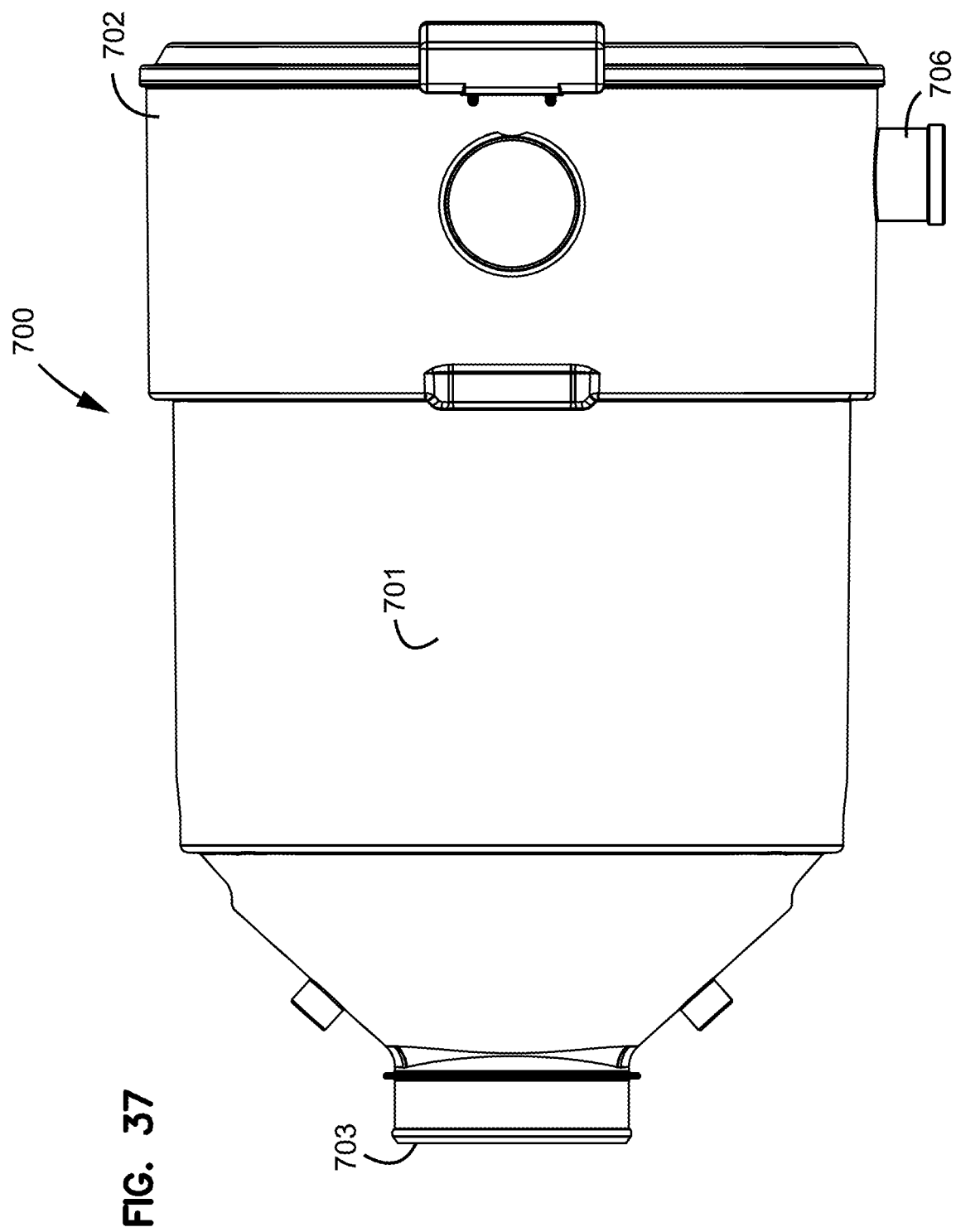
FIG. 37 is a schematic side elevational view depicting an air cleaner assembly that can including a filter cartridge in accord with FIGS. 35-36.

In FIG. 37, air cleaner assembly 700 is depicted having a housing body 701 and access cover 702. The housing depicted has an outlet arrangement at 703 and can be generally analogous to housing 401, FIG. 13 discussed above, except configured to receive a circular cartridge instead of an oval one.

The air cleaner assembly 790 may include, in the access cover 702, inlet features and precleaner features, for example with evacuation outlet 706 as previously described for earlier embodiments. Of course, the separator tubes (not shown) would be oriented in an array to accommodate the overall circular shape.

In sum, FIGS. 35-37 provide an example of how principles described herein above can optionally be implemented in a cartridge having a circular cross-sectional shape as opposed to an oval one. Selected features and variations described herein in connection with: perimeter projection/recess seal arrangements; contoured pinch seal surface projection/seal arrangements; and, other cartridge features and housing features can be implemented with cartridges and air cleaners otherwise in accord with FIGS. 35-37.

B. Example Variations in Features Allowing for a Portion of a Precleaner Arrangement to be Included on the Cartridge, FIGS. 38-41

Herein above, in connection with air cleaner assembly 400, a precleaner arrangement 410 is described comprising a plurality of precleaner or separator tubes 411 positioned as part of an access cover. With respect to this, attention is directed to the description of FIGS. 14-17.

As indicated, an analogous precleaner can be used in the air cleaner assembly 700 discussed above in connection with FIG. 37. It is expected that for a circular shaped housing, the number of precleaner tubes 411 and their orientation in the array of tubes would likely be varied for the circular shape. However, the principles of operation would remain analogous.

It is anticipated that in some instances, it may be desirable to include a portion of the precleaner secured to (i.e. integrated with) the cartridge, as opposed to being entirely positioned as part of the housing. Examples of this can be understood by reference to FIGS. 38-41.

Figure 38:
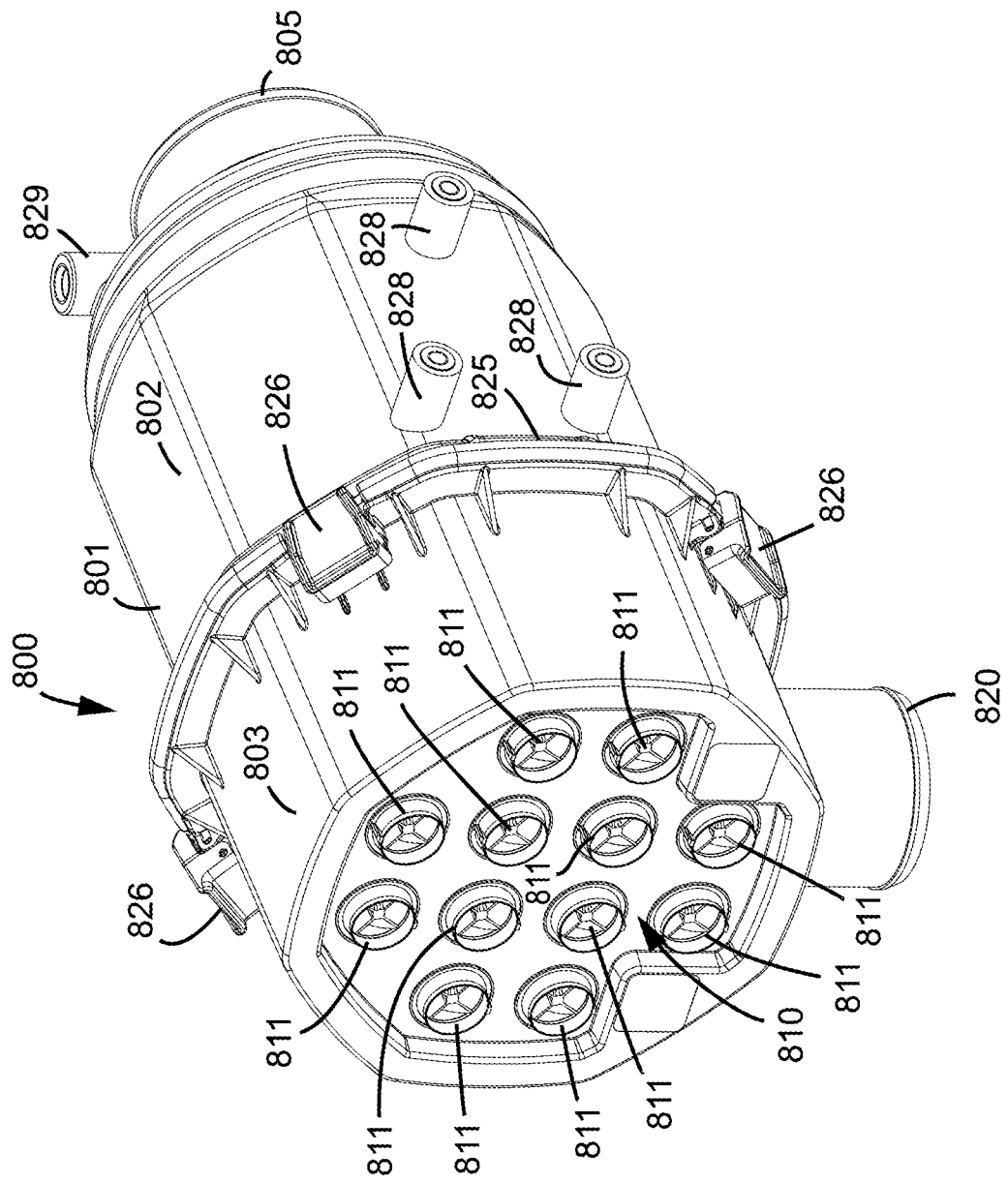
FIG. 38 is a schematic inlet end perspective view of an alternate air cleaner assembly including selected features in accord with the present disclosure.

Referring first to FIG. 38, an air cleaner assembly 800 is depicted comprising a housing 801 including a body portion 802 and a removable access cover 803. In the example depicted, the housing body 802 includes an air flow outlet arrangement 805 and the access cover 803 includes an air flow inlet arrangement 810, and a dust evacuator arrangement 820.

Referring to FIG. 38, the inlet arrangement 810 comprises an array of precleaner or separator tubes 811, which can be configured to operate as previously described for tubes 411, except as described herein. It is noted that the particular array of tubes 811 is configured for a circular (media) arrangement as described further below.

The housing 800 is separable at joint 825, to install a cartridge with positioning of a pinch seal of a main filter cartridge between the two components 802, 803 with pressure secured by a closure arrangement, in the example comprising latches 826. Alternatives are possible.

Still referring to FIG. 38, at 828a mounting post arrangement is positioned to help secure the air cleaner assembly in place on equipment for use. Alternative mounting arrangements and configurations of mounting arrangements are possible.

Still referring to FIG. 38, at 829 adjacent outlet 805 a tap arrangement 829 is provided, which can be used for a variety of equipment arrangements, including, for example, a pressure indicator and/or a mass air flow sensor (MAFS), etc.

In FIG. 39, an exploded perspective view of assembly 800 is depicted. Here, an internally received primary filter cartridge 830 is viewable.

Also depicted in FIG. 39 is an optional safety cartridge 860. The optional safety cartridge 861 may be configured to operate analogously to safety cartridge 435, FIG. 15, comprising: media 861, surrounded by preform 862; seal member 863, and handle arrangement 864. Also depicted is a media spacer 867 which further can facilitate ensuring proper spacing and positioning with respect to the main cartridge 830.

The cartridge 830 may be generally analogous to cartridge 730, except as indicated. In particular, the example cartridge 830 does not include the optional handle arrangement 775 of cartridge 730, but rather includes an inlet preform 840p comprising an optional (inlet) end cap 840 including an array of separator tube sections 842 thereon. In general, the cap 840 is closed to passage of air into a media pack of the cartridge 830, except by air passing through the separator tube sections 842. The separator tube sections 842 are configured to engage (insert into) selected ones of separator tube inlet sections 811i in an array positioned within access cover 803 to form a separator tube inlet precleaner arrangement, for operation analogous to the precleaner previously described.

Still referring to FIG. 39, it is noted that the cartridge 830 includes a housing seal arrangement 870 analogous to seal arrangement 765. Alternatives are possible. Referring to FIG. 39, the housing body 802 is positioned and configured adjacent end 802e to receive four individual members of a projection/receiver arrangement associated therewith, in a pinch seal arrangement 870. Thus, the cartridge 830 has 90° rotational symmetry for seal 870 since it can be positioned rotated in any one of four orientations, if and when equal shapes, and spacing, of the individual pinch seal surface projection/recess members and peripheral projection/recess members are used. Of course, it also has a 180° rotational symmetry.

The net result of the cartridge 830 being positionable within of four rotational orientations, means that it would be preferred that the tube sections 842 also be oriented in an arrangement that can be aligned in four rotational orientations along with the cartridge 830 and still fit the access cover 803. This is provided by the (in the example, +-shaped or plus-shaped) pattern of tube sections 842 and 811i shown.

Figure 39A:
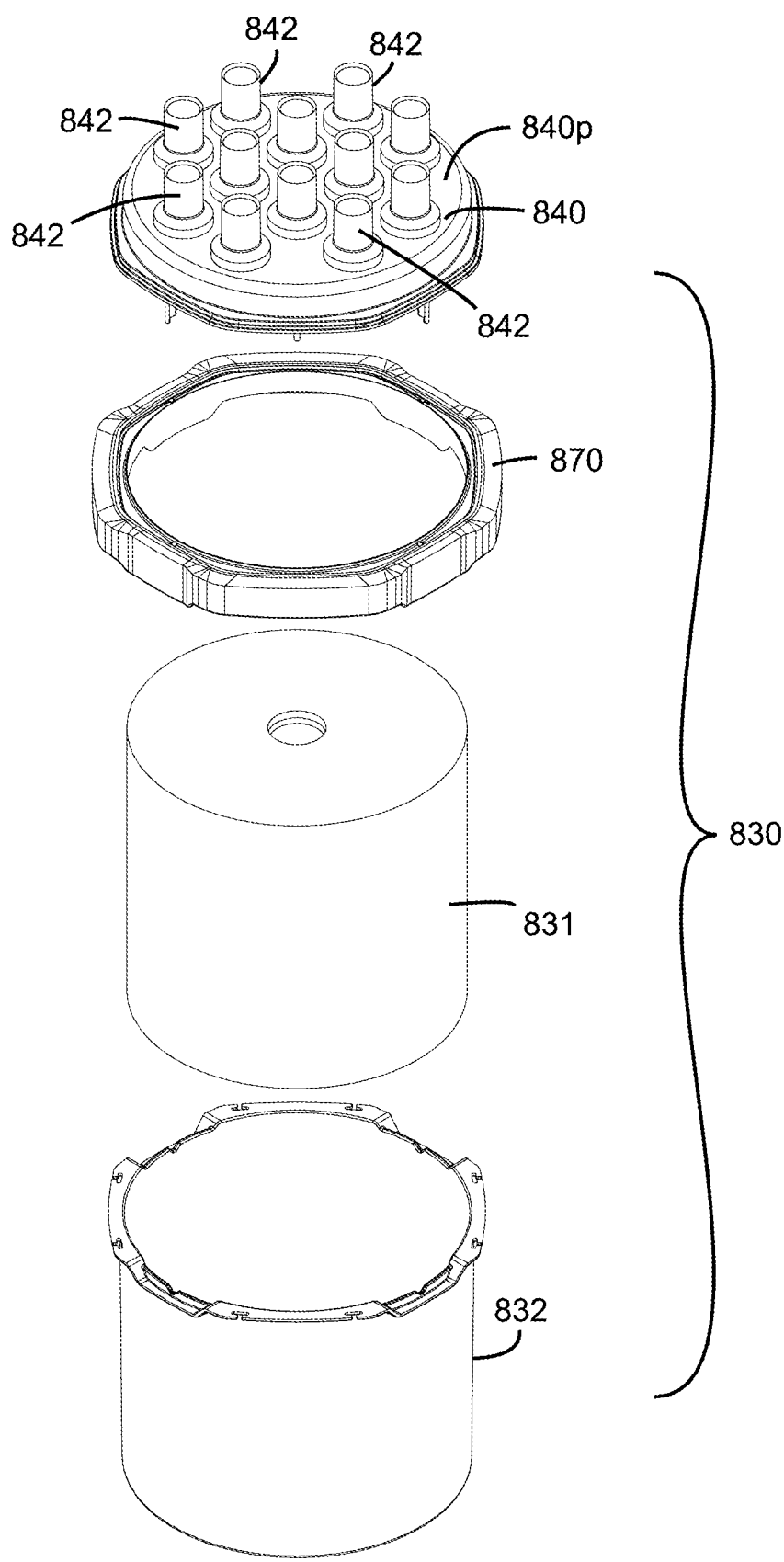
FIG. 39A is a schematic exploded perspective view of a filter cartridge component of the assembly of FIG. 39.

In FIG. 39A, an exploded perspective view of the cartridge 830 is depicted. Again, the pinch seal member 870 can be generally analogous to pinch seal member 766 discussed above. The same is true for the media pack 831 and the protective cover 832. However, as discussed, instead of having a handle member thereon. The cartridge 830 includes a preform 840p comprising a cap 840 having the various tube sections 842 described positioned thereon, and providing for flow passage of air through the cap 840, to the media.

It is noted that the preform 840p could be provided with a handle member of the general type previously described, in addition to the tube sections 842, if desired. All that generally would be required, besides molding the handle member, as part of the preform 840p, would be ensuring that the array of tube sections 842 on the cartridge in the housing (as sections 811i) are oriented to allow clearance for the handle member.

In FIG. 40, a schematic cross-sectional view of air cleaner assembly 800 taken generally along line 40-40, FIG. 39 is provided. The internally received main filter cartridge 830 and safety filter cartridge 860 are viewable. (Note: gridwork 832g on protective cover 832, extending across an outlet end of the media pack 831. Also, note center plug 831p in media pack 831).

Separator or precleaner tubes 890 formed by tube sections 842 and projecting into centrifugal dust separator sections 811i are shown. In FIG. 40, selected inlet separator tubes of centrifugal dust separator sections are shown removed to facilitate understanding. The separator tubes 890 that result from a combination of features 811i and 842 can be operated analogously to tubes previously described, except the clean air receiver sections 842 are positioned (integrated with) on the cartridge 830, as opposed to on the housing inlet cover.

It is noted that tube sections 842 depicted generally have a circular outer perimeter and inner perimeter. Alternatives are possible. However, circular tube sections will be typical and preferred.

In general, the sum total of air flow open flow area provided by the tube sections 842 (in or through preform 840*p*) relative to an edge (adjacent flow end) perimeter area identified by the adjacent media pack end, should be sufficient for good air flow through the resulting cartridge without undesired restriction. Typically, the open area represented by the sum total of the tubes 842, will be: at least 5% of an end area of the media pack adjacent the tube section 842; typically at least 10% of that end area; often at least 15% of that area. While alternatives are possible, typically openings provided by the tube sections 842 will not comprise more than about 50% of that area.

Spacing of the perimeter cap portion from the media pack end, indicated at dimension N, FIG. 40, should be enough to ensure that the outlet flow from the tube sections 842 can be distributed well across the end face of the media. A spacing of at least 5 mm, usually at least 8 mm, and sometimes 10 mm or more between the media and the inlet preform, will be typical, although alternatives are possible. Usually, an extremely large spacing is not preferred, for good space utilization. Thus, typically the total space dimension N, will be no more than 25 mm, and usually less, although alternatives are possible.

Figure 41:
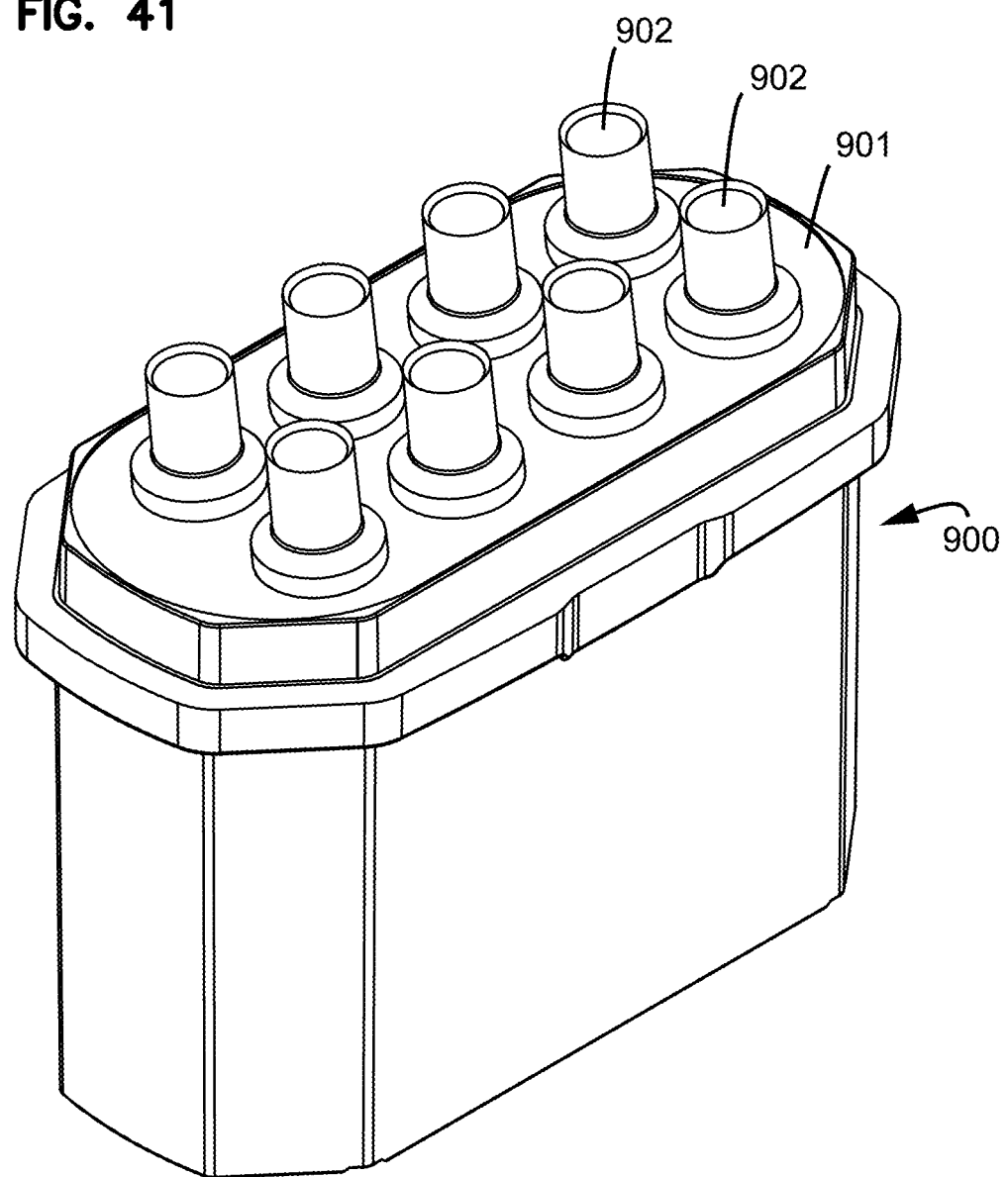
FIG. 41 is a schematic perspective view of an alternate filter cartridge using selected principles in accord with the general features of FIGS. 38-40, but in the context of an alternate shaped cartridge.

The principles of operation of a precleaner arrangement having a cap on an inlet end of the cartridge; which cap includes integrated clean air tubes positioned thereon, analogous to tubes 842 can be implemented in a variety or shapes of cartridges. In FIG. 41, an example is schematically depicted, of an oval cartridge arrangement 900, including a cap 901 thereon having tube sections 902. Of course of alternative tube numbers and positions in an array can be used.

As indicated above, a variety of arrangements of tube sections corresponding to section 842, in a variety of arrangements of sections corresponding to sections 811*i*, FIGS. 38-40 can be used. The particular arrangement is oriented such that if the tubes 842 are oriented in any of four rotational orientations (rotationally 90° apart) they will still match/mate with the array of tube sections 811*i*. It will be typical that when tube sections are included on a cartridge, as described in connection with the arrangements of FIGS. 38-41, the tube sections in the cartridge will be in an array that will properly engage the array of inlet tube sections to form separator tubes, in a number of orientations that correspond to the number of orientations in which the cartridge seal arrangement can properly engage and seal to the corresponding housing. Thus, for the arrangement of FIGS. 38-40, the seal arrangement allows for four rotational orientations, as do the tube sections 840.

It is noted that the principles described herein in connection with a filter cartridge having a cap with separator tube clean air inlet sections thereon can be applied in arrangements with pinch seal members or seal arrangements, different from those described. For example, it can be used: with or without the projection/recess contour in the perimeter; with or without the projection/recess contour in the pinch seal surface; and, can be applied in some arrangements in which the housing seal arrangement is not a pinch seal at all, but rather is a radial seal of a type referenced above. It is also noted that the features can be used with the alternate media types generally described herein above. Further, the principles can be applied in the absence of a safety filter cartridge if desired.

In addition, the arrangements of FIGS. 38-41 are depicted using the anti-deformation or anti-roll feature resulting from the end core or end piece (for example, 832, FIG. 39A) having the perimeter projection along an end with recesses to stabilize portions of the seal arrangement comprising projections mounted thereon. The features of the end cap having the inlet tube can be implemented in arrangements that do not have this anti-deformation feature if desired.

VI. Some Additional Variations; General Comments

In general terms, filter cartridges according to an optional, preferred, application of the principles of the present disclosure include axial pinch seal arrangements that have portions that could potentially be subject to deformation toward or away from a media pack in use, but for features provided. In an example depicted, the housing seal arrangement is an axial pinch seal and the axial pinch seal includes a downstream housing seal surface that has contours in it; and, a preform is provided extending into the seal arrangement (in an example across a recess between a portion of the seal arrangement and the media pack) to provide stabilization against such roll or deformation. A variety of alternatives and general characteristics are described.

In an example described, the structure that extends across the recess is not fully embedded in the seal material, but rather forms a surface of the recess section at an end thereof. Also it is typically contoured at this location, to facilitate operation. Both are preferred, but not specifically required in all applications of techniques described herein.

The above features are depicted in connection with media packs that can comprise variations in outer shape, for example, oval or circular. Alternate media types are described.

In certain example arrangements characterized herein, a portion of a precleaner is secured to (i.e. integrated with) the cartridge, to engage another portion in an access cover. The portion of the precleaner secured to the cartridge can be an end cap having separator tube sections thereon, oriented for engagement with separator sections in an air cleaner access cover, to facilitate formation of separator tubes in a preferred manner.

A variety of housing features are characterized. These include features that accommodate the deformation inhibition arrangement, as well as some features for selected and preferred precleaner configuration and operation.

Methods of construction, assembly and use are characterized.

There is specifically no requirement that an assembly, component or feature include all of the example features characterized herein above, in order to obtain some advantage in accord with the present disclosure.

What is claimed:
1. An air filter cartridge comprising:
(a) a filter media pack comprising first and second, opposite, flow ends with media extending therebetween;
(b) a housing seal arrangement including a seal member;
  (i) the housing seal arrangement is a pinch seal arrangement having an axial pinch seal with: an outer peripheral surface; and, a first pinch seal housing engagement surface;

(ii) the first pinch seal housing engagement surface is a contoured axial pinch seal surface with at least a first housing engagement projection thereon; and (iii) the first housing engagement projection including a first pinch seal projection extending further toward the second flow end than portions of the contoured axial pinch seal surface at immediate, opposite, peripheral, sides of the first housing engagement projection; and, (c) an inlet preform positioned on the filter media pack;

(i) the inlet preform including a cap extending over the first flow end of the media pack;

(ii) the cap having a plurality of precleaner, separator tube, clean air inlet sections thereon, providing for flow through the preform and to the media.

2. An air filter cartridge according to claim 1 wherein:
(a) the plurality of clean air inlet sections are arranged in an array having 180° rotational symmetry.

3. An air filter cartridge according to claim 1 wherein:
(a) the plurality of clean air inlet sections are arranged in an array having 90° rotational symmetry.

4. An air filter cartridge according to claim 1 wherein:
(a) the seal member is molded-in-place with a portion of the inlet preform embedded therein.

5. An air filter cartridge according to claim 1 wherein:
(a) the inlet preform defines an air flow open area comprising at least 5% of an end area of the first flow end of the filter media pack.

6. An air filter cartridge according to claim 1 wherein:
(a) the inlet preform has an open area comprising at least 10% of an end area of the first flow end of the filter media pack.

7. An air filter cartridge according to claim 1 wherein:
(a) the inlet preform has an open area comprising at least 15% of an end area of the first flow end of the filter media pack.

8. An air filter cartridge according to claim 1 wherein:
(a) the inlet preform is positioned to space the cap clean air inlet sections at least 8 mm from the media pack at the first flow end.

9. An air filter cartridge according to claim 1 wherein:
(a) the inlet preform is positioned to space the cap clean air inlet sections at least 10 mm from the media pack at the first flow end.

10. An air filter cartridge according to claim 1 wherein:
(a) the air inlet sections have circular inner and outer cross-sectional shapes.

11. An air filter cartridge according to claim 1 including:
(a) a receiver recess positioned between a portion of the pinch seal arrangement and the media pack.

12. An air filter cartridge according to claim 1 wherein:
(a) the media pack is a coiled media arrangement.

13. An air filter cartridge according to claim 1 wherein:
(a) the media pack has a circular outer perimeter.

14. An air filter cartridge according to claim 1 wherein:
(a) the media pack has a non-circular outer perimeter.

15. An air filter cartridge according to claim 14 wherein:
(a) the media pack has an oval outer perimeter.

16. An air filter cartridge according to claim 1 including:
(a) an outlet preform having a portion surrounding the media pack.

17. An air filter cartridge according to claim 16 wherein:
(a) the outlet preform extends from the seal arrangement to the second flow end of the media pack.

18. An air filter cartridge according to 16 wherein:
(a) the outlet preform includes a portion having the housing seal arrangement secured thereto.

19. An air filter cartridge according to 1 wherein:
(a) the media being closed to flow of air, passing into the first flow end, from exiting the second flow end without filtering flow through the media.

20. An air filter cartridge according to 1 wherein:
(a) the contoured axial pinch seal surface comprises a plurality of the first housing engagement projections.

21. An air filter cartridge according to 20 wherein:
(a) the contoured axial pinch seal surface comprises a perimeter extension, and the first housing engagement projections comprise no more than 50% of the perimeter extension.

22. An air filter cartridge according to 20 wherein:
(a) the contoured axial pinch seal surface comprises a perimeter extension, and the first housing engagement projection comprise no more than 30% of the perimeter extension.

23. An air cleaner assembly comprising:
(a) a housing including: a body; an access cover; an air flow inlet; and, an air flow outlet;
(b) a precleaner;
(i) the precleaner including an array of separator tube centrifugal separator inlet sections positioned on the access cover; and,
(c) an air filter cartridge operably positioned in the housing; the air filter cartridge comprising:
(i) a filter media pack comprising first and second, opposite, flow ends with media extending therebetween;
(ii) a housing seal arrangement including a seal member;
(A) the housing seal arrangement is a pinch seal arrangement having an axial pinch seal with: an outer peripheral surface; and, a first pinch seal housing engagement surface;
(B) the first pinch seal housing engagement surface is a contoured axial pinch seal surface with at least a first housing engagement projection thereon; and
(C) the first housing engagement projection including a first pinch seal projection extending further toward the second flow end than portions of the contoured axial pinch seal surface at immediate, opposite, peripheral, sides of the first housing engagement projection; and,
(ii) an inlet preform positioned on the filter media pack;
(A) the inlet preform including a cap extending over the first flow end of the media pack;
(B) the cap having a plurality of precleaner, separator tube, clean air inlet sections thereon, providing for flow through the preform and to the media, wherein the clean air inlet sections on the cartridge projecting into the separator tube centrifugal separator inlet sections.

24. An air cleaner assembly according to 23 wherein:
(a) the media being closed to flow of air, passing into the first flow end, from exiting the second flow end without filtering flow through the media.

* * * * *